(12) United States Patent
Yamanaka et al.

(10) Patent No.: US 6,985,298 B2
(45) Date of Patent: *Jan. 10, 2006

(54) PRODUCTION METHOD OF MICROLENS ARRAY, LIQUID CRYSTAL DISPLAY DEVICE AND PRODUCTION METHOD THEREOF, AND PROJECTOR

(75) Inventors: Hideo Yamanaka, Kumamoto (JP); Kikuo Kaise, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/104,963

(22) Filed: Apr. 13, 2005

(65) Prior Publication Data

US 2005/0202586 A1    Sep. 15, 2005

Related U.S. Application Data

(63) Continuation of application No. 10/436,020, filed on May 12, 2003, now Pat. No. 6,894,840.

(30) Foreign Application Priority Data

May 13, 2002 (JP) ............................. 2002-137709
Jun. 10, 2002 (JP) ............................. 2002-168013

(51) Int. Cl.
  *G02B 27/10* (2006.01)
(52) U.S. Cl. ...................... 359/619; 359/620; 359/900
(58) Field of Classification Search ................ 359/619, 359/620–624, 626, 454, 455, 463
See application file for complete search history.

(56) References Cited

U.S. PATENT DOCUMENTS

| 5,306,926 | A | 4/1994 | Yonemoto |
| 5,706,065 | A | 1/1998 | Yano |
| 5,844,290 | A | 12/1998 | Furumiya |
| 6,632,342 | B1 | 10/2003 | Teshima et al. |
| 2002/0126390 | A1 * | 9/2002 | Matsushita et al. ......... 359/621 |
| 2004/0099633 | A1 * | 5/2004 | Okada et al. ................. 216/26 |

FOREIGN PATENT DOCUMENTS

JP   2000155201 A  *  6/2000

* cited by examiner

*Primary Examiner*—Ricky Mack
(74) *Attorney, Agent, or Firm*—Robert J. Depke; Trexler, Bushnell, Giangiorgi, Blackstone & Marr, Ltd.

(57) ABSTRACT

A method of producing a microlens array includes a patterning step of forming a first optical resin layer having a first refractive index on a transparent substrate and forming a plurality of microlens planes arrayed in a two-dimensional pattern on the front surface of the first optical resin layer; a planarizing step of forming a planarized second optical resin layer; a joining step of providing a support layer on which a transparent protective film is previously formed; and a removing step of removing the support layer in such a manner that only the protective film remains on the second optical resin layer. The planarizing step is performed by filling irregularities of the microlens planes with a resin having a second refractive index and planarizing the front surface, opposed to the microlens planes, of the resin, to form the planarized second optical resin layer, and the joining step is performed by joining the support layer to the planarized second optical resin layer. With this method, a microlens array excellent in surface accuracy and flatness can be produced without the need of provision of a support layer made from glass.

1 Claim, 35 Drawing Sheets

RESIST PATTERNING
F I G. 1 A
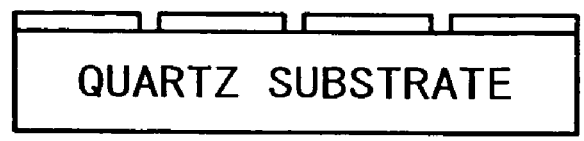
HF BASED ET
F I G. 1 B
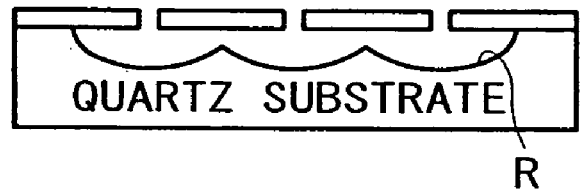
F I G. 1 C
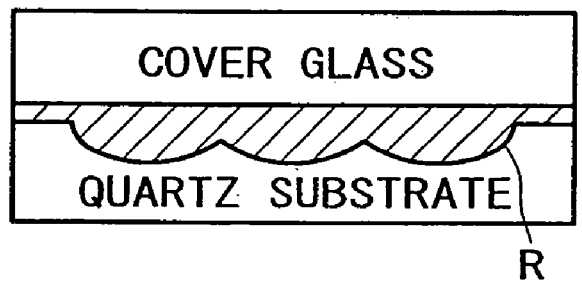
F I G. 1 D
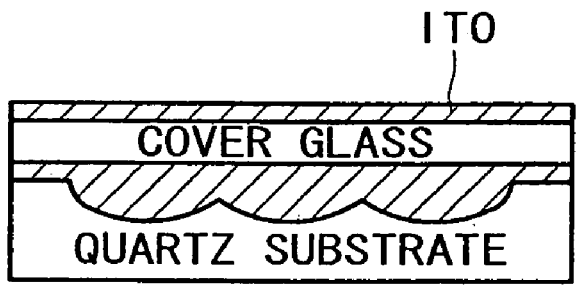

PRODUCTION METHOD OF MICROLENS ARRAY, LIQUID CRYSTAL DISPLAY DEVICE AND PRODUCTION METHOD THEREOF, AND PROJECTOR

The subject matter of application Ser. No. 10/436,020 is incorporated herein by reference. The present application is a continuation of U.S. application Ser. No. 10/436,020, filed May 12, 2003 now U.S. Pat. No. 6,894,840, which claims priority to Japanese Patent Application NoJP2002-137709, filed May 13, 2002, and Japanese Patent Application No. JP2002-168013, filed Jun. 10, 2002. The present application claims priority to these previously filed applications.

BACKGROUND OF THE INVENTION

The present invention relates to a method of producing a microlens array, a liquid crystal display device incorporating the microlens array and a method of producing the liquid crystal display device, and a projector using the liquid crystal display device as a light bulb.

Projectors using an LCD (Liquid Crystal Display Device), DMD (Digital Mirror Device), or LCOS (LC•ON•SILICON) as a light bulb has been actively developed. From the viewpoints of function and shape, projectors are classified into a data projector mainly used for monitor display for personal computers, a front projector or a rear projector mainly used for AV for home theaters and the like, and a rear projector for TV. Meanwhile, from the viewpoint of the number of light bulbs, projectors are classified into a one-screen type, a two-screen type, and a three-screen type. The light bulbs are classified into a transmission type and a reflection type.

The higher luminance characteristics of projectors may be required in the future. To meet such a requirement it is primarily expected to improve optics. For example, it is expected to enhance the luminance of a light source to be used, to shorten the arc length (for realizing pointed light source) in the case of using an arc lamp, to optimize optical members, and to miniaturize optical members.

To meet the above requirement, it is secondarily expected to increase the aperture ratio of a light bulb as a key device of a projector. In this case, it is basically required to realize a finer structure and a higher aperture ratio of the device at the pixel level. If liquid crystal is used as an electro-optical medium, however, the aperture ratio of pixels cannot be enhanced only by providing a simple fine structure of the device. The reason for this is as follows: namely, since liquid crystal is a continuous body, a shielding black matrix having an area being large enough to prevent leakage of light from reverse tilt domains and to prevent leakage of light of thin film transistors for driving the liquid crystal must be provided, with a result that the aperture ratio of pixels are correspondingly sacrificed.

To improve the utilization efficiency of light emitted from a light source and also to enhance the luminance, an attempt has been made to mount microlens arrays to liquid crystal display devices. For example, a flat display device incorporating a microlens array has been disclosed in Japanese Patent Laid-open No. Hei 2000-206894. A microlens array incorporated in a high precision liquid crystal display device (liquid crystal panel) for a related art liquid crystal projector has been produced by using a glass substrate such as a quartz substrate or a neoceram glass substrate (hereinafter, the glass substrate used for a microlens array is sometimes referred to as "cover glass"). To be more specific, a method of forming a microlens array using the cover glass by a wet-etching or dry-etching process or a 2P (Photo-Polymerization) process has been put into practical use. In each case, a region in which a microlens array is to be formed is composed of a transparent resin. The thickness of a cover glass for supporting such a transparent resin has been reduced by polishing or grinding in a controlled manner, and a transparent conductive film (for example, ITO film) for a display device has been formed on the cover glass, as needed.

A related art method of producing a microlens array by using a wet etching process will be described with reference to FIGS. 1A to 1D.

In a step shown in FIG. 1A, after a quartz substrate is cleaned, a resist is applied on the quartz substrate, and is patterned into a pattern corresponding to an array pattern of pixels by exposure and development. In a step shown in FIG. 1B, the quartz substrate is subjected to isotropic etching via the resist, to form spherical lens planes R. In addition, a film of a metal, polysilicon, or amorphous silicon excellent in chemical resistance may be used as a mask in place of the resist. The etching may be performed by using an HF or BHF based etchant.

In a step 1C, a cover glass is stuck on the surface of the quartz substrate, and a gap therebetween is filled with a transparent resin having a refractive index different from that of quartz by vacuum injection, spin coating, or spraying. The resin in the spherical lens planes formed by wet etching is perfectly cured by UV irradiation or heating. Examples of the resins used herein include an epoxy based resin, an acrylic based resin, a silicon based resin, and a fluorine based resin, each of which is curable by UV-irradiation or heating. In this way, microlenses arrayed in a pattern corresponding to an array pattern of pixels are formed. Finally, in a step 1D, the cover glass is polished, and a transparent electrode made from ITO is formed, to form a counter substrate. While not shown, the counter substrate is stuck on a drive substrate on which pixel electrodes and thin film transistors are previously formed, and liquid crystal is injected in a gap therebetween, to obtain an active matrix type liquid crystal display device.

FIG. 2 shows a schematic configuration of optics (mainly, illumination optics) of a related art projector. The projector includes a light source 1101, a first microlens array 1102, a second microlens array 1103, a PS synthesizing element 1104, a condenser lens 1105, a field lens 1106, a liquid crystal panel 1107, and a projection lens 1108, which are arranged in this order along an optical axis 1100. The microlens array 1102 has a plurality of microlenses arrayed in a two-dimensional pattern, and the microlens array 1103 has a plurality of microlenses arrayed in a two-dimensional pattern. The PS synthesizing element 1104 includes a plurality of half-wave plates 1104A at positions each of which corresponds to a space between adjacent two of the microlenses of the second microlens array 1103.

In this projector, illumination light emitted from the light source 1101 passes through the microlense arrays 1102 and 1103, to be divided into a plurality of micro-beams. The light emerged from the microlens arrays 1102 and 1103 is made incident on the PS synthesizing element 1104. Light L10 incident on the PS synthesizing element 1104 contains a P-polarized component and an S-polarized component perpendicular to each other within a plane perpendicular to the optical axis 1100. The PS synthesizing element 1104 separates the light L10 incident thereon into two kinds of polarized light components L11 and L12 (P-polarized component and S-polarized component). Of these polarized light components L11 and L12, the polarized light component L11 (for example, P-polarized component) emerges from the PS synthesizing element 1104 with its polarization direction (for example, P-polarization) kept as it is, and the polarized light component L12 (for example, S-polarized component) is converted into the other polarized light component (for example, P-polarized component) by the half-wave plates 1104A, and the converted light component L12 emerges from the PS synthesizing element 1104. As a result, the two separated polarized light components L11 and L12 are directed in a specific direction.

The light emerged from the PS synthesizing element 1104 passes through the condenser lens 1105 and the field lens 1106, and illuminates the liquid crystal panel 1107. The micro-beams divided from the light by the microlens arrays 1102 and 1103 are enlarged at an enlargement ratio determined by the focal distance "fc" of the condenser lens 1105 and the focal distance "f" of the microlenses 1103M of the second microlens array 1103, to illuminate the entire incident plane of the liquid crystal panel 1107. Accordingly, a plurality of the enlarged beams are superimposed on the incident plane of the liquid crystal panel 1107, to realize uniform illumination as a whole. The liquid crystal panel 1107 spatially modulates the incident light on the basis of image signals, and the light emerged from the liquid crystal panel 1107 is projected on a screen (not shown) by the projection lens 1108, to form an image on the screen.

FIG. 3 is a typical perspective view showing one example of a liquid crystal panel. A liquid crystal panel (liquid crystal display device) shown in the figure has a flat panel structure including a pair of substrates 1201 and 1202 and liquid crystal 1203 kept therebetween. A pixel array portion 1204 and a drive circuit portion are integrated on the lower substrate 1201. The drive circuit portion is separated into a vertical drive circuit 1205 and a horizontal drive circuit 1206. Terminals 1207 for external connection are formed on a peripheral upper end of the lower substrate 1201. The terminals 1207 are connected to the vertical drive circuit 1205 and the horizontal drive circuit 1206 via wiring lines 1208. Gate lines G and signal lines S are formed on the pixel array portion 1204. A pixel electrode 1209 and a thin film transistor (TFT) 1210 for driving the pixel electrode 1209 are formed at each of intersections between the gate lines G and the signal lines S. A pixel P is composed of a combination of the pixel electrode 1209 and the thin film transistor 1210. A gate electrode of the thin film transistor 1210 is connected to the corresponding gate line G, a drain resin thereof is connected to the corresponding pixel electrode 1209, and a source region thereof is connected to the corresponding signal line S. The gate line G is connected to the vertical drive circuit 1205, and the signal line S is connected to the horizontal drive circuit 1206. The vertical drive circuit 1205 sequentially selects each pixel P via the gate line G. The horizontal drive circuit 1206 writes an image signal on the selected pixel P via the signal line S. The lower substrate 1201, on which the pixel electrodes and the thin film transistors (TFTs) are integrated, is called as a TFT substrate. While not shown, a counter electrode and color filter are formed on the upper substrate 1202, and therefore, the upper substrate 1202 is called as a counter substrate.

Such a microlens array must meet the requirement toward higher precision as well as the requirement toward higher luminance. For example, as the panel size of a liquid crystal display device becomes small, the pixel size becomes small in proportion thereto, and correspondingly, a cover glass must be made thin. Although a cover glass has been thinned by polishing or grinding, such polishing or grinding has a limitation in thinning the cover glass at a desired accuracy, thereby making it difficult to ensure the uniformity and flatness required for design. If the accuracy and flatness of the plane of a cover glass for a microlens array is insufficient, there arises a problem that mechanical stress may occur at the time of assembling the microlens array in a liquid crystal display device. Also, in the case of thinning a cover glass to 30 $\mu$m or less along with the requirement toward higher definition of a panel, there arises another problem that waviness or warping of the cover glass may occur by stress due to shrinkage caused by curing of an optical resin forming the microlens array or a difference in thermal expansion coefficient between the optical resin and the cover glass.

In the case of using the above-described active matrix type liquid crystal display device as a light bulb of a projector, such a liquid crystal display device is more strongly required for higher definition and high luminance. From this viewpoint, a high temperature polysilicon thin film transistor capable of realizing high definition is used as a switching device for driving each pixel. Along with the demand toward a finer switching device, a microlens array is required to have a finer structure. To meet such a requirement, a technique of integrating a microlens array to a substrate of an active matrix type liquid crystal display device has been developed. For example, a method of producing a microlens array incorporating substrate has been disclosed, for example, in Japanese Patent Laid open No. Hei 5-341283, Hei 10-161097, and 2000-147500.

A duel microlens array structure is regarded as an ideal structure capable of realizing the maximum luminance, wherein a microlens array functioning as condenser lenses is assembled in a counter substrate on the light incident side, and a microlens array functioning as field lenses is assembled on a TFT substrate side. Such a duel microlens array is able to enhance the effective aperture ratio of pixels at maximum; however, because of the most difficulty in producing the duel microlens array, any practical production method thereof has been not disclosed at present. It is to be noted that an LCD having a duel microlens array structure is often called as an MTMLCD abbreviated from "Microlens Substrate-TFT Substrate-Microlens Substrate LCD".

SUMMARY OF THE INVENTION

A first object of the present invention is to provide a method of producing a microlens array excellent in surface accuracy and a flatness while eliminating the need of provision of a cover glass (glass substrate), and to provide a method of producing a so-called duel microlens array (sometimes called as a double microlens array) in which two microlens arrays are joined to each other by using a planarizing technique.

A second object of the present invention is to provide a liquid crystal display device incorporating the above microlens array.

A third object of the present invention is to provide a projector using the above liquid crystal display device.

A fourth object of the present invention is to provide a method of rationally producing a liquid crystal display device having a dual microlens array.

To achieve the above first object, according to a first aspect of the present invention, there is provided a method of producing a microlens array, including a patterning step of forming a first optical resin layer having a first refractive index on a transparent substrate and forming a plurality of microlens planes arrayed in a two-dimensional pattern on the front surface of the first optical resin layer; a planarizing step of forming a planarized second, optical resin layer; a joining step of providing a support layer on which a transparent protective film is previously formed; and a removing step of removing the support layer in such a manner that only the protective film remains on the second optical resin layer. In this method, the planarizing step includes a step of filling irregularities of the microlens planes with a resin having a second refractive index and planarizing the front surface, opposed to the microlens planes, of the resin, to form the planarized second optical resin layer, and the joining step includes a step of joining the support layer to the planarized second optical resin layer.

The joining step may be performed before the planarizing step. In this case, the joining step may include a step of joining the support layer to the microlens side of the first optical resin layer with a specific gap kept therebetween, and the planarizing step may include a step of filling the gap with a liquid resin and curing the resin, to form the planarized second optical resin layer.

The planarizing step may include a step of coating the front surface of the first optical resin layer with a liquid resin by a spin-coating process so as to fill the microlens planes with the liquid resin and to planarize the front surface of the liquid resin, to form the polarized second optical resin layer.

The planarizing step may include a step of supplying a resin on the front surface side of the first optical resin layer to fill the microlens planes with the resin, and pressing the front surface, opposed to the microlens planes, of the resin with a stamper having a flat plane, to form the planarized second optical resin layer.

The protective film is preferably made from $SiO_2$, SiN, a-DLN, or $Al_2O_3$.

To achieve the above first object, according to a second aspect of the present invention, there is provided a method of producing a microlens array, including a patterning step of forming a first optical resin layer having a first refractive index on a transparent substrate and forming a plurality of microlens planes arrayed in a two-dimensional pattern on the front surface of the first optical resin layer; and a filling/plarizing step of filling irregularities of the microlens planes with a resin having a second refractive index, and planarizing the front surface, opposed to the microlens planes, of the resin, to form a second optical resin layer. In this method, the filling/planarizing step is performed by a spin-coating process.

To achieve the above first object, according to a third aspect of the present invention, there is provided a method of producing a microlens array, including a patterning step of forming a first optical resin layer having a first refractive index on a transparent substrate and forming a plurality of microlens planes arrayed in a two-dimensional pattern on the front surface of the first optical resin layer; a filling step of filling irregularities of the microlens planes with a resin having a second-refractive index; and a planarizing step of planarizing the front surface, opposed to the microlens planes, of the resin filling the microlens planes, to form a second optical resin layer. In this method, the planarizing step is performed by planarizing the front surface of the resin filling the microlens planes by a flat stamping process.

To achieve the above first object, according to a fourth aspect of the present invention, there is provided a method of producing a microlens array having a double structure, including a first patterning step of forming a first optical resin layer on a first support and forming two-dimensionally arrayed first microlens planes on the front surface of the first optical resin layer; a first planarizing step of filling irregularities of the first microlens planes with an optical resin having a refractive index different from that of the first optical resin layer, and planarizing the front surface, opposed to the microlens planes, of the optical resin, to form a first microlens array; a second patterning step of forming a second optical resin layer on a second support and forming two-dimensionally arrayed second microlens planes on the front surface of the second optical resin layer; a second planarizing step of filling irregularities of the second microlens planes with an optical resin having a refractive index different from that of the second optical resin layer, to form a second microlens array; and a joining step of joining the planarized surface of the first microlens array to the planarized surface of the second microlens array in a state that the first microlens planes are aligned to the second microlens planes, thereby integrating the first and second microlens arrays to each other.

To achieve the above second aspect, according to a fifth aspect of the present invention, there is provided a liquid crystal display device having a panel structure including a drive substrate on which at least pixel electrodes and switching devices for driving the pixel electrodes are formed; a counter substrate on which at least a counter electrode is formed; and a liquid crystal layer interposed between the drive substrate and the counter substrate joined such that the pixel electrodes are opposed to the counter electrode with a specific gap kept therebetween. In this device, a microlens array composed of microlens arrayed in a two-dimensional pattern corresponding to an array pattern of the pixel electrodes is assembled at least to the counter substrate. The microlens array has the back surface joined to the counter substrate and the front surface planarized, and the counter electrode is formed on the planarized front surface of the microlens array via a protective film.

Preferably, after the protective film previously formed on a support is bonded on the planarized front surface of the microlens array, the support is removed to expose the protective film, and the counter electrode is formed on the exposed protective film.

The protective film is preferably made from $Al_2O_3$, a-DLC, $TiO_2$, TiN, or Si.

Preferably, the microlens array has a double structure including first microlenses functioning as condenser lenses disposed on the side apart from the liquid crystal layer and second microlenses substantially functioning as field lenses disposed on the side close to the liquid crystal layer, and the distance between a principal point of each of the second microlenses and the liquid crystal layer is set to a value in a range of 10 $\mu$m or less.

It is to be noted that if the focal distance of the second microlens corresponds to the distance between both the first and second microlenses, the function of the second microlens becomes 100%, and in actual, if the difference between the focal distance of the second microlens and the distance between both the first and second microlenses is within about 10%, the second microlens sufficiently functions as a field lens.

To achieve the above second object, according to a sixth aspect of the present invention, there is provided a liquid crystal display device having a panel structure including a drive substrate on which at least pixel electrodes and switching devices for driving the pixel electrodes are formed; a counter substrate on which at least a counter electrode is formed; and a liquid crystal layer interposed between the drive substrate and the counter substrate joined such that the pixel electrodes are opposed to the counter electrode with a specific gap kept therebetween; wherein a microlens array composed of microlens arrayed in a two-dimensional pattern corresponding to an array pattern of the pixel electrodes is assembled at least to the drive substrate. In this device, the microlens array has a stacked structure of a first optical resin layer having a first refractive index and a second optical resin layer having a second refractive index. The first optical resin layer has microlens planes arrayed in a two-dimensional pattern and the second optical resin layer is formed to fill irregularities of the microlens planes and has a planarized front surface opposed to the microlens planes. The microlens array is assembled to the drive substrate in such a manner that the planarized surface of the second optical resin layer of the microlens array is joined to the back surface of the drive substrate.

Preferably, the microlens array is formed by joining the first optical resin layer to a support layer having a protective film previously formed thereon with a specific gap kept therebetween, filling the gap with a liquid resin and curing the liquid resin to form the second optical resin layer, and removing the support layer to expose the protective film. The exposed surface of the protective film is taken as the planarized surface of the second optical resin layer.

Preferably, the microlens array is formed by filling the microlens planes of the first optical resin layer with a resin, and pressing the front surface, opposed to the microlens planes, of the resin with a stamper having a flat plane, to planarize the front surface of the second optical resin layer.

The liquid crystal display device preferably further includes a microlens array disposed on the counter substrate in such a manner as to be aligned to the microlens array disposed on the drive substrate, wherein one of the microlens arrays functions as condenser lenses and the other functions as field lenses.

Preferably, the drive substrate is thinned by polishing the back surface thereof, and the planarized surface of the second optical resin layer of the microlens array is joined to the polished back surface of the drive substrate.

To achieve the above third object, according to a seventh aspect of the present invention, there is provided a projector including a light source for emitting light; a liquid crystal display device having a function of optically modulating incident light; and a projection lens for projecting light modulated by the liquid crystal display device. The liquid crystal display device having a panel structure includes a drive substrate on which at least pixel electrodes and switching devices for driving the pixel electrodes are formed; a counter substrate on which at least a counter electrode is formed; and a liquid crystal layer interposed between the drive substrate and the counter substrate joined such that the pixel electrodes are opposed to the counter electrode with a specific gap kept therebetween. In this device, a microlens array composed of microlens arrayed in a two-dimensional pattern corresponding to an array pattern of the pixel electrodes is assembled at least to the counter substrate. The microlens array has the back surface joined to the counter substrate and the front surface planarized, and the counter electrode is formed on the planarized front surface of the microlens array via a protective film.

To achieve the third aspect, according to an eighth aspect of the present invention, there is provided a projector including a light source for emitting light; a liquid crystal display device having a function of optically modulating incident light; and a projection lens for projecting light modulated by the liquid crystal display device. The liquid crystal display device having a panel structure includes a drive substrate on which at least pixel electrodes and switching devices for driving the pixel electrodes are formed; a counter substrate on which at least a counter electrode is formed; and a liquid crystal layer interposed between the drive substrate and the counter substrate joined such that the pixel electrodes are opposed to the counter electrode with a specific gap kept therebetween. In the device, a microlens array composed of microlenses arrayed in a two-dimensional pattern corresponding to an array pattern of the pixel electrodes is assembled at least to the drive substrate. The microlens array has a stacked structure of a first optical resin layer having a first refractive index and a second optical resin layer having a second refractive index. The first optical resin layer has microlens planes arrayed in a two-dimensional pattern, and the second optical resin layer is formed to fill irregularities of the microlens planes and has a planarized front surface opposed to the microlens planes. The microlens array is assembled to the drive substrate in such a manner that the planarized surface of the second optical resin layer of the microlens array is joined to the back surface of the drive substrate.

To achieve the above object, according to a ninth aspect of the present invention, there is provided a method of producing a liquid crystal display device having a panel structure including a first substrate having the front surface on which at least pixel electrodes and switching devices for driving the pixel electrodes are formed and the back surface opposed to the front surface; a second substrate having the front surface on which at least a counter electrode is formed and the back surface opposed to the front surface; and a liquid crystal layer interposed between the first and second substrates joined such that the pixel electrodes are opposed to the counter electrode with a specific gap kept therebetween. A first microlens array composed of two-dimensionally arrayed microlenses for individually condensing light to the pixel electrodes is integrally formed on one of the first and second substrates. A second microlens array composed of two-dimensionally arrayed microlenses for allowing light individually condensed to the pixel electrodes to pass therethrough is integrally formed on the other of the first and second substrates. The method includes a bonding step of bonding a base plate to the front surface of each of the first and second substrates; a polishing step of polishing the back surface of the substrate in a state that the substrate is held by the base plate, to reduce the thickness of the substrate; a sticking step of sticking the corresponding one of the first and second microlenses arrays to the polished back surface of the substrate via a transparent optical resin having a refractive index higher or lower than that of the substrate; and a peeling step of peeling the base plate from the front surface of the substrate and cleaning the substrate, thereby integrating the corresponding microlens array to the back surface of the substrate.

The method may further includes a dividing step of dividing, if at least one of the first and second substrates is a multi-chip module substrate having an area corresponding to a plurality of panels, the multi-chip module into single substrates corresponding to individual panels. In this case, after a plurality of the corresponding ones of the first and second microlens arrays, which correspond to the plurality of panels, are integrated to the multi-chip module substrate by the bonding step, polishing step, sticking step, and peeling step, the multi-chip module substrate may be divided into single substrates corresponding to individual panels at a suitable stage.

In the case where one of the first and second substrates is a multi-chip module substrate having an area corresponding to a plurality of panels and the other is a single-chip module substrate, preferably, a plurality of the corresponding ones of the first and second microlens arrays, which correspond to the plurality of panels, are formed on the multi-chip module substrate; the multi-chip module substrate is immediately divided into single substrates corresponding to individual panels in the dividing step; the single-chip module substrates to each of which the corresponding one of the first and second microlens arrays is previously integrated are prepared; and the single substrates divided from the multi-chip module substrate are overlapped to the single-chip module substrates in one-to-one relationship with a specific gap kept therebetween, to be assembled into individual panels.

In the case where one of the first and second substrates is a multi-chip module substrate having an area corresponding to a plurality of panels and the other is a single-chip module substrate, preferably, a plurality of the corresponding ones of the first and second microlens arrays, which correspond to the plurality of panels, are formed on the multi-chip module substrate; the single-chip module substrates to each of which the corresponding one of the first and second microlens arrays is previously integrated are prepared; the single-chip module substrates are assembled to the multi-chip module substrate; and the multi-chip module substrate assembled with the single-chip module substrates is divided into individual panels in the dividing step.

In the case where one of the first and second substrates is a multi-chip module substrate to which a plurality of the corresponding ones of the first and second microlens arrays for a plurality of panels are integrated, and the other of the first and second substrates is also a multi-chip module substrate to which a plurality of the others of the first and second microlens arrays for a plurality of panels are integrated, preferably, the multi-chip module substrates are overlapped to each other with a specific gap kept therebetween, to be assembled into a panel base corresponding to the plurality of panels; and the panel base is divided into individual panels in the dividing step.

The dividing step may include a first dicing step of partially cutting the multi-chip module substrate along boundaries defined to partition the multi-chip module substrate into individual panels by first dicing, to form grooves having V-shapes in cross-section; and a second dicing step of perfectly cutting the grooves by second dicing, thereby forming single substrates with chamfered end faces.

The method may include an alignment step of forming, after peeling the base plate from the front surface of the substrate and cleaning the substrate in the peeling step, an alignment layer for aligning the liquid crystal layer on the exposed front surface of the substrate in such a temperature range as not to impair the heat resistance of the microlens array integrated to the substrate.

The method may include an alignment step of forming an alignment layer for aligning the liquid crystal layer on the front surface of the substrate; wherein the alignment step is performed before the microlens array is integrated to the back surface of the substrate by the bonding step, polishing step, sticking step, and peeling step.

The polishing step may be performed by one or a combination of two or more of buffing with a grade suitable for optics, particle blasting, chemical-mechanical polishing, and chemical etching.

In the polishing step, preferably, the thickness of the substrate is reduced by polishing the back surface of the substrate in such a manner that the focal point of each of microlenses of the second microlens array functioning as field lenses corresponds to a principal point of each of microlenses of the first microlens array functioning as condenser lenses at the time of assembling the first and second substrates into a panel.

The sticking step may include a step of preparing the microlens array composed of microlens planes arrayed in a two-dimensional pattern by processing an optical glass material having a relatively low refractive index; and a step of positioning the microlens array to the polished back surface of the substrate, overlapping the microlens array thereto with a specific gap kept therebetween, filling the gap with a transparent optical resin having a refractive index higher or lower than that of the substrate, and curing the transparent optical resin.

The sticking step may include a step of fixing the polished back surface of the substrate to the microlens array with a specific gap kept therebetween by a seal material, filling the gap with a transparent optical resin having a refractive index higher or lower than that of the substrate, and sealing the gap.

The microlens planes are preferably formed into spheric, aspheric, or Fresnel shapes.

The method may further includes a cleaning step of cleaning the base plate peeled as a spent product in the peeling step in order to re-use the base plate.

The method may further include a preliminary step of integrating the corresponding one of the first and second microlens arrays to the second substrate; and an assembling step of assembling the second substrate integrated with the microlens array to the front surface of the first substrate. In this case, the bonding step may include a step of bonding the base plate to the front surface side of the second substrate assembled on the front surface of the first substrate; the polishing step may include a step of polishing the back surface of the first substrate in a state that the panel is held by the base plate; and the sticking step may include a step of sticking the corresponding one of the first and second microlens arrays to the polished back surface of the first substrate.

The polishing step may include a step of polishing the back surface of the first substrate in a state that a plurality of terminals for external connection formed on the first substrate are kept at the same potential.

The bonding step may include a step of mounting the second substrate side of the panel to the base plate fixed to a polishing platen used for the polishing step.

According to the present invention, since the surface of a microlens array is planarized by etching, flat stamping, or spin-coating, it is possible to eliminate the need of provision of a glass substrate (cover glass). This is advantageous in thinning the microlens array, and in removing mechanical stress at the time of assembling the microlens array to a liquid crystal display device. Further, since two microlens arrays can be accurately joined to each other by making use of a planarizing technique such as etching, flat stamping, or spin-coating, it is possible to stably produce a so-called dual microlens array.

According to the present invention, a microlens array incorporating TFT substrate is prepared by sticking a base plate on the front surface of a TFT substrate with an adhesive, polishing the back surface of the TFT substrate by a method for one-surface polishing with a grade suitable for optics, to form a TFT thin substrate having a specific thickness, and sticking a microlens array on the TFT thin substrate with a transparent resin adhesive having a high refractive index. A microlens array incorporating counter substrate is also prepared by a process similar to that described above. These substrates are overlapped to each other with a specific gap kept therebetween, and liquid crystal is enclosed in a gap therebetween and is sealed, to produce a liquid crystal display device having a duel microlens array structure. Such a dual microlens type liquid crystal display device is suitable, for example, for a light bulb of a projector. Since the microlens array functioning as condenser lenses for a liquid crystal layer and the other microlens array functioning as field lenses can be disposed in close-proximity to each other, it is possible to obtain an optimal function of the microlenses, and hence to significantly improve the effective aperture ratio of pixels.

BRIEF DESCRIPTION OF THE DRAWINGS

These and other objects, features, and advantages of the present invention will be more apparent from the following description in conjunction with the accompanying drawings, wherein:

FIGS. 1A to 1D are process diagrams showing a related art method of producing a liquid crystal display device;

DETAILED DESCRIPTION OF THE PREFERRED EMBODIMENTS

Hereinafter, a method of producing a microlens array, a liquid crystal display device using the microlens array, a projector using the liquid crystal display device, and a method of producing a liquid crystal display device according to the present invention will be described in this order with reference to the drawings, in which preferred embodiments are shown.

1. Method of Producing Microlens Array

A first embodiment of a method of producing a microlens array according to the present invention will be described with reference to FIGS. 4A to 4D.

Figure 2:
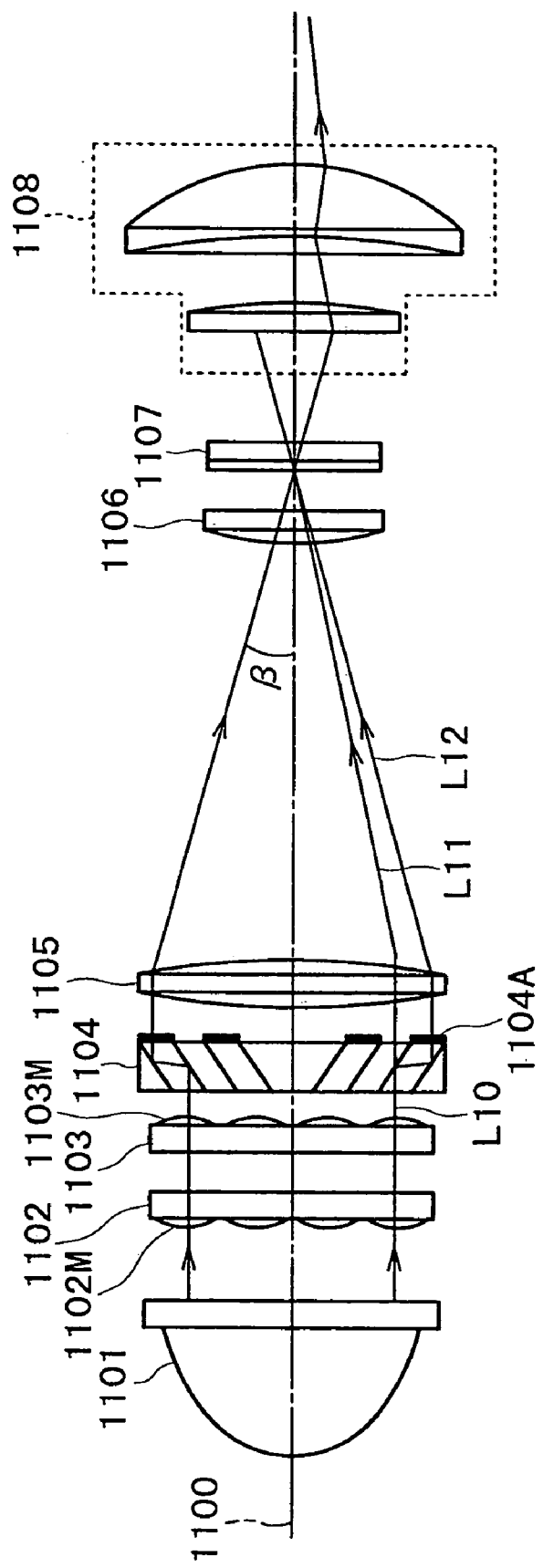
FIG. 2 is a typical diagram showing one example of a related art projector.
Figure 3:
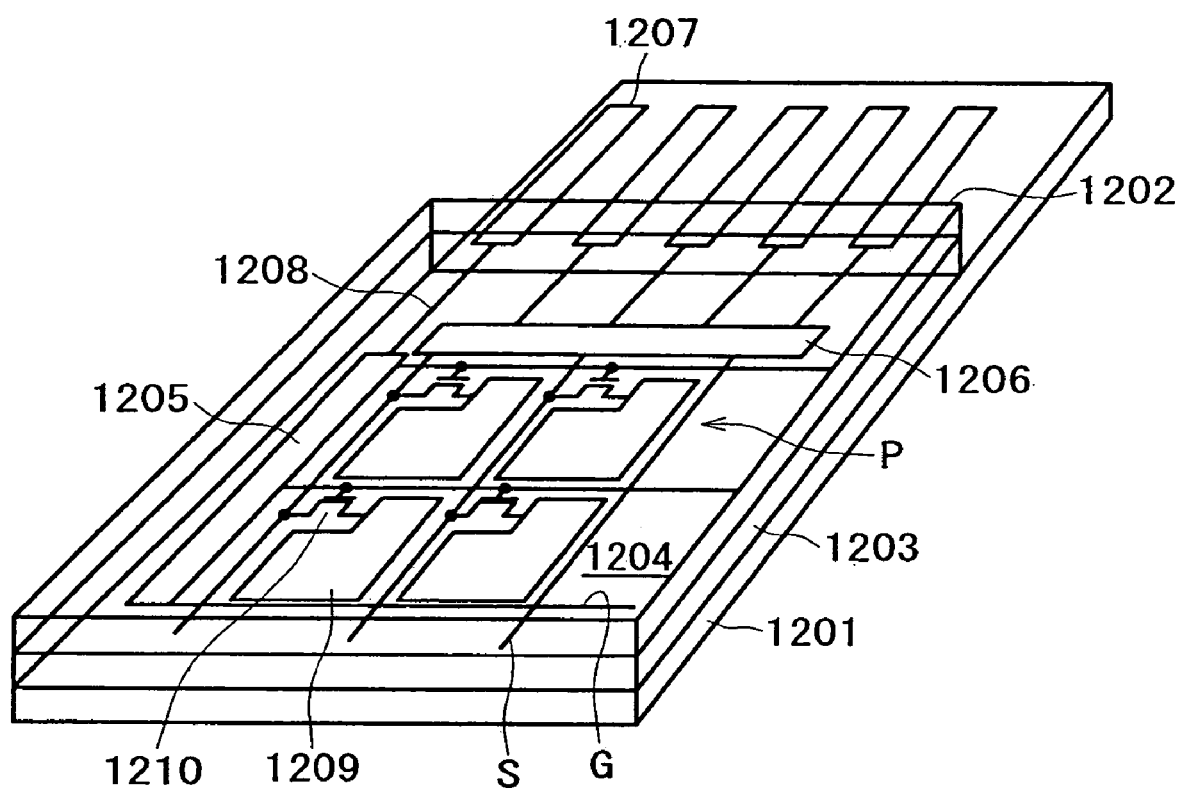
FIG. 3 is a typical perspective view showing one example of a liquid crystal display device to be assembled in the projector shown in FIG. 39.
Figure 4A:
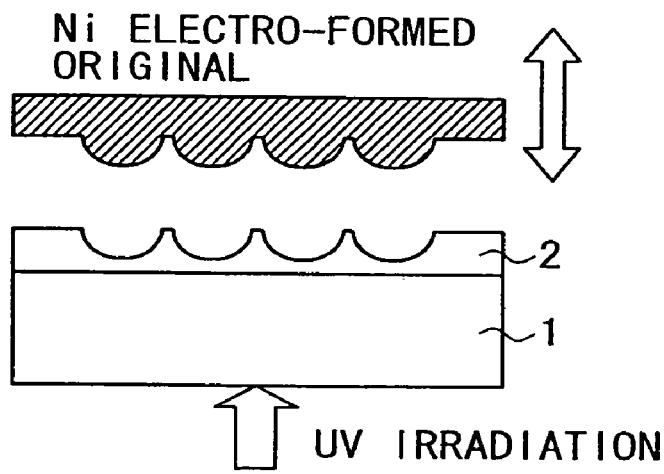
FIGS. 4A to 4D are process diagrams showing a method of producing a microlens array according to the present invention.

In a patterning step shown in FIG. 4A, a first optical resin layer 2 having a first refractive index is formed on a substrate 1 made from a transparent glass or the like, and a plurality of microlens planes arranged in a two-dimensional pattern are formed on the surface of the first optical resin layer 2. In this embodiment, the first optical resin layer 2 made from a UV-cured type resin having a low refractive index is previously formed on the glass substrate 1, and an Ni-electroformed original having a plurality of microlens planes is stamped on the surface of the first optical resin layer 2, to transfer the microlens planes to the surface of the first optical resin layer 2. The first optical resin layer 2 made from the UV-cured type resin is cured by irradiating the first optical resin layer 2 with ultraviolet rays from the back side of the glass substrate 1, to fix the microlens planes transferred to the first optical resin layer 2.

Figure 4B:
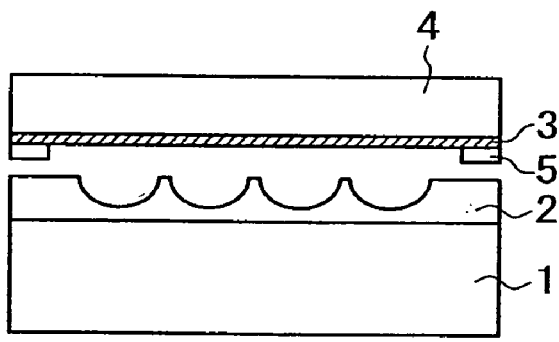

In a joining step shown in FIG. 4B, a support layer 4 on which a transparent protective film 3 is previously formed is joined to the glass substrate 1 side by a seal material 5. The support layer 4 is made from a cover glass. The protective film 3 previously formed on one surface of the support layer 4 functions as a polishing stopper at the time of polishing the support layer 4 made from the cover glass in the subsequent step. The protective film 3 may be made from an insulating material such as $SiO_2$, SiN, a-DLC (amorphous diamond-like carbon), or $Al_2O_3$. The seal material 5 for joining the support layer 4 to the glass substrate 1 side is composed of a resin applied along the outer peripheral portion of the support layer 4, and contains glass fibers having diameters ranging from 2 to 3 $\mu$m as a spacer. The support layer 4, the outer peripheral portion of which is coated with the sealer 5, is bonded on the glass substrate 1 side, to form an internal space therebetween.

Figure 4C:
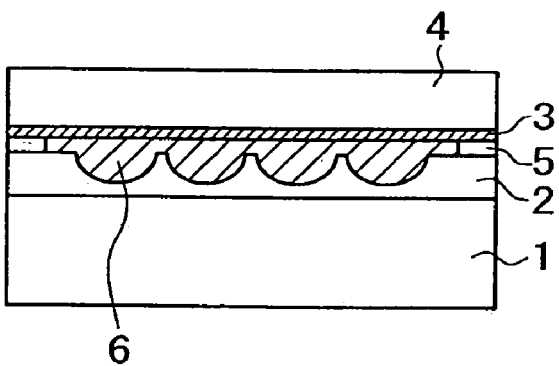

In a filling/planarizing step shown in FIG. 4C, the internal space surrounded by the first optical resin layer 2 and the protective film 3 is filled with a liquid resin having a second refractive index, and the liquid resin is cured, to form a microlens array between the first optical resin layer 2 and the protective film 3. In this embodiment, a resin having a high refractive index is injected under a vacuum in the internal space between the first optical resin layer 2 and the protective film 3, and is cured by heating. Alternatively, a UV-cured type resin may be injected in the internal space and cured by UV irradiation. In this way, irregularities of the microlens planes formed on the surface of the first optical resin layer 2 are filled with the liquid resin having the second refractive index, and simultaneously the surface, opposed to the microlens planes, of the resin is planarized. The resin is then cured, to form a second optical resin layer 6. The microlens array is thus formed by stacking the first optical resin layer 2 and the second optical resin layer 6 different in refractive index to each other. In this embodiment, since the liquid resin for forming the second optical resin layer 6 is injected in the gap between the glass substrate 1 and the support layer 4, the surface, opposed to the microlens array, of the second optical resin layer 6 is automatically planarized.

Figure 4D:
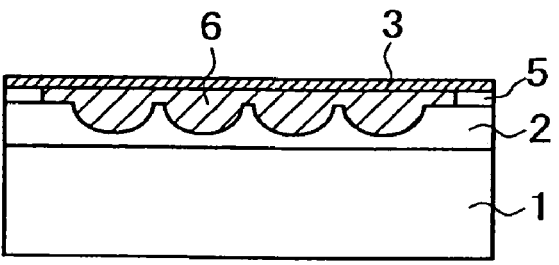

In a removing step shown in FIG. 4D, the support layer 4 made from the cover glass is removed by polishing or grinding with the protective film 3 used as a stopper until only the protective film 3 remains on the second optical resin layer 6.

With the series of these steps, a microlens array with no cover glass can be produced.

According to this embodiment, the joining step is performed before the filling/planarizing step in order to form a gap required for the next filling/planarizing step. To be more specific, the support layer 4 is joined to the first optical resin layer 2 with a specific gap kept therebetween, and the liquid resin is injected in the gap and then cured. In this step, the surface, opposed to the microlens planes, of the resin is simultaneously planarized.

The method of producing a microlens array according to the present invention is not limited to this embodiment but may include a patterning step of forming a first optical resin layer having a first refractive index on a transparent substrate and forming a plurality of microlens planes arranged in a two-dimensional pattern on the surface of the first optical resin layer, a filling/planarizing step of filling the irregularities of the microlens planes with a resin having a second refractive index and planarizing the surface, opposed to the microlens planes, of the resin, to form a second optical resin layer, a joining step of joining a support layer, on which a transparent protective film is previously formed, to the planarized second optical resin layer, and a removing step of removing the support layer until only the protective film remains on the second optical resin layer.

A second embodiment of the method of producing a microlens array according to the present invention will be described with reference to FIGS. 5A to 5C'. In this embodiment, the surface, opposed to a microlens array, of a resin is planarized by a stamping method.

Figure 5A:
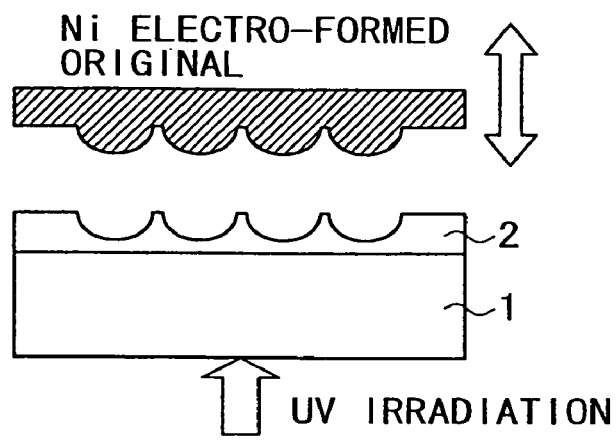
FIGS. 5A to 5C' are process diagrams showing another method of producing a microlens array according to the present invention.

In a patterning step shown in FIG. 5A, a first optical resin layer 2 having a first refractive index is formed on the surface of a glass substrate 1, and an Ni-electroformed original having a plurality of microlens planes is stamped to the surface of the first optical resin layer 2, to transfer the microlens planes to the surface of the first optical resin layer 2. Like the first embodiment, the first optical resin layer 2 is made from a UV-cured type resin having a low refractive index. The first optical resin layer 2 is irradiated with ultraviolet rays (wavelength: near 365 nm) at an energy of 3,000 mJ from the back side of the glass substrate 1, to cure the UV-cured type resin, thereby fixing the microlens planes transferred to the first optical resin layer 2.

Figure 5B:
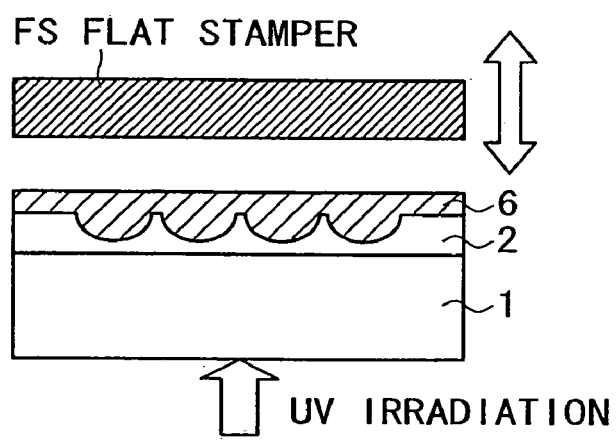

In a filling/planarizing step shown in FIG. 5B, the irregularities of the microlens planes are filled with a resin having a second refractive index, and the surface, opposed to the microlens planes, of the resin is planarized by a flat stamper FS, to form a second optical resin layer 6. In this embodiment, a UV-cured type resin having a high refractive index is dropped in the irregularities of the microlens planes, and the surface, opposed to the microlens planes, of the resin is planarized by the flat stamper FS. In such a state, the second optical resin layer 6 is cured by UV irradiation, to fix the planarized surface of the second optical layer 6. In addition, the liquid resin may be supplied to the irregularities of the microlens planes by spin-coating in place of dropping.

Figure 5C:
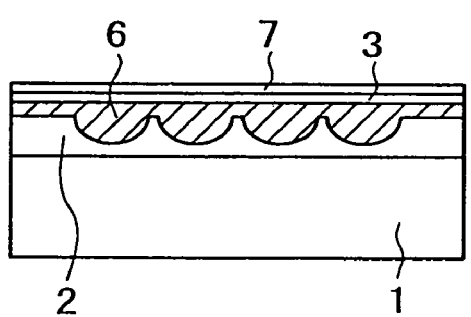
Figure 5C:
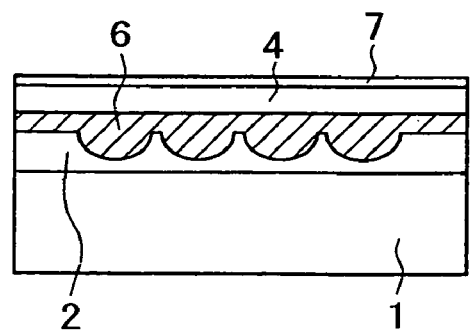

In a film formation step shown in FIG. 5C, a protective film 3 made from $SiO_2$ or SiN is formed on the surface of the planarized second optical resin layer 6 by CVD (Chemical Vapor Deposition) or sputtering, and then a transparent electrode 7 made from ITO (Indium Tin Oxide) is formed on the surface of the protective film 3.

A step shown in FIG. 5C' may be performed in place of the step shown in FIG. 5C. In this step, a thin cover glass layer 4 is bonded on the planarized second optical resin layer 3, and the transparent electrode 7 is formed on the cover glass layer 4. In this way, in the step shown in FIG. 5C', the cover glass layer 4 is used in place of the protective film 3 used in the step shown in FIG. 5C. If needed, the cover glass layer 4 may be thinned by polishing or grinding.

According to this embodiment, a substrate for a liquid crystal display, which includes a microlens array integrated with the transparent electrode, can be thus produced. Such a substrate is advantageous in that since the surface of the microlens array is planarized, the substrate does not cause any unnecessary stress when being assembled in a liquid crystal display device. In particular, by adopting the step shown in FIG. 5C, the microlens array without cover glass can be produced. This is advantageous in reducing the production cost.

A third embodiment of the method of producing a microlens array will be described with reference to FIGS. 6A to 6D. In this embodiment, the surface, opposed to a microlens array, of a resin is planarized by a spin-coating method.

Figure 6A:
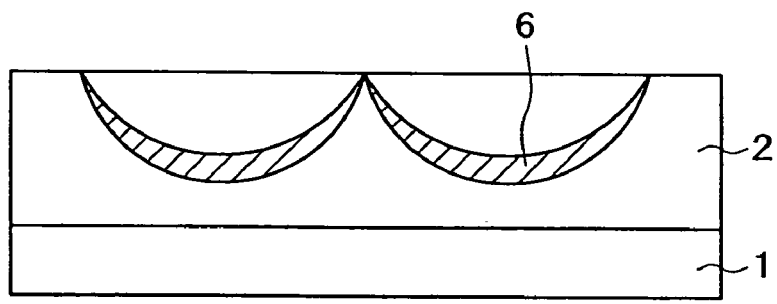
FIGS. 6A to 6D are process diagrams showing essential steps of a further method of producing a microlens array according to the present invention.

In a first spin coating step shown in FIG. 6A, after a first optical resin layer 2 having a first refractive index is formed on a transparent glass substrate 1 and a plurality of microlens planes (depth: about 7 $\mu$m) arranged in a two-dimensional pattern are formed on the surface of the first optical resin layer 2, first spin coating is performed. In this first spin coating, the microlens planes are coated with a liquid resin having a viscosity of about 100 cps at a rotating speed ranging from 500 to 1,000 rpm. As a result, a second optical resin layer 6 is formed on the bottoms of the microlens planes.

Figure 6B:
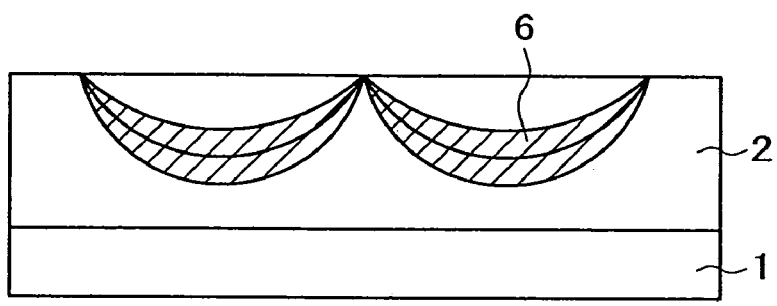

In a second spin coating step shown in FIG. 6B, second spin coating is performed by re-coating the recessed microlens planes with a liquid resin having a viscosity of about 100 cps at a rotating speed ranging from 500 to 1,000 rpm.

Figure 6C:
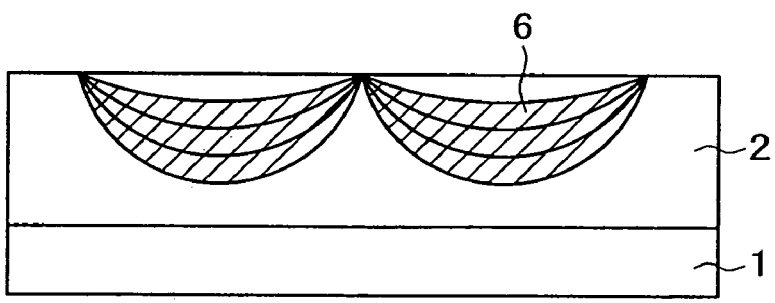

In a third spin coating step shown in FIG. 6C, third spin coating is performed by re-coating the recessed microlens planes with a liquid resin having a viscosity of 100 cps by a centrifugal force generated by rotation at a rotating speed ranging from 500 to 1,000 rpm. As a result of repeating the spin coating by three times, the recessed microlens planes are nearly filled with the second optical resin layer 6.

Figure 6D:
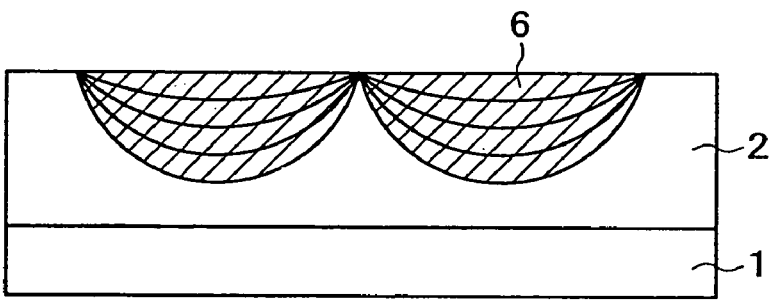

Finally, in a fourth spin coating step shown in FIG. 6D, fourth spin coating is performed so as to perfectly fill the microlens planes with a resin and planarize the surface, opposed to the microlens planes, of the resin. In this step, the rotating speed of a spin coater is set to a high value in a range of 3,000 to 5,000 rpm for smoothening the surface, opposed to the microlens planes, of the resin.

The spin coating method may be replaced by a spraying method. In this spraying method, the viscosity of a liquid resin is set to a several ten cps by using a solvent, and the liquid resin is sprayed while being atomized into particles having sizes of several ten $\mu$m, and then dried. The spraying may be performed such that the particles of the liquid resin be flattened by surface tensions thereof. Such spraying and drying of the resin are repeated. If any solvent is not used, a resin having a low viscosity may be used.

In addition to the above-described simple microlens array, a duel microlens array formed by stacking a microlens array functioning as a condenser lens to a microlens array functioning as a field lens has been developed. As compared with a single microlens array, a duel microlens array is advantageous in improving a utilization efficiency of light.

In a general three-panel type liquid crystal projector, the divergence angle of light emitted from a light source and made incident on a microlens array is often set to about 10°. In the case of using a microlens array, since the divergence angle of light on the emergence side of a liquid crystal panel becomes large, even if the divergence angle of incident angle is made excessively large, the light is kicked by a projection lens, to rather reduce the utilization efficiency of light. Also, from the viewpoint of preventing a reduction in contrast along with an increase in divergence angle of light made incident on a liquid crystal panel, the incident angle is restricted to some extent.

On the contrary, in the case of a duel microlens array structure, since a second lens (field lens) is disposed so as to be apart from a first lens (condenser lens) by a focal distance of the second lens in the direction of incident light, the divergence angle of light emerging from a (field lens arranged type) panel is controlled by the divergence angle due to a lens power of the duel microlens array, to reduce the degree of kicking of light by a projection lens, thereby raising the utilization efficiency of light.

Dual microlens arrays (DMLs) have two kinds of arrangement structures for the liquid crystal panels. In general, an active matrix type liquid crystal panel has a stacked structure formed by joining a drive substrate provided with switching devices such as thin film transistors, pixel electrodes, and the like to a counter substrate provided with a counter electrode and holding liquid crystal between the drive substrate and the counter substrate. The first kind of the DML arrangement structure is characterized in that a DML is disposed on the counter substrate side. The second kind of the DML arrangement structure is characterized in that one microlens array of a DML is disposed on the counter substrate side and the other microlens array of the DML is disposed on the drive substrate side, wherein liquid crystal is held therebetween.

Such a DML must cope with the tendency toward high definition of pixels. To reduce panel sizes, pixel sizes must be reduced in proportion to the reduced panel sizes, and correspondingly, an arrangement pitch of individual microlenses must be reduced. As a result, it is required to shorten the focal distances of microlenses and also to thin a cover glass. Of these requirements, the shortening of the focal distances of microlenses can be relatively easily realized; however, the thinning of a cover glass is more difficult than that in the case of a single microlens array.

The DML structure is generally produced by sticking two pieces of single microlens arrays (SMLs) to each other. In this case, to meet the requirement toward high definition, the thickness and the like of each of a cover glass and an optical resin layer in each SML must be more strictly controlled than those in an ordinary SML.

Figure 7:
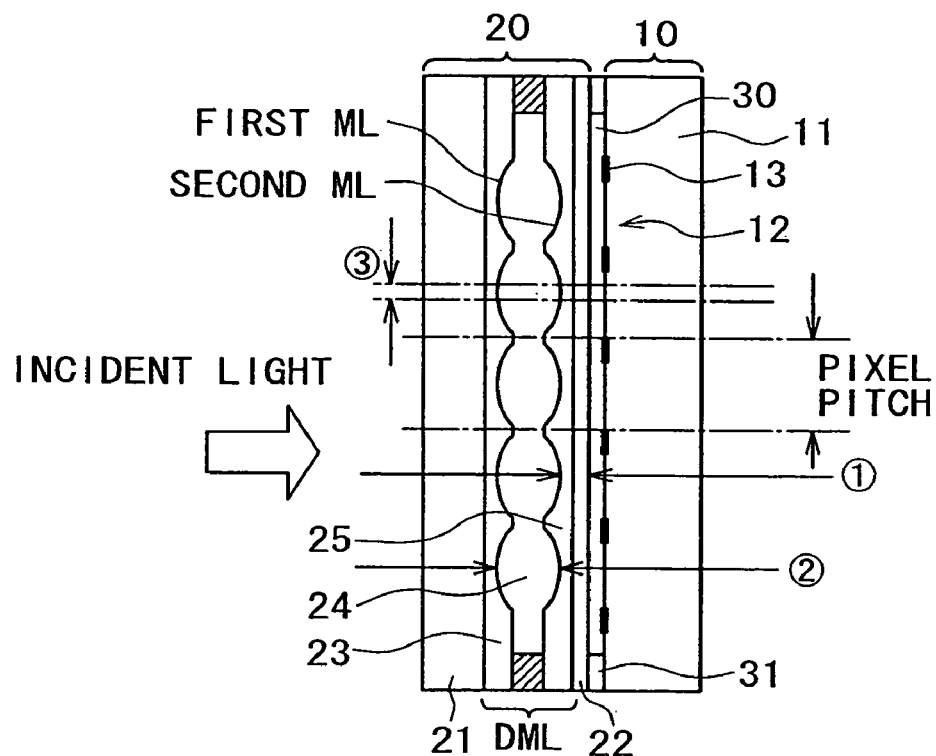
FIG. 7 is a typical sectional view showing a reference example of a duel microlens array.

A basic configuration of a liquid crystal display device (liquid crystal panel) in which a DML is formed on the counter substrate side and a problem thereof to be solved will be described with reference to FIG. 7. As shown in the figure, a liquid crystal display device has a stacked structure formed by joining a drive substrate 10 to a counter substrate 20 by a seal material 31, and enclosing liquid crystal in a gap between both the substrates 10 and 20. The drive substrate 10 is formed of a glass base 11, on the surface of which switching devices such as thin film transistors and pixels 12 including pixel electrodes are integrated in a matrix pattern. The pixels 12 are partitioned from each other by a lattice-shaped black matrix 13.

A dual microlens array DML and a counter electrode (not shown) are formed on the counter substrate 20. The DML is held between a glass substrate 21 and a cover glass 22, and has a stacked structure formed by stacking a low refractive index resin layer 23, a high refractive index resin layer 24, and a low refractive index resin layer 25 to each other. The low refractive index resin layers 23 and 25 are each made from a fluorine-based resin, a silicon-based resin, or an acrylic-based resin, and the high refractive index resin layer 24 is made from an acrylic-based resin, an epoxy-based resin, or a thiourethane-based resin. A first ML (condenser lens) is formed at the interface between the low refractive index resin layer 23 and the high refractive index resin layer 24, and a second ML (field lens) is formed at the interface between the high refractive index resin layer 24 and the low refractive index resin layer 25.

As the pixel pitch becomes narrow along with the tendency toward high definition of pixels, it becomes important to improve control and accuracy of a distance ① between the principal point of the second ML and the surface of the cover glass 22, a distance ② between the principal point of the first ML and the principal point of the second ML, and an alignment value ③ between the first ML and the second ML. These parameters ①, ②, and ③ determine the light collection ratio of the DML. Of these parameters, the distance ② between the principal point of the first ML and the principal point of the second ML is required to be strictly controlled for realizing the function of the field type DML.

Figure 8:
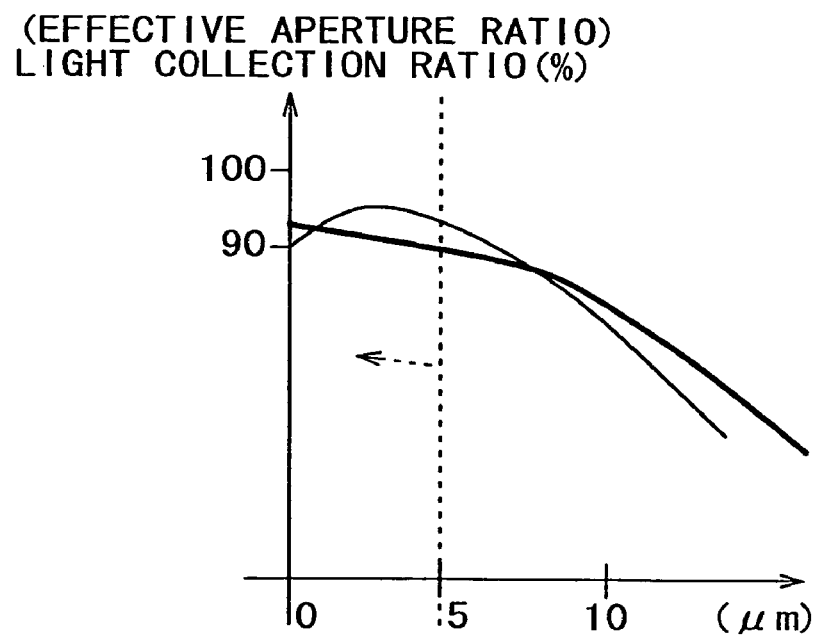
FIG. 8 is a graph showing optical characteristic of the microlens array shown in FIG. 7.

FIG. 8 is a graph showing a dependency of a light collection ratio on the parameter ① (distance between the principal point of the second ML and the surface of the cover glass). It is to be noted that the light collection ratio is expressed in effective aperture ratio of pixels. As is apparent from the graph, to obtain a very high value of the light collection ratio, it is preferred to set the parameter ① in a range of about 5 μm or less, and to keep a relatively high value of the light collection ratio, it is preferred to set the parameter ① in a range of 10 μm or less. Accordingly, it is required to make the thickness of the cover glass 22 of the second ML very thin. The graph of FIG. 8 shows two curves different in parameters. Even on the basis of either of these curves, it is apparent that the parameter ① should be suppressed in the range of 10 μm or less. It is to be noted that the graph of FIG. 8 is obtained by plotting data measured under a condition that the pixel pitch is set to 18 μm × 18 μm and the divergence angle of light emitted from a light source and made incident on the panel is set to 10°.

2. Liquid Crystal Display Device

A first embodiment of a liquid crystal display device according to the present invention will be described with reference to FIGS. 9A to 9E.

FIGS. 9A to 9E are typical process diagrams showing steps of forming a liquid crystal display device in this embodiment.

This embodiment is characterized in that a dual microlens array is formed on the counter substrate side.

Figure 9A:
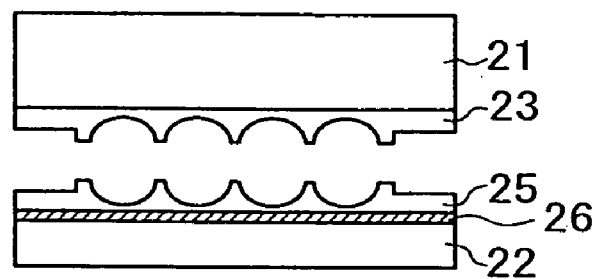
FIGS. 9A to 9E are process diagrams for illustrating a liquid crystal display device according to the present invention.

FIG. 9A shows the step of preparing a first ML substrate and a second ML substrate. A resin layer 23 having a low refractive index, on the surface of which microlens planes are previously formed by a stamping method, is formed on a first ML substrate 21. A protective film 26 is formed as a polishing stopper on a second ML substrate 22, and a resin layer 25 having a low refractive index, on the surface of which microlens planes are previously formed by a stamping method, is formed on the protective film 26. The protective film 26 is made from $Al_2O_3$ or a-DLC. At the time of polishing the second ML substrate 22 in the subsequent step, the protective film 26 functions as a stopper capable of ensuring the uniformity of polishing. The film made from $Al_2O_3$ or a-DLC is transparent, and may have a thickness of about 100 nm or more to function as an effective stopper. The protective film 26 can be formed by a sputtering process or a PECVD (Plasma Enhanced Chemical Vapor Deposition) process. The stopper film is not necessarily transparent. For example, the stopper film may be formed by depositing a-Si or the like to a thickness of about 1 μm. The microlens planes formed on each of the low refractive index resin layers 23 and 25 have aspheric shapes (ellipsoids or hyperboloids) having a curvature radius and an aspheric constant specified so as to be matched with a pixel pitch and thereby to obtain the maximum light correction efficiency.

Figure 9B:
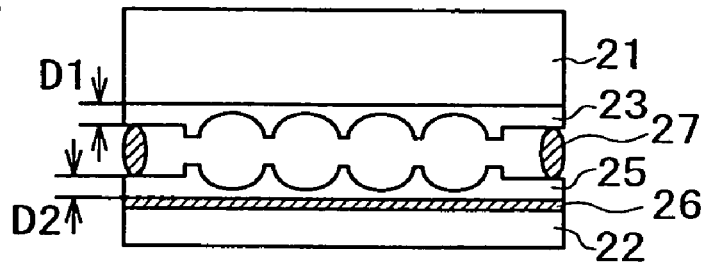

FIG. 9B shows the step of joining the first ML substrate and the second ML substrate to each other. An outer peripheral portion of one of the first ML substrate 21 and the second ML substrate 22 is coated with a seal material 27 composed of an epoxy resin or acrylic resin. After alignment marks of the first ML substrate 21 and the second ML substrate 22 are aligned with each other, the first ML substrate 21 and the second ML substrate 22 are overlapped to each other. The epoxy resin or acrylic resin used for the seal material 27 is of a UV-cured type or a UV-cured/thermally-cured combination type. The resin used as the seal material 27 previously contains glass fibers or plastic beads as a spacer in an amount of 1 to 5 wt % in order to make the distance between the principal point of the first ML and the principal point of the second ML correspond to the focal distance of the second ML. For example, if pixels are arranged with a pixel pitch of 18 μm, the focal distance (equivalent value in air) of the first ML is about 65 μm and the focal distance (equivalent value in air) of the second ML is about 40 μm; and the aspheric constant K of each of the first ML and the second ML is about −1.3. In addition, the refractive index of the low refractive index resin is set in a range of 1.41 to 1.45 and the refractive index of a high refractive index resin to be described later is set in a range of 1.60 to 1.66. In this case, to satisfy the condition of field arrangement, the distance (equivalent value in air) between the principal point of the first ML and the principal point of the second ML is required to be set to about 40 μm. Accordingly, in the case of filling a gap between the first and second ML substrates 21 and 22 with a high refractive index resin having a refractive index of 1.60 in the subsequent step, the thickness of the sealing material 27 may be set to a value capable of ensuring a gap dimension of about 40/1.6 = 25 μm. Concretely, the particle size of plastic beads contained in the seal material 27 may be nearly set to a value calculated from an equation of [25 μm−(D1+D2)] where D1 is the thickness of the low refractive index resin layer 23 and D2 is the thickness of the low refractive index resin layer 25 as shown in FIG. 9B. In actual, such determination of the thickness of the seal material 27 must be made in consideration of depression of the resin at the time of pressing the resin.

Figure 9C:
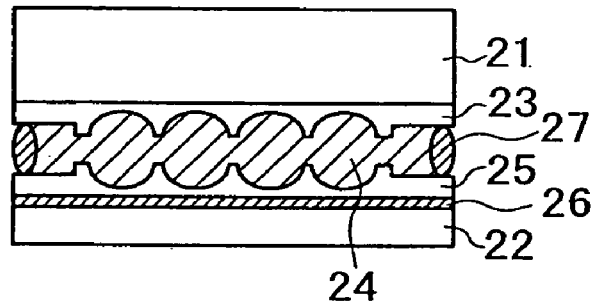

FIG. 9C shows the step of forming a duel microlens array between the first and second ML substrates. A high refractive index resin 24 is injected under vacuum in a gap between the first ML substrate 21 and the second ML substrate 22 joined to each other by the seal material 27, to form a duel microlens array. In the case of a pixel pitch of 14 μm, an alignment accuracy between the first ML substrate 21 and the second ML substrate 22 is preferably set in a range of less than ±1.0 μm. The high refractive index resin 24 injected between the first ML substrate 21 and the second ML substrate 22 is cured by heating. If the resin 24 is of a UV-cured type resin, the resin 24 is cured by UV irradiation. If needed, the resin 24 may be kept in a liquid state between the first ML substrate 21 and the second ML substrate 22.

Figure 9D:
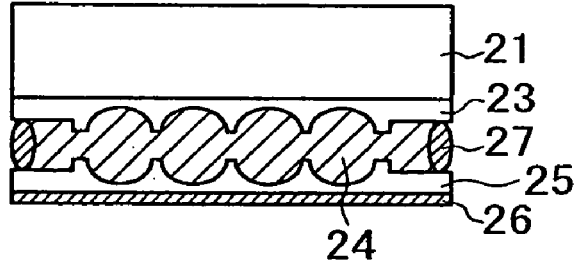

FIG. 9D shows the step of removing the second ML substrate by polishing or grinding. The second ML substrate 22 is removed by polishing or grinding until the removal depth reaches the protective film 26 functioning as the stopper. Concretely, the second ML substrate 22 may be polished by a CMP (Chemical-Mechanical Polishing) process using, for example, $Ce_2O_3$. If the protective film 26 is made from a-Si (amorphous silicon), after the a-Si film (protective film) 26 functioning as the stopper is exposed by polishing, the a-Si film 26 can be removed by polishing using silica.

By the removal of the second ML substrate 22, a structure having the DML on the counter substrate side can be obtained. In this step, since the polishing is performed with the protective film used as the stopper, it is possible to perfectly remove the second ML substrate (cover glass), and also to increase the uniformity of polishing and hence to improve the light utilization efficiency and the image quality.

Figure 9E:
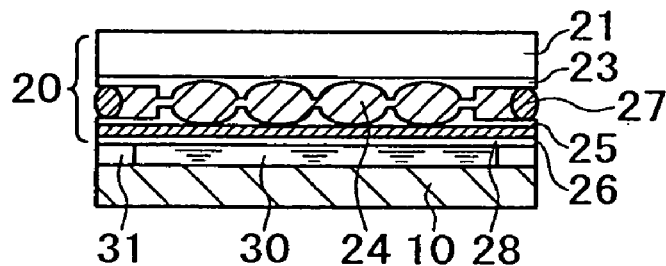

FIG. 9E shows the step of finishing a liquid crystal display device. A counter electrode 28 is formed on the surface, exposed by polishing, of the protective film 26, to obtain a counter substrate 20 integrated with the DML. A drive substrate 10 is joined to the counter substrate 20 via a seal material 31, and liquid crystal 30 is enclosed in a gap therebetween, to obtain a liquid crystal display device. In addition, switching devices such as thin film transistors (TFTs) and pixel electrodes are previously integrated on the surface of the drive substrate 10.

As described above, the liquid crystal display device according to this embodiment has a panel structure including the drive substrate 10 on which at least pixel electrodes and switching devices for driving the pixel electrodes are formed, the counter substrate 20 on which at least the counter electrode 28 is formed, and the liquid crystal layer 28 disposed between both the substrates 10 and 20 joined such that the pixel electrodes are opposed to the counter electrode 28 with a specific gap put therebetween. The microlens array composed of the microlenses arranged in a two-dimensional pattern corresponding to the arrangement pattern of the pixel electrodes is assembled at least in the counter substrate 20.

As the feature of the liquid crystal display device according to this embodiment, the microlens array has the back surface joined to the first ML substrate 21 constituting the counter substrate 20 and the planarized front surface.

The counter electrode 28 is formed on the planarized surface of the microlens array via the protective film 26. To be more specific, the protective film 26 previously formed on the support (second ML substrate 22) is bonded on the planarized surface of the microlens array, the protective film 26 is exposed by removing the support (second ML substrate 22), and the counter electrode 28 is formed on the exposed protective film 26. As described above, the protective film 26 can be made from $Al_2O_3$, a-DLC, $TiO_2$, SiN, or Si.

According to this embodiment, the microlens array is configured as a duel microlens array of a double structure having a first microlens array which is disposed on the side apart from the liquid crystal layer 30 and which functions as a condenser lens, and a second microlens array which is disposed on the side close to the liquid crystal layer 30 and which functions as an approximately field lens. The distance between the principal point of each microlens of the second microlens array and the liquid crystal layer 30 is specified to be in a range of 10 $\mu$m or less.

FIGS. 10A to 10E are process diagrams showing steps of forming a liquid crystal display device as a reference example. In these figures, for an easy understanding, parts corresponding to those of the liquid crystal display device according to the embodiment shown in FIGS. 9A to 9E are denoted by the same reference numerals.

This reference example is different from the embodiment shown in FIGS. 9A to 9E in that any protective film functioning as a polishing stopper is not interposed between a second ML substrate (cover glass) and a low refractive index resin layer.

Figure 10A:
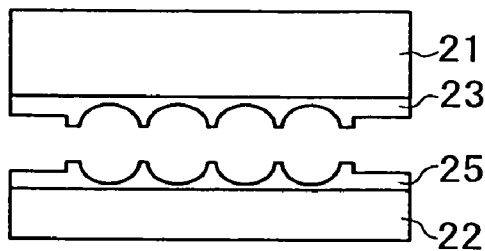
FIGS. 10A to 10E are process diagrams for illustrating another liquid crystal display device according to the present invention.
Figure 10B:
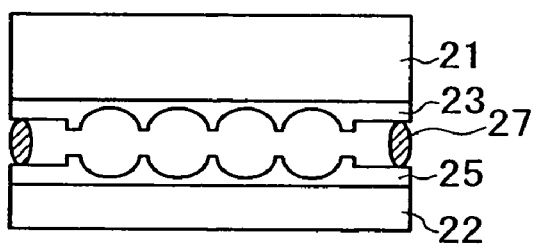
Figure 10C:
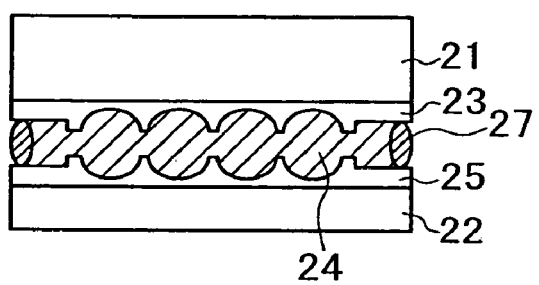

In a step shown in FIG. 10A, a first ML substrate 21 and a second ML substrate 22 are disposed opposite to each other; in a step shown in FIG. 10B, the first ML substrate 21 and the second ML substrate 22 are joined to each other by a seal material 27; and in a step shown in FIG. 10C, a gap between the first ML substrate 21 and the second ML substrate 22 joined to each other is filled with a high refractive index resin 24. A duel microlens array is thus formed.

Figure 10D:
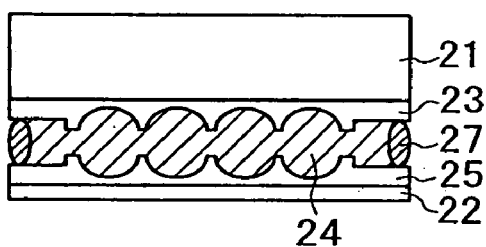
Figure 10D:
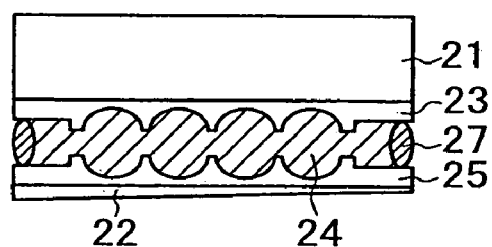

In a step shown in FIG. 10D, the second ML substrate (cover glass) 22 is removed by polishing or grinding. In this step, as described above, by thinning the thickness of the cover glass to about 10 $\mu$m, the distance (equivalent value in air) between the principal point of the second ML and the surface of the cover glass can be substantially set to a value in a range of 5 $\mu$m or less. However, in the case of thinning the cover glass to about 10 $\mu$m by polishing without using any stopper, since the remaining thickness of the cover glass becomes too thin, the cover glass may be often obliquely polished as shown in FIG. 10D', or during the polishing step, the cover glass may be cracked, leading to breakage thereof. This causes a variation in light collection efficiency or a stray of the boundary between the glass and resin in an image upon projection thereof, to thereby significantly degrade the image quality.

Figure 10E:
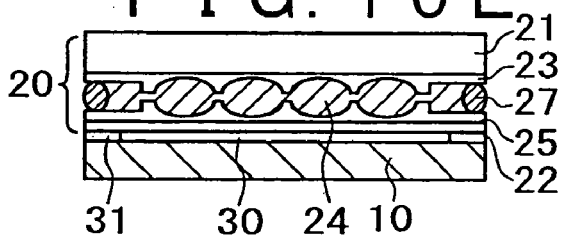

In a step shown in FIG. 10E, a counter electrode (not shown) made from ITO or the like is formed on the polished surface of the second ML substrate 22, to form a counter substrate 20, and the counter substrate is joined to a drive substrate 10 and then liquid crystal 30 is enclosed in a gap therebetween, to obtain a liquid crystal panel. For the liquid crystal panel thus obtained, if the thickness of the second ML substrate 22 is not uniformly polished, such a liquid crystal panel may cause a stray of the boundary between the cover glass 22 and the low refractive index resin layer 25 in an image upon projection thereof, to thereby significantly degrade the image quality.

A second embodiment of the liquid crystal display device according to the present invention will be described with reference to FIGS. 11A to 1E.

FIGS. 11A to 11E are process diagrams showing steps of forming a liquid crystal display device in this embodiment.

This embodiment is characterized in that a dual microlens array is formed on the counter substrate side, and that the method of forming a single microlens array (SML) shown in FIGS. 4A to 4D are applied to a method of forming a duel microlens array.

Figure 11A:
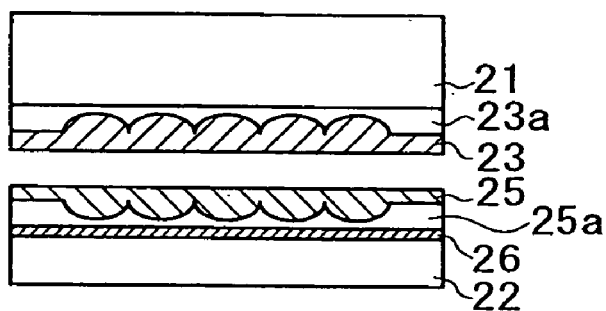
FIGS. 11A to 11E are process diagrams for illustrating a further liquid crystal display device according to the present invention.

FIG. 11A shows the step of forming a first microlens array and a second microlens array.

An optical resin layer 23a is formed on a first support 21 and first microlens planes arranged in a two-dimensional pattern are formed on the surface of the optical resin layer 23a. The irregularities of the first microlens planes are filled with an optical resin 23 having a refractive index different from that of the optical resin layer 23a, and the surface, opposed to the microlens planes, of the optical resin 23 is planarized, to thereby form a first microlens array. In this embodiment, the optical resin 23 used to fill the irregularities of the microlens planes has a low refractive index such as about 1.4. The surface of the optical resin 23 may be planarized by the above-described stamping method, spin-coating method, or spraying method.

Similarly, a protective film 26 functioning as a polishing stopper is formed on a second support 22 and an optical resin layer 25a is formed on the protective film 26, and then second microlens planes arranged in a two-dimensional pattern are formed on the surface of the optical resin layer 25a. The irregularities of the second microlens planes are filled with an optical resin 25 having a refractive index different from that of the optical resin layer 25a, and the surface, opposed to the microlens planes, of the optical resin 25 is planarized, to form a second microlens array. The optical resin 25 also has a low refractive index of about 1.4. The surface of the optical resin 25 filling the microlens planes may be planarized by the above-described stamping method, spin-coating method, or spraying method.

Figure 11B:
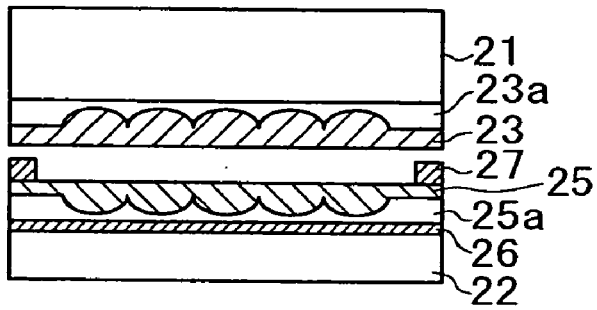

FIG. 11B shows the step of overlapping the first and second microlens arrays. An outer peripheral portion of one of the supports 21 and 22 is coated with a seal material 27. The supports 21 and 22 are aligned to each other on the basis of alignment marks and overlapped to each other. The seal material 27 contains a spacer such as high accurate plastic fibers so as to keep the thickness of the seal material 27 in a range of 10 μm or less.

Figure 11C:
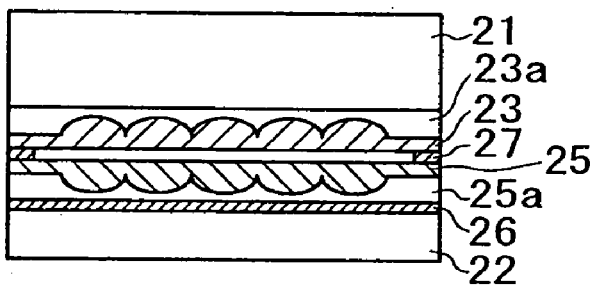

FIG. 11C shows the step of integrating the first and second microlens arrays with each other. The planarized surface of the first microlens array is joined to the planarized surface of the second microlens array in a state that the first microlens planes are aligned to the second microlens planes, to integrate both the microlens arrays with each other. As a result, a gap equivalent to the thickness of the seal material 27 is formed between the supports 21 and 22.

Figure 11D:
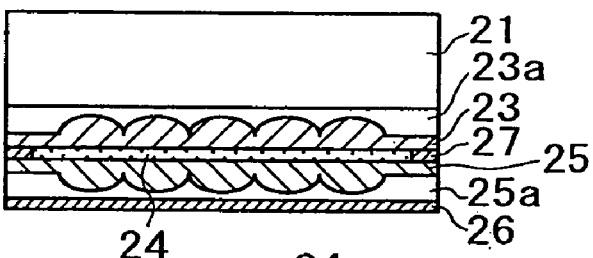

FIG. 11D shows the step of forming a duel microlens array by injecting a resin in the gap. A high refractive index resin 24 having a refractive index of about 1.6, which resin is in a liquid state, is injected in the gap specified by the thickness of the seal material 27. The resin 24 is then cured by heating, to form a duel microlens array. It is preferred to very slowly cure the high refractive index resin 24 filling the gap in order that stress does not remain in the resin 24. The support 22 is removed by polishing with the protective film 26 used as the polishing stopper, to expose the surface of the protective film 26. A counter electrode made from ITO or the like is formed on the surface of the exposed protective film 26, to form a counter substrate 20.

Figure 11E:
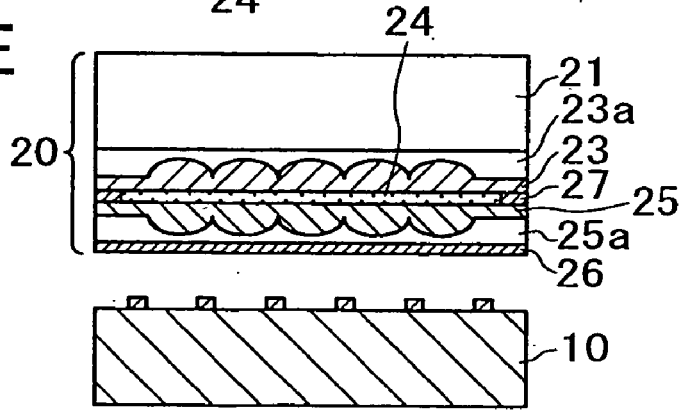

FIG. 11E shows the step of finishing a liquid crystal display device. The counter substrate 20 is joined to a previously prepared drive substrate 10, and liquid crystal is enclosed therebetween. In this way, a liquid crystal panel is obtained.

According to this embodiment, since the single microlens arrays each of which is previously planarized are joined to each other, it is possible to obtain a high accurate duel microlens array structure with no stress.

Figure 12:
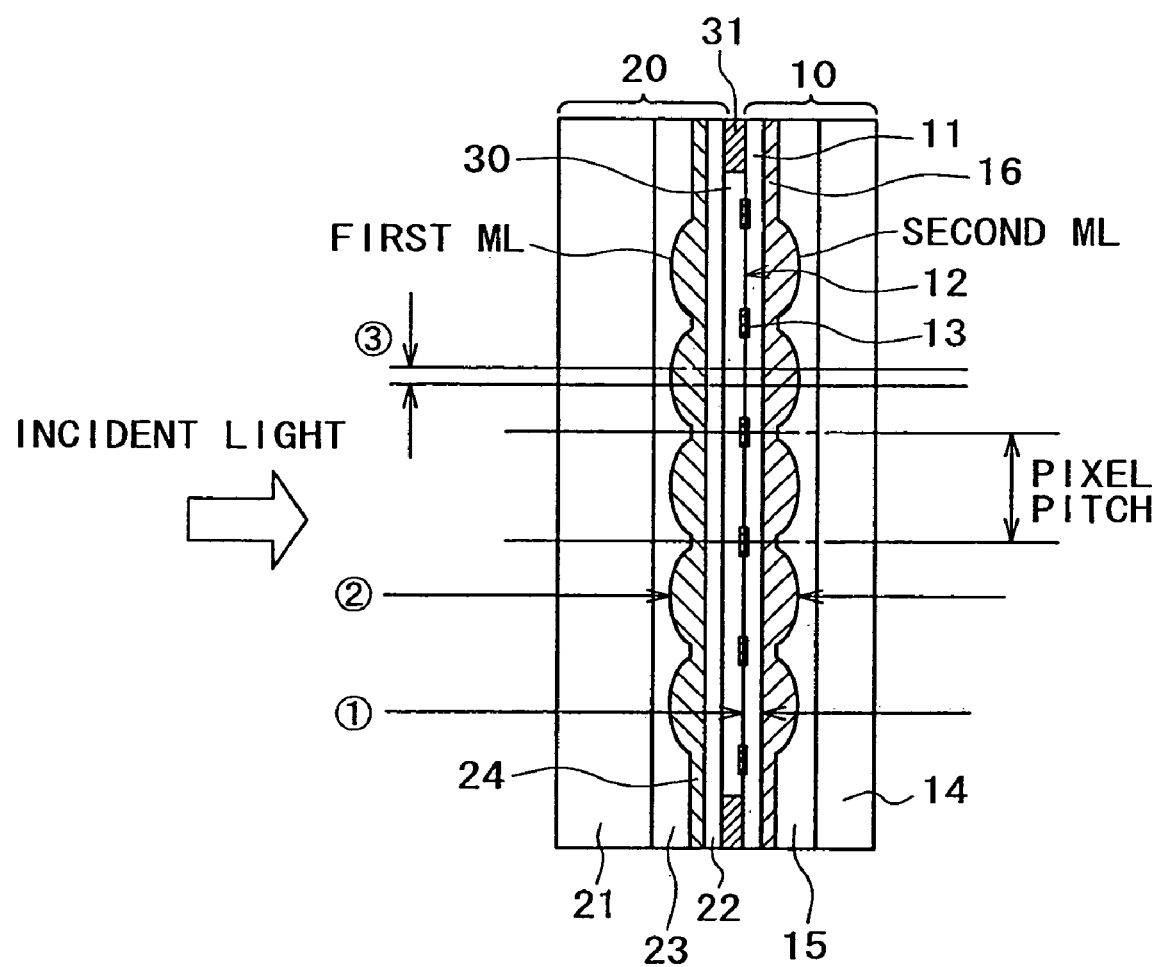
FIG. 12 is a typical partial sectional view showing a reference example of a general liquid crystal display device.

FIG. 12 is a reference diagram showing a general configuration of a liquid crystal display device having a DML structure in which one microlens array is disposed on the counter substrate side and the other microlens array is disposed on the drive substrate side. A liquid crystal display device shown in the figure has a panel structure that a drive substrate 10 and a counter substrate 20 are joined to each other by a seal material 31 and liquid crystal is enclosed therebetween. The counter substrate 20 is composed of a glass substrate 21 and a cover glass 22. A first ML is interposed between the glass substrate 21 and the cover glass 22, wherein the first ML functions as a condenser lens is located on the incident side. The first ML is formed by stacking resin layers 23 and 24 different in refractive index to each other.

The drive substrate 10 is generally composed a TFT substrate 11 on which thin film transistors and pixel electrodes are integrated. The TFT substrate 11 is generally thinned by polishing. Pixels 12 are integrated on the surface of the TFT substrate 11. The pixels 12 are partitioned from each other by a lattice-shaped black matrix 13. A second ML functioning as a field lens is interposed between the TFT substrate 11 and an auxiliary substrate on the back side. The second ML is also formed by stacking resin layers 15 and 16 different in refractive index to each other.

In the liquid crystal panel having such a DML structure, the thickness ① of the TFT substrate 11 after polishing, the distance ② between the principal point of the first ML and the principal point of the second ML, and the alignment accuracy ③ between the first ML and the second ML are important function parameters.

The parameter ②, which is the distance between the principal point of the first ML and the principal point of the second ML, is required to correspond to the focal distance of the second ML in order to realize the so-called field arrangement. In actual, if there is an offset of about 10% between the distance between both the principal points and the focal distance of the second ML, the second ML acts as an approximately field lens. For this purpose, the parameter ①, which is the thickness of the TFT substrate 11 after polishing, is required to be as small as about 10 to 50 μm.

With respect to formation of the TFT substrate having such a small thickness, however, there arise problems that the TFT substrate may cause cracking or chipping during polishing, and also may cause strain or wrinkle due to shrinkage upon curing of a resin during formation of the second ML.

As will be described below, such problems can be solved by making use of the above-described planarizing technique according to the present invention.

To improve the luminance of a liquid crystal projector, the structure that one of the microlens arrays of the DML is formed on the drive substrate side and the other is formed on the counter substrate side as shown in FIG. 9 is superior to the structure that the microlens arrays of the DML are both formed on the counter substrate side.

In the case of forming the microlens arrays of the DML on the counter substrate side, although light is effectively collected by the microlens arrays of the DML, the collected light may be kicked by a non-effective resin such as a black matrix surrounding the pixels on the drive substrate side, to reduce the effective aperture ratio. On the contrary, in the structure that one of the microlens arrays of the DML is disposed on the drive substrate side and the other is disposed on the counter substrate side, by shortening the focal distance of the first ML, it is allowed for light emitted from a light source to be collected as much as possible, and it is allowed for such a large quantity of collected light to pass through pixel apertures on the TFT substrate side. Meanwhile, the second ML is disposed as a field lens while being opposed to the first ML with the TFT substrate put therebetween in such a manner that the principal point of the second ML is apart from the principal point of the first ML by the focal distance of the second ML.

A third embodiment of the liquid crystal display device according to the present invention will be described with reference to FIGS. 13A to 13F.

FIGS. 13A to 13F are process diagrams showing steps of forming a liquid crystal display device in this embodiment.

This embodiment is characterized in that one of microlens arrays of a DML structure is disposed on the drive substrate side and the other is disposed on the counter substrate side.

Figure 13A:
FIGS. 13A to 13F are process diagrams for illustrating a further liquid crystal display device according to the present invention.

FIG. 13A shows the step of preparing a TFT substrate. A TFT substrate 11 on which TFTs and pixel electrodes are previously formed is prepared. In the figure, only a black matrix 13 for partitioning pixels from each other is shown, with TFTs and pixel electrodes not shown.

Figure 13B:

FIG. 13B shows the step of sticking a base glass to the TFT substrate. A base glass 40 is stuck on the surface of the TFT substrate 11 via an adhesive 41 such as wax.

Figure 13C:
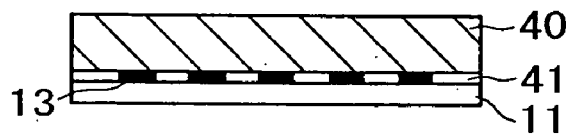

FIG. 13C shows the step of polishing the TFT substrate. The back surface of the TFT substrate 11 in a state being held by the base glass 40 is polished to a thickness of 20 μm or less.

Figure 13D:
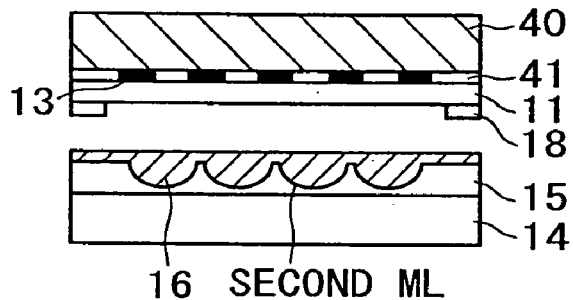

FIG. 13D shows the step of preparing a glass substrate with a second ML. A glass substrate 14 on which a second ML is previously formed is prepared. The second ML has a structure formed by stacking resin layers 15 and 16 different in refractive index to each other. The surface, opposed to microlens planes, of the second resin layer 16 is planarized by the above-described stamping method or spin-coating method. A peripheral portion of the polished back surface of the TFT substrate 11 is coated with a seal material 18 having a thickness of 2 to 3 μm.

Figure 13E:
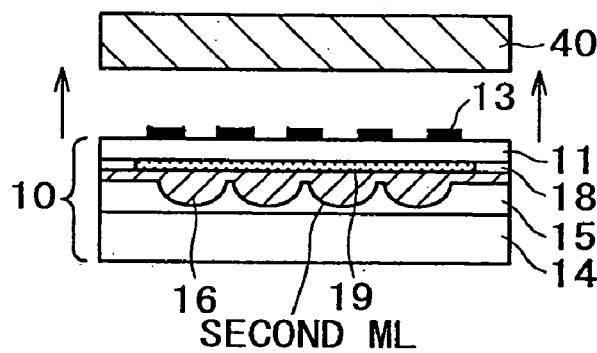

FIG. 13E shows the step of forming a drive substrate by joining the TFT substrate to the glass substrate. In a state that pixels formed on the TFT substrate 11 side are aligned to the second ML formed on the glass substrate 14 side, the TFT substrate 11 is overlapped to the glass substrate 14. A gap between both the overlapped substrates 14 and 11 is filled with an adhesive 19, to join both the substrates 14 and 11 to each other. Here, since the planarized surface of the second ML is joined to the polished back surface of the TFT substrate 11, it is possible to solve the related art problem associated with stress. A drive substrate 10 integrated with the second ML is thus obtained. Since then, the unnecessary base glass 40 is removed, and the adhesive such as wax remaining on the surface of the TFT substrate 11 is separated.

Figure 13F:
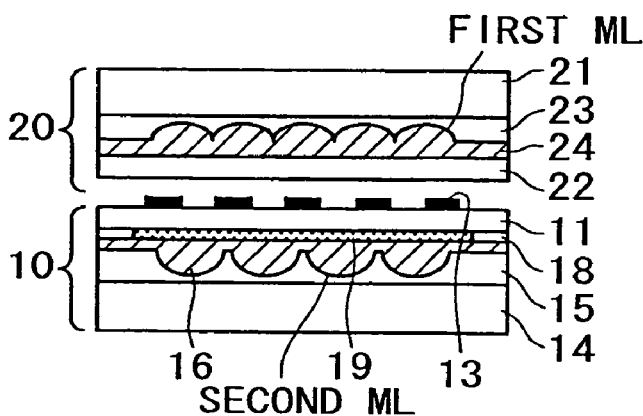

FIG. 13F shows the step of finishing a liquid crystal display device. A counter substrate 20 to which a first ML is previously integrated is prepared. The counter substrate 20 includes a glass substrate 21, a cover glass 22, and the first ML held therebetween. The first ML has a stacked structure formed by stacking resin layers 23 and 24 different in refractive index to each other. The counter substrate 20 integrated with the first ML is joined to the drive substrate 10 integrated with the second ML, and liquid crystal is enclosed in a gap therebetween, to obtain a liquid crystal display device. The first ML incorporated in the counter substrate 20 functions as a condenser lens, and the second ML formed on the drive substrate 10 functions as a field lens.

As described above, the liquid crystal display device shown in FIGS. 13A to 13F has the panel structure including the drive substrate 10 on which at least pixels electrodes and the switching devices for driving the pixel electrodes are formed, the counter substrate 20 on which at least a counter electrode is formed, and the liquid crystal layer disposed between both the substrates 10 and 20 joined such that the pixels electrodes are opposed to the counter electrode with a specific gap kept therebetween.

The microlens array composed of microlenses arranged in a two-dimensional pattern corresponding to the arrangement pitch of the pixel electrodes is incorporated at least in the drive substrate 10. The microlens array (second ML) has the stacked structure including the first optical resin layer 15 which has a first refractive index and which has the microlens planes arranged in a two-dimensional pattern, and the second optical resin layer 16 which has a second refractive index and which fills the irregularities of the microlens planes and has the planarized surface. The microlens array (second ML) is joined to the TFT substrate 11 such that the planarized surface of the second optical resin layer 16 is in contact with the back surface of the TFT substrate 11. The microlens array (second ML) is obtained by filling the microlens planes of the first optical resin layer 15 with the resin (for forming the second optical resin layer 16) and pressing the surface of the resin with a stamper having a flat plane, to planarize the surface, opposed to the microlens planes, of the second optical resin layer 16. Alternatively, the planarization may be performed by making use of the above-described polishing technique in place of stamping using the stamper. The polishing technique includes the steps of joining a support layer, on which a protective layer as a polishing stopper is previously formed, to the first optical resin layer with a specific gap kept therebetween; filling the gap with a liquid resin and curing the resin, to form the second optical resin layer; and removing the support layer by polishing, to expose the protective layer. In this technique, the exposed surface of the protective layer is taken as the planarized surface of the second optical resin layer.

According to this embodiment, the microlens array (first ML) is disposed in the counter substrate 20 in such a manner as to be matched with the microlens array (second ML) disposed in the drive substrate. The microlens array (first ML) functions as a condenser lens and the microlens array (second ML) functions as a field lens. The TFT substrate 11 of the drive substrate 10 is polished from the back side to be thinned. The planarized surface of the second optical resin layer 16 of the microlens array (second ML) is joined to the polished back surface of the TFT substrate 11.

Figure 14A:
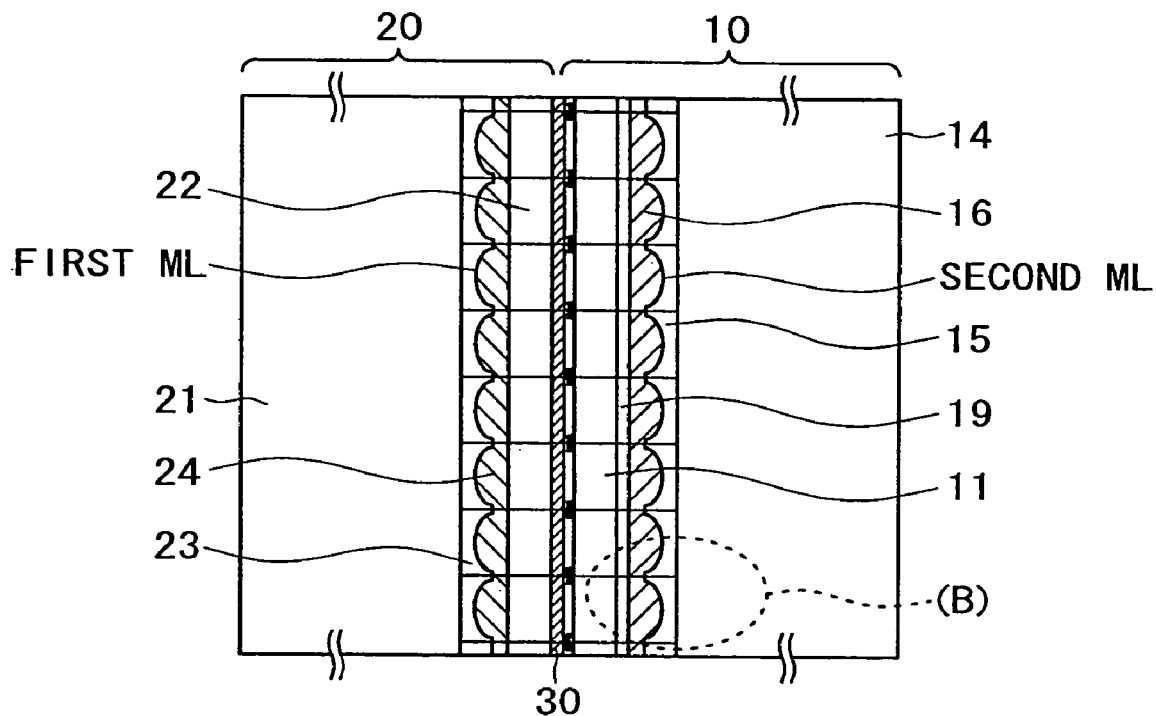
FIGS. 14A and 14B are enlarged views of the liquid crystal display device shown in FIGS. 13A to 13F.

FIG. 14A is a typical sectional view showing a finished state of the liquid crystal display device shown in FIGS. 13A to 13F, and FIG. 14B is a partial enlarged view of FIG. 14A.

As described above, the second ML is joined to the polished back surface of the TFT substrate 11 via a thin layer of the adhesive 19. Here, it is particularly important to join the previously planarized surface of the second ML to the back surface of the thinned TFT substrate 11.

For example, in the case where the TFT substrate 11 is used for a 0.7 inch TFT substrate (pixel pitch: 18 μm) for SVGA (Super Video Graphics Array), if the focal distance (equivalent value in air) of a first ML is about 35 μm and the focal distance (equivalent value in air) of a second ML is about 42 μm, the distance (equivalent value in air) between the principal point of the first ML and the interface of a liquid crystal layer 30 is about 20 μm, the thickness (equivalent value in air) of the liquid crystal layer 30 is 2 μm, and the distance (equivalent value in air) between the interface of a liquid crystal layer 30 and the principal point of the second ML is about 20 μm. In this case, the thickness of the TFT substrate 11 is thinned by polishing to an actual thickness of about 27 μm (equivalent value in air: about 18 μm). In this way, the TFT substrate 11 is very thin, and therefore, if a high refractive index resin 16 is solidified by UV-curing or thermal curing in a state being in contact with the TFT substrate 11 as in the related art method, the TFT substrate 11 causes strain due to stress generated upon curing. Such strain exerts adverse effect on the image quality.

To cope with such an inconvenience, according to the present invention, the previously planarized surface of the second ML is stuck on the back surface of the TFT substrate 11, to thereby suppress occurrence of stress.

Figure 14B:
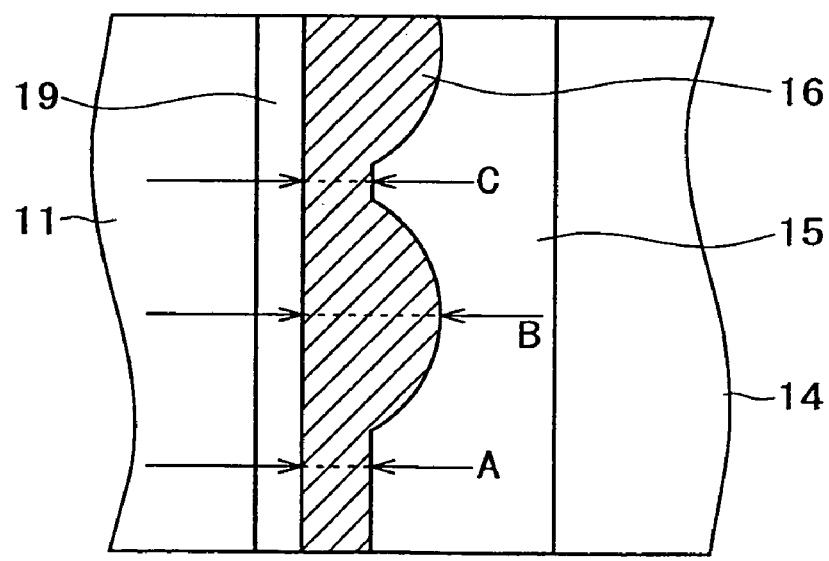

As shown in FIG. 14B, the thicknesses of the resin layer 16 of the second ML are different at locations A, B and C.

If the second ML is joined to the TFT substrate 11 in a state that the surface of the resin layer 16 is not planarized, the shrinkage volume of the resin layer 16 upon curing locally differs, to cause strain in the TFT substrate 11.

A fourth embodiment of the liquid crystal display device according to the present invention will be described with reference to FIGS. 15A to 15F.

FIGS. 15A to 15F are process diagrams showing steps of forming a liquid crystal display device in this embodiment.

This embodiment is characterized in that one of microlens arrays of a DML structure is disposed on the drive substrate side and the other is disposed on the counter substrate side.

Figure 15A:
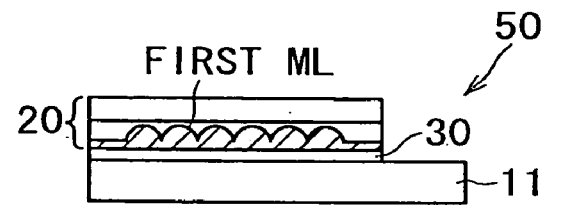
FIGS. 15A to 15F are process diagrams for illustrating a further liquid crystal display device according to the present invention.

FIG. 15A shows the step of preparing a finished liquid crystal panel. A finished liquid crystal panel 50, which has a stacked structure formed by stacking a counter substrate 20 to a TFT substrate 11 and enclosing liquid crystal 30 therebetween, is prepared. The counter substrate 20 has a thickness of, for example, 1.1 mm and incorporates a first ML. The TFT substrate 11 has a thickness of 0.8 to 1.2 mm, on the surface of which TFTs and pixel electrodes are integrated.

Figure 15B:
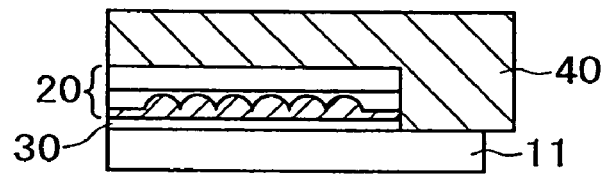

FIG. 15B shows the step of stacking a jig to the counter substrate. A jig 40 made from blue plate glass is stuck on the counter substrate 20 side with wax.

Figure 15C:
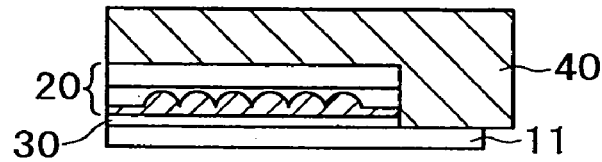

FIG. 15C shows the step of polishing the TFT substrate. In a state that the panel is held by the jig 40, the back surface of the TFT substrate 11 is polished until the thickness of the TFT substrate 11 becomes about 10 to 20 µm.

Figure 15D:
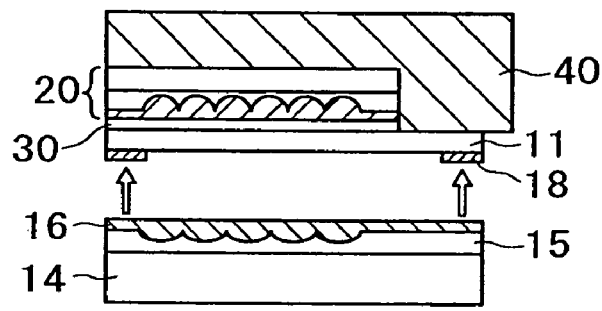

FIG. 15D shows the step of preparing a glass substrate having a second ML. A peripheral portion of the polished back surface of the TFT substrate 11 is coated with a seal material 18, and at the same time, a glass substrate 14 on which a second ML is previously formed is prepared. The second ML has a stacked structure formed by stacking optical resin layers 15 and 16 different in refractive index to each other.

Figure 15E:
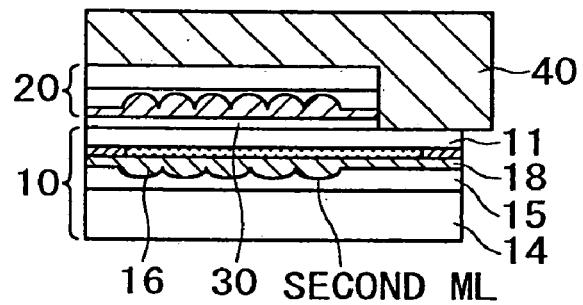

FIG. 15E shows the step of joining the liquid crystal panel to the glass substrate. The liquid crystal 50 is aligned to the glass substrate 14, and is then joined thereto via the adhesive (seal material) 18. At this time, the glass substrate 14 integrated with the second ML is joined to the polished back surface of the TFT substrate 11, to form a drive substrate 10. A high refractive index resin 19 is injected in a gap between the TFT substrate 11 and the planarized surface of the second ML.

Figure 15F:
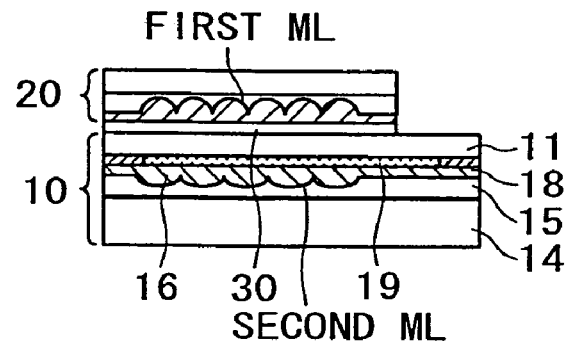

FIG. 15F shows the step of removing the jig. The unnecessary jig 40 is finally removed.

A panel having a structure that the counter substrate 20 integrated with the first ML is joined to the drive substrate 10 incorporating the second ML, and the liquid crystal 30 is enclosed therebetween is thus obtained. With this panel, since the surface of the second ML is planarized and the thickness of the resin layer 19 is as very thin as comparable to that of the liquid crystal layer 30, it is possible to prevent occurrence of stress due to shrinkage upon curing the resin.

A fifth embodiment of the liquid crystal display device according to the present invention will be described with reference to FIG. 16.

Figure 16:
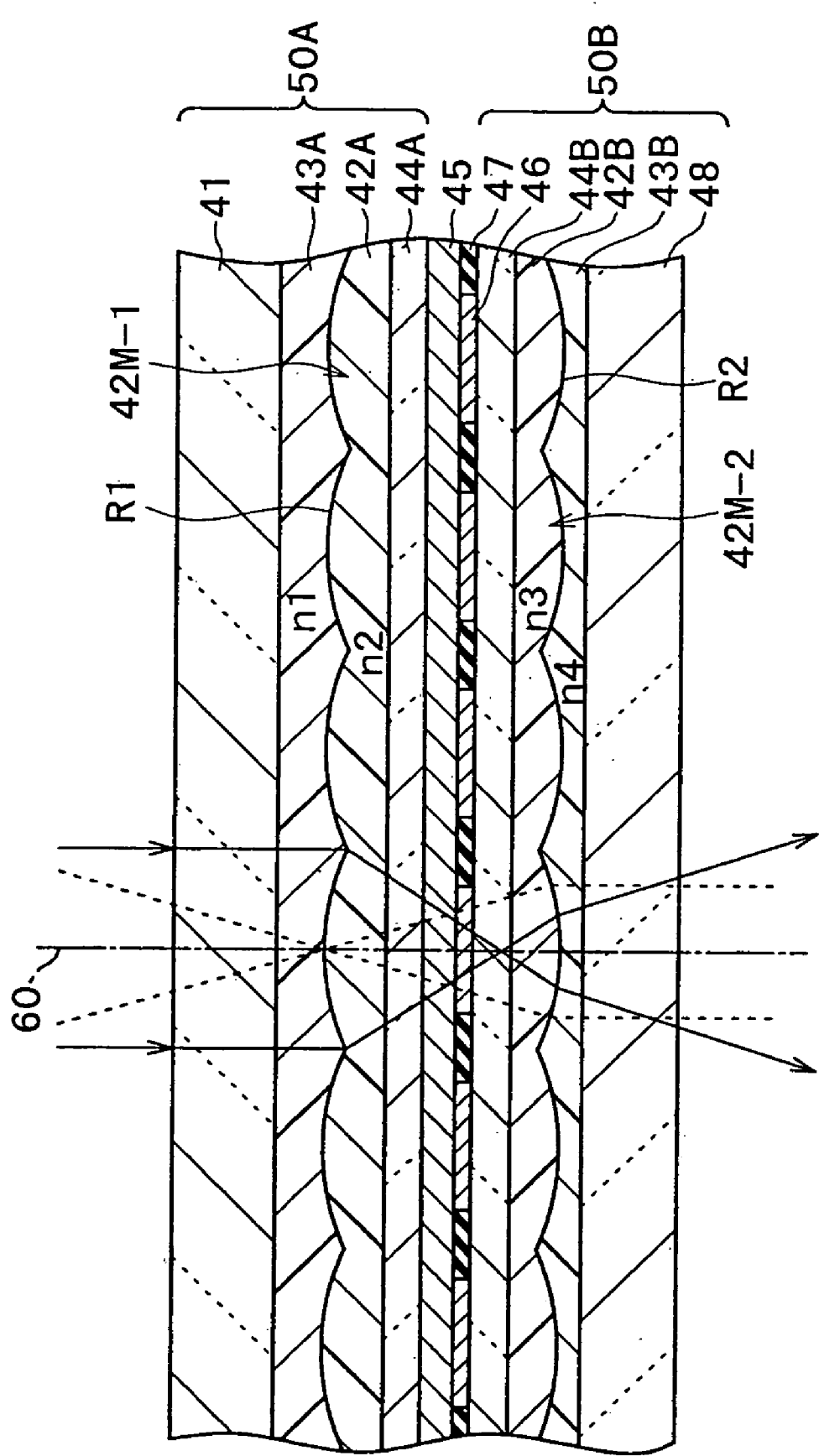
FIG. 16 is a typical diagram showing optical characteristics of a liquid crystal display device according to the present invention.

FIG. 16 is a typical sectional view showing optical characteristics of a liquid crystal display device in this embodiment, which has a panel structure that one of a pair of microlens arrays is disposed on the counter substrate side and the other is disposed on the drive substrate side. To be more specific, lens planes having a light condensing function are disposed on the counter substrate side, and lens planes having a field function are disposed on the TFT substrate (drive substrate) side. The liquid crystal panel includes a TFT substrate 50B, and a counter substrate 50A disposed on the light incident plane side of the TFT substrate 50B in such a manner as to be opposed to the TFT substrate 50B with a liquid crystal layer 45 put therebetween.

The counter substrate 50A has a glass substrate 41, a resin layer 43A, a first microlens array 42A, and a thinned counter substrate 44A, which are arranged in this order from the light incident side. The TFT substrate 50B has pixel electrodes 46, a black matrix 47, a thinned TFT substrate 44B, a second microlens array 42B, a resin layer 43B, and a glass substrate 48, which are arranged in this order from the light incident side.

The first microlens array 42A is made from an optical resin, and has a plurality of first microlens 42M-1 arranged in a two-dimensional pattern corresponding to an arrangement pattern of the pixel electrodes 46. Each mirolens 42M-1 has a first lens plane R1 having a positive power and functions as a condenser lens. In this embodiment, a refractive index n1 of the resin layer 43A and a refractive index n2 of the first microlens array 42A satisfy a relation of n2>n1, and the first lens plane R1 is convex toward the light incident side (light source side).

Like the first microlens array 42A, the second microlens array 42B is made from an optical resin, and has a plurality of second microlenses 42M-2 arranged in a two-dimensional pattern corresponding to an arrangement pattern of the pixel electrodes 46. Each microlens 42M-2 has a second lens plane R2 having a positive power and functions as a field lens. Accordingly, the focal point of the second lens plane R2 of the second microlens 42M-2 nearly corresponds to the principal point of the first lens plane R1 of the first microlens 42M-1 (see an optical path shown by a dotted line in the figure). In this embodiment, a refractive index n4 of the resin layer 43B and a refractive index n3 of the second microlens array 42B satisfy a relation of n4>n3, and the second lens plane R2 is convex toward the light incident side.

A duel microlens array in this embodiment has a structure that each pixel aperture is positioned between both the microlenses 42M-1 and 42M-2, more specifically, between both the lens planes R1 and R2. On an optical axis 60, the synthesized focal point of both the microlenses 42M-1 and 42M-2 is located near the pixel aperture (see an optical path shown by a solid line in the figure). The alignment of the synthesized focal point to the pixel aperture can be controlled by adjusting the thickness between each of the microlenses 42M-1 and 42M-2 and the pixel aperture. Such a configuration is best for enhancing the effective aperture ratio; however, it has been regarded to be produced with the most difficulty. According to the present invention, it is possible to overcome such a difficulty in production and to realize the duel microlens array structure shown in the figure.

A sixth embodiment of the liquid crystal display device according to the present invention will be described with reference to FIG. 17.

Figure 17:
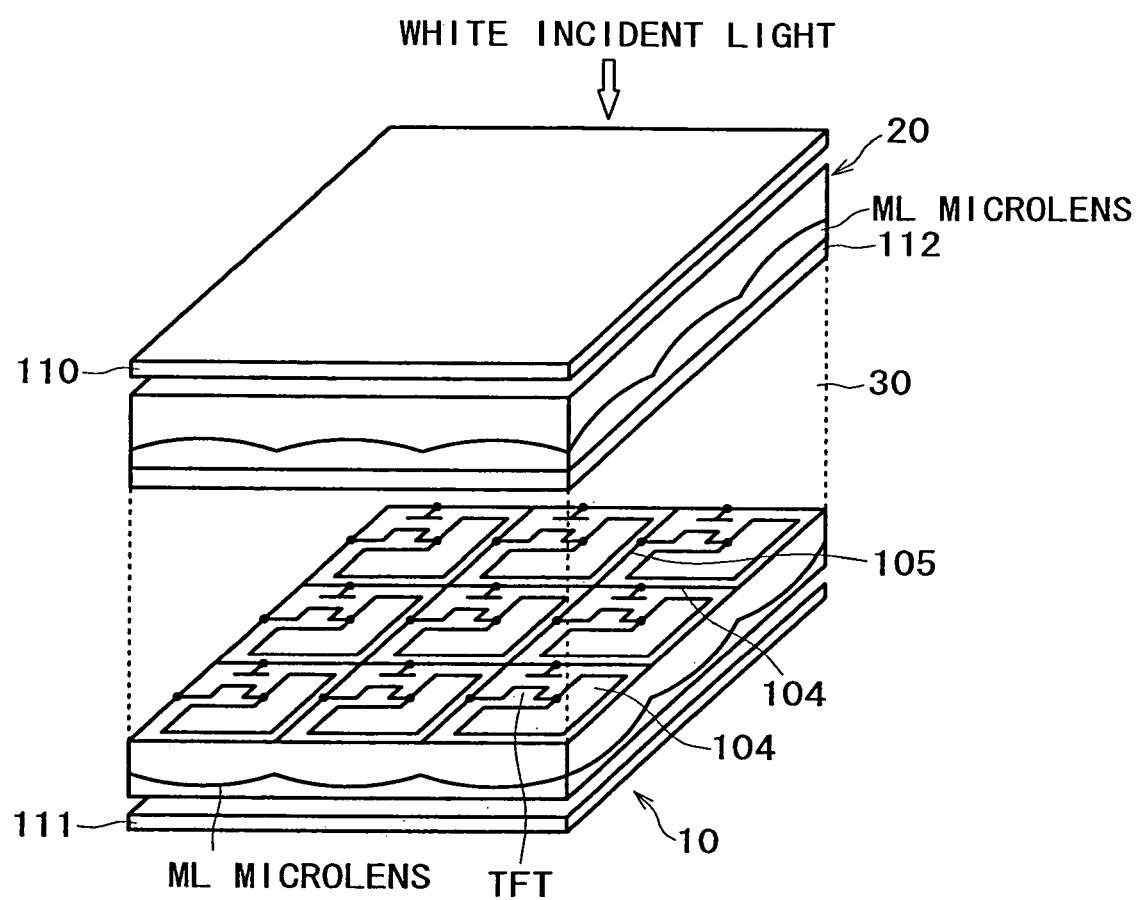
FIG. 17 is a perspective view showing the entire configuration of a liquid crystal display device according to the present invention.

FIG. 17 is a typical sectional view showing the entire configuration of a liquid crystal display device having a panel structure in this embodiment.

This embodiment is characterized by realizing a small-sized liquid crystal panel with a high definition characteristic.

A liquid crystal panel shown in the figure is configured such that a counter substrate 20 is stuck on a drive substrate 10 with a specific gap kept therebetween and liquid crystal 30 is enclosed in the gap. As described above, a microlens ML functioning as a condenser lens is formed in the counter substrate 20, and a microlens ML functioning as a field lens is integrated to the drive substrate 10.

Scanning lines 104 and signal lines 105, which are perpendicular to each other, are provided on the inner surface of the drive substrate 10. Pixel electrode 106 and thin film transistors (TFT) as pixel switches are arranged in a matrix at respective intersections at which the lines 104 and 105 cross each other. While not shown, an alignment film having been subjected to rubbing treatment is formed on the inner surface of the drive substrate 10. A counter electrode 112 is formed on the inner surface of the counter substrate 20. While not shown, an alignment film having been subjected to rubbing treatment is also provided on the inner surface of the counter electrode 112.

Polarizing plates 110 and 111 are disposed on both the outer sides of the assembly of the drive substrate 10 and the counter substrate 20 joined to each other, wherein the polarizing plate 110 is located on the drive substrate 10 side with a specific gap kept therebetween and the polarizing plate 111 is located on the counter substrate 20 side with a specific gap kept therebetween. A scanning pulse is applied to a scanning line 104, to select the TFTs along the scanning line 104, and a signal is supplied to a signal line 105, to be written on the pixel electrode 106 located at the intersection between the scanning line 104 and the signal line 105. A voltage is applied between such a pixel electrode 106 and the counter electrode 112, to activate the liquid crystal 30. A change in transmission amount of incident white light due to activation of the liquid crystal layer 30 is taken out through a pair of the polarizing plates 110 and 111 set in a cross nicol position, to perform a desired image display.

A projector is configured by projecting such an image display to a screen located in front of the liquid crystal panel via an enlarged projection optical system. If such a projector adopts a duel microlens array structure having a combination of the microlens array functioning as a condenser lens and the microlens array functioning as a field lens, it is expected to improve the utilization efficiency of light emitted from a light source and to obtain a screen with a high luminance.

The projector to which the present invention is applied will be described below.

3. Projector

Figure 18:
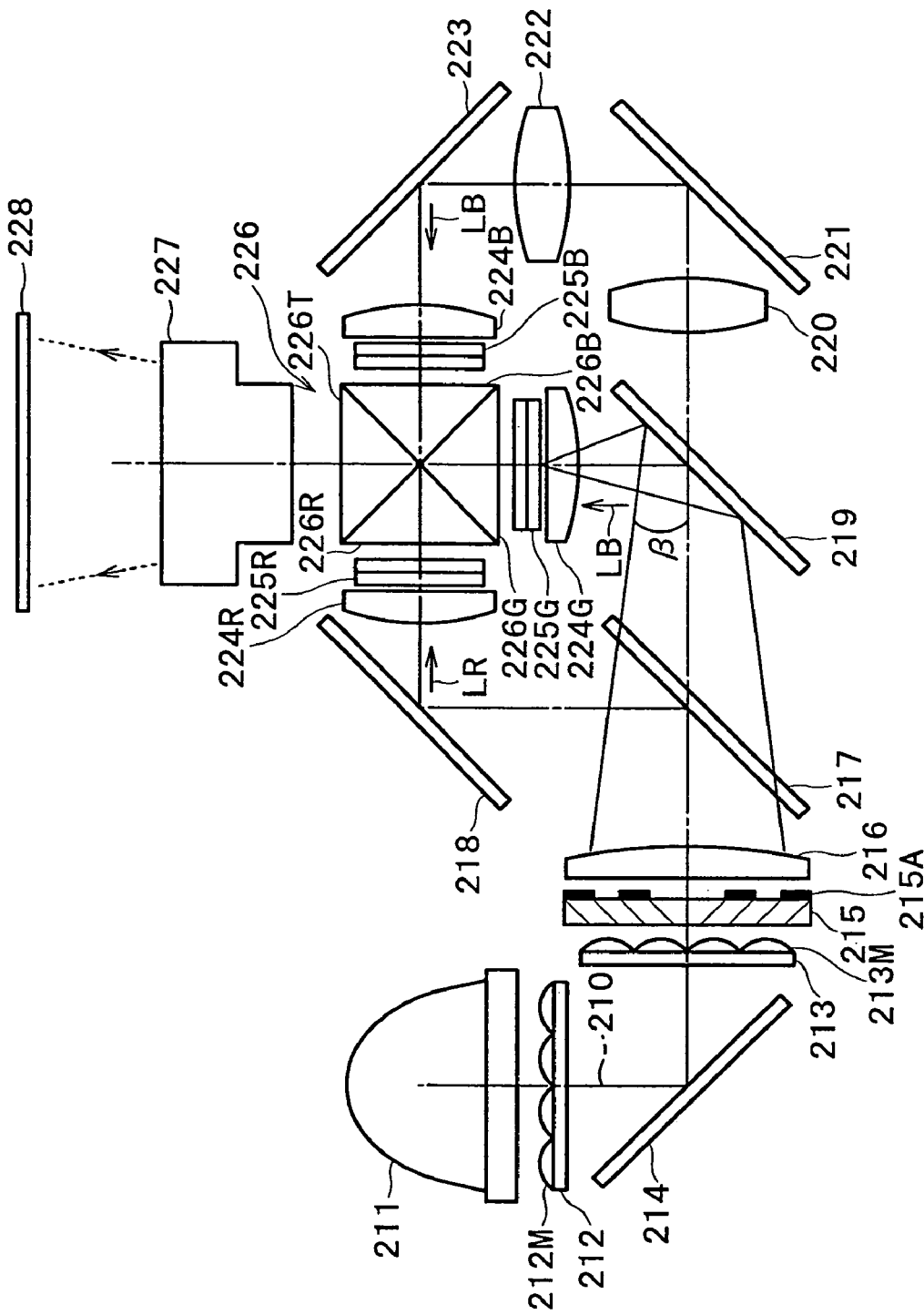
FIG. 18 is a typical diagram showing one example of a projector according to the present invention.

An embodiment of a projector of the present invention will be described with reference to FIG. 18. FIG. 18 is a typical diagram showing a projector incorporating the liquid crystal panel shown in FIG. 17. The projector shown in the figure is of a so-called three-panel type in which a color image display is performed by using three pieces of transmission type liquid crystal panels, wherein each liquid panel incorporates a microlens array configured according to the present invention.

The projector in this embodiment includes a light source 211, a pair of first and second multi-lens array integrators 212 and 213, and a full-reflection mirror 214 disposed between the first and second multi-lens array integrators 212 and 213 in such a manner that an optical path (optical axis 210) is turned at an approximately 90° on the second multi-lens array integrator 213 side. A plurality of microlenses 212M are arranged in a two-dimensional pattern in the first multi-lens array integrator 212, and similarly a plurality of microlenses 213M are arranged in a two-dimensional pattern in the second multi-lens array integrator 213. Each of the multi-lens array integrators 212 and 213 is intended to equalize a light illuminance distribution, and has a function of dividing incident light into a plurality of small light fluxes.

The light source 211 emits white light containing a red light component, a blue right component, and a green light component required for color image display. The light source 211 is composed of an emitter (not shown) for emitting light, and a concave mirror for reflecting and collecting the light emitted from the emitter. Examples of the emitters include a halogen lamp, a metal lamp, and a xenon lamp. The concave mirror preferably has a shape capable of enhancing the light collection efficiency, for example, a rotation-symmetric shape such as an ellipsoid of revolution or a paraboloid of revolution.

The projector also includes a PS synthesizing element 215, a condenser lens 216, and a dichroic mirror 217 arranged in this order on the light emergence side of the second multi-lens array integrator 213 side. The dichroic mirror 217 has a function of separating incident light, for example, into a red light component LR and the other color light component.

The PS synthesizing element 215 is provided with a plurality of half-wave plates 215A at positions each of which corresponds to a gap between adjacent two of the microlenses of the second multi-lens array integrator 213. The PS synthesizing element 215 has a function of separating incident light L0 into two kinds of polarized light components (P-polarized light component and S-polarized light component) L1 and L2. The PS synthesizing element 215 also has a function of making the polarized light component L2 (for example, P-polarized light component) emergent from the PS synthesizing element 215 while keeping the polarization direction thereof, and converting the polarized light component L1 (for example, S-polarized light component) into the other polarized light component (for example, P-polarized light component) by the function of the half-wave plates 215A.

The projector also includes a full-reflection mirror 218, a field lens 224R, and a liquid crystal panel 225R in this order along an optical path of the red light component LR separated by the diachronic mirror 217. The full-reflection mirror 218 reflects the red light component LR separated by the dichroic mirror 217 to the liquid crystal panel 225R. The liquid crystal panel 225R has a function of spatially modulating the red light component LR made incident thereon via the field lens 224R on the basis of an image signal.

The projector also includes a dichroic mirror 219 along an optical path of the other color light component separated by the dichroic mirror 217. The dichroic mirror 219 has a function of separating the other color light component made incident thereon, for example, into a green light component LG and a blue light component LB.

The projector also includes a field lens 224G and a liquid crystal panel 225G arranged in this order along an optical path of the green light component LG separated by the dichroic mirror 219. The liquid crystal panel 225G has a function of spatially modulating the green light component LG made incident thereon via the field lens 224G on the basis of an image signal.

The projector also includes a relay lens 220, a full-reflection mirror 221, a relay lens 222, a full-reflection mirror 223, a field lens 224B, and a liquid crystal panel 225B arranged in this order along an optical path of the blue light component LB separated by the dichroic mirror 219. The full-reflection mirror 221 reflects the blue light component LB made incident thereon via the relay lens 220 to the full-reflection mirror 223. The full-reflection mirror 223 reflects the blue light component LB, which has been reflected from the full-reflection mirror 221 and made incident thereon via the relay lens 222, to the liquid crystal panel 225B. The liquid crystal panel 225B has a function of spatially modulating the blue light component LB, which has been reflected from the full-reflection mirror 223 and made incident thereon via the field lens 224B, on the basis of an image signal.

The projector also includes, at a position at which the optical paths of the red light component LR, the green light component LG, and the blue light component LB cross each other, a cross-prism 226 having a function of synthesizing the three color light components LR, LG, and LB. The projector also includes a projection lens 227 for projecting the synthesized light emerged from the cross-prism 226 to a screen 228. The cross-prism 226 has three incident planes 226R, 226G, and 226B, and one emergence plane 226T. The red light component LR emergent from the liquid crystal panel 225R is made incident on the incident plane 226R; the green light component LG emergent from the liquid crystal panel 225G is made incident on the liquid crystal panel 226B; and the blue light component LB emergent from the liquid crystal panel 225B is made incident on the incident plane 226B. The cross-prism 226 synthesizes the three color light components made incident on the incident planes 226R, 226G, and 226B, and makes the synthesized light emergent from the emergence plane 226T.

4. Production of Liquid Crystal Display Device

A first embodiment of a method of producing a liquid crystal display device according to the present invention will be described with reference to FIGS. 19A to 19E.

FIGS. 19A to 19E are process diagrams showing basic steps of producing a liquid crystal display device according to this embodiment.

Figure 19A:
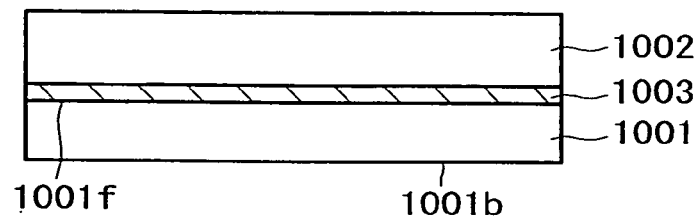
FIGS. 19A to 19E are process diagrams showing a method of a liquid crystal display device according to the present invention.

FIG. 19A shows a step of bonding a TFT substrate to a base glass. A base plate such as a base glass 1002 is bonded on a front surface 1001f of a TFT substrate 1001 via an adhesive 1003 soluble in water or an organic solvent.

Examples of the adhesives 1003 include a wax such as a hot melt type water-soluble solid wax or a water-soluble liquid wax, a thermoplastic polymer adhesive (trade name: Crystal Bond), a cyanoacrylate based adhesive, and an epoxy based adhesive.

The hot melt type water-soluble solid wax is available from, for example, Nikka Seiko Co., Ltd. under the trade names of "Aqua Wax 20/50/80" (main component: fatty acid glyceride), "Aqua Wax 553/531/442/SE" (main component: polyethylene glycol, vinyl pyrrolidone copolymer, glycerine polyether), and "PEG Wax 20" (main component: polyethylene glycol).

The water-soluble liquid wax is available as a synthetic resin based liquid adhesive from, for example, Nikka Seiko Co., Ltd. under the trade names of "Aqua Liquid WA-302 (main component: polyethylene glycol, polyvinyl pyrrolidone derivative, methanol), and WA-20511/QA-20566 (main component: polyethylene glycol, polyvinyl pyrrolidone derivative, IPA (isopropyl alchol), water).

The base glass 1002 may be stuck on the TFT substrate 1001 by means of a UV-cured type adhesive double-coated tape or a thermally-cured type adhesive double-coated tape.

If needed, to protect the surface of the TFT substrate 1001 or prevent contamination of the surface of the TFT substrate 1001 with halogen ions, the front surface 1001f of the TFT substrate 1001 may be coated with a resist film. In addition, the base glass material may be a transparent glass such as borosilicate glass or blue plate glass.

In the case of using the thermoplastic polymer adhesive (trade name: Crystal Bond) soluble in an organic solvent such as acetone as the adhesive 1003, the bonding step may be performed by coating the base glass 1002 with the crystal bond dissolved in acetone; overlapping the TFT substrate 1001 to the base glass 1002; heating the TFT substrate 1001 and the base glass 1002 overlapped to each other in vacuum under a condition with 150–160° C./ 13.3322 Pa (0.1 Torr), to remove bubbles interposed therebetween, thereby bringing the TFT substrate 1001 into close-contact with the base glass 1002; and breaking the vacuum, to promote the degassing with the pressure generated upon return to atmospheric pressure and to equalize the thickness of the adhesive 1003, for example, to 1 to 3 $\mu$m.

In the case of using the hot melt type water-soluble solid wax (for example, "Aqua Wax 80/553" or "PEG Wax 20" available from Nikka Seiko Co., Ltd.) as the adhesive 1003, the bonding step may be performed by dissolving 30 to 40 wt % of the wax in methanol and filtering the wax solution to remove foreign matters; coating the base glass 1002 with the wax solution by spin-coating; overlapping the TFT substrate 1001 to the base glass 1002; heating the TFT substrate 1001 and the base glass 1002 overlapped to each other in vacuum under a condition with 80–100° C./13.3322 Pa (0.1 Torr), to remove bubbles interposed therebetween, thereby bringing the TFT substrate 1001 into close-contact with the base glass 1002; and breaking the vacuum, to promote the degassing with the pressure generated upon return to atmospheric pressure and to equalize the thickness of the adhesive 1003, for example, to 1 to 3 $\mu$m.

In the case of using the water-soluble liquid wax (for example, "Aqua Liquid WA-302" available from Nikka Seiko Co., Ltd.) as the adhesive 1003, the bonding step may be performed by coating the base glass 1002 with the liquid wax having a viscosity of, for example, 4 to 5 cps by spin-coating; overlapping the TFT substrate 1001 to the base glass 1002; heating the TFT substrate 1001 and the base glass 1002 overlapped to each other in vacuum under a condition with 70–80° C./13.3322 Pa (0.1 Torr), to remove bubbles interposed therebetween, thereby bringing the TFT substrate 1001 into close-contact with the base glass 1002; and breaking the vacuum, to promote the degassing with the pressure generated upon return to atmospheric pressure and to equalize the thickness of the adhesive 1003, for example, to 1 to 3 $\mu$m.

In the case of using the double-coated tape as the adhesive 1003, the bonding step may be performed by bonding the base glass 1002 to the TFT substrate 1001 by using a polyolefine tape (thickness: 100±2 $\mu$m) with its both surfaces coated with an UV-cured type adhesive (thickness: 10±1 $\mu$m) or a polyolefine tape (thickness: 100±2 $\mu$m) with its both surfaces coated with a thermally-cured type adhesive. In this step, vacuum degassing treatment may be performed to prevent occurrence of bubbles therebetween.

Figure 19B:
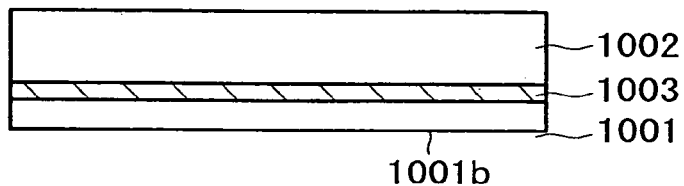

FIG. 19B shows the step of polishing the TFT substrate. In a state that the TFT substrate 1001 is held by the base glass 1002, a back surface 1001b of the TFT substrate 1001 is polished to be thinned. For example, the back surface 1001b of the TFT substrate 1001 is polished by a method of polishing one surface with a grade suitable for optics while the base glass 1002 is taken as a reference plane, to prepare the TFT thin substrate 1001 having a specific thickness (for example, 20±3 $\mu$m). As the dimensional accuracy of the base glass 1002, the parallelism is set to 1 to 3 $\mu$m and the thickness is 2 mm.

The method for one-surface polishing with a grade suitable for optics may be performed by one-surface buffing made in the order of rough buffing, medium buffing, and finish buffing, wherein particle sizes of abrasives such as alumina or cerium oxide may be reduced in the order of the rough buffing, medium buffing, and finish buffing, to thereby gradually increase the polishing accuracy.

The one-surface buffing performed as the method for one-surface polishing with a grade suitable for optics may be combined with one-surface blasting. This one-surface blasting involves preparing a laminar flow of high pressure air in which particles of abrasives such as silicon carbide, boron carbide, or diamond are dispersed, and blasting a specific amount of the laminar flow from a slit-shaped opening at the leading end of a nozzle while scanning the nozzle in the reciprocating directions over the back surface 1001b of the TFT substrate 1001, to polish the back surface 1001b of the TFT substrate 1001. The blasting is followed by finish polishing, that is, finish buffing, to further increase the polishing accuracy and remove residual stress due to blasting of the particles.

The method for one-surface polishing with a grade suitable for optics may be performed by CMP (Chemical Mechanical Polishing). Like the one-surface buffing, the CMP may be performed in the order of rough polishing, medium polishing, and finish polishing.

The one-surface buffing performed as the method for one-surface polishing with a grade suitable for optics may be combined with a method for one-surface etching with a grade suitable for glass. This process involves reducing the thickness of the TFT substrate 1001 to a specific value by the method for etching with a grade for glass, and removing surface waviness due to the method for etching with a grade suitable for glass by finish buffing performed as the method for polishing with a grade suitable for optics. In this case, it is required to use a protective adhesive or tape withstanding a hydrofluoric acid based etchant.

The one-surface CMP performed as the method for one-surface polishing with a grade suitable for optics may be combined with the method for one-surface etching with a grade suitable for optics. This process involves etching the back surface 1001b of the TFT substrate 1001 made from quartz glass to a specific value with a hydrofluoric acid based etchant, and removing surface waviness due to glass etching by CMP performed as the method for polishing with a grade suitable for optics. Even in this case, it is required to use a protective adhesive or tape withstanding a hydrofluoric acid based etchant.

Figure 19C:
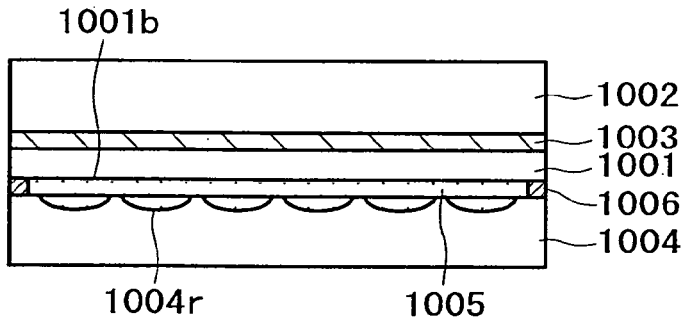

FIG. 19C shows the step of sticking a microlens array on the TFT substrate. A microlens array is stuck on the polished back surface 1001b of the TFT substrate 1001 via an optical resin 1005. To be more specific, this step includes a step of preparing a microlens substrate (ML substrate) 1004 in which microlens planes 1004r are arranged in a two-dimensional pattern by processing an optical glass such as quartz glass or crystallized glass (Neo Ceram), and a step of aligning and overlapping the ML substrate 1004 to the polished back surface 1001b of the TFT substrate 1001, filling a gap therebetween with a transparent optical resin 1005 having a refractive index higher than that of each of the substrates 1001 and 1004, and curing the optical resin 1005. In this case, the closed gap is formed between the TFT substrate 1001 and the ML substrate 1004 by bonding the ML substrate 1004 to the back surface 1001b of the TFT substrate 1001 via a seal material 1006, and is then filled with the transparent high refractive index optical resin 1005.

The latter filling/curing step will be more fully described below.

A frame made from the seal material 1006 and having a filling port is formed around the ML substrate (microlens substrate) 1004, and the TFT substrate 1001 thinned by polishing is overlapped to the ML substrate 1004. In this state, the seal material is cured. If the seal material 1006 is composed of a thermally-cured type adhesive, it is cured by heating at a specific temperature, whereas if the seal material 1006 is composed of an UV-cured type adhesive, it is cured by UV-irradiation with a specific energy. Alternatively, if the seal material 1006 is composed of a thermally-cured/UV-cured combination type adhesive, it is cured by combination of heating at a specific temperature and UV-irradiation with a specific energy.

The high refractive index transparent optical resin 1005 is injected in the gap from the filling port, and the filling port is sealed with a UV-cured type adhesive. The optical resin 1005 is then thermally cured. In the case of using an acrylic based or an acrylic epoxy based high refractive index transparent resin (viscosity: 20 to 100 cps) as the optical resin 1005, the filling port is dispense-coated with the resin or dipped in the resin in vacuum, and is injected in the gap through the filling port with a pressure upon return to atmospheric pressure. At this time, a suitable pressure may be added to inject the resin in the gap through the filling port. Such a high refractive index transparent resin is then cured at a temperature of 70 to 80° for 120 min, to obtain the high refractive index transparent optical resin 1005 having a refractive index of 1.59 to 1.67.

Since the high refractive index optical resin 1005 is injected in the lens planes 1004r formed in the microlens substrate 1004 having a relatively low refractive index and is cured, the microlenses can be automatically formed. In addition, to align the lens planes 1004r on the microlens substrate 1004 side to pixel electrodes on the TFT substrate 1001 side in one-to-one relationship, the TFT substrate and the ML substrate are overlapped to each other with alignment marks formed on both the TFT substrate and the ML substrate aligned to each other, and are fixed by the seal material 1006.

Figure 19D:
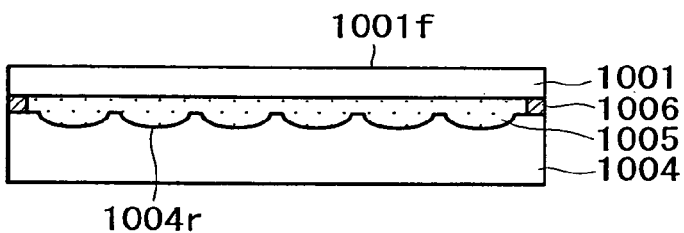

FIG. 19D shows the step of peeling the base glass. A spent base glass 1002 is peeled from the front surface 1001f of the TFT substrate 1001, to integrate the microlens array with the back surface 1001b of the TFT substrate 1001. Concretely, the base glass can be peeled from the TFT substrate 1001 by heating or UV irradiation. In the case of using a thermoplastic polymer (crystal bond) or a cyanoacrylate based adhesive as the adhesive 1003, after the base glass is peeled by heating, the entire ML substrate is subjected to ultrasonic cleaning using an organic solvent such as acetone, a combination of acetone and ethanol, methanol, or IPA. In the case of using a hot melt based water-soluble wax (for example, "Aqua Wax 80/553" or "PEG Wax 20" available from Nikka Seiko Co., Ltd.) as the adhesive 1003, the entire ML substrate is subjected to ultrasonic cleaning using pure water or hot pure water at 50 to 60° C. In addition, the spent high accurate base glass is desirable to be re-used after being cleaned.

Figure 19E:
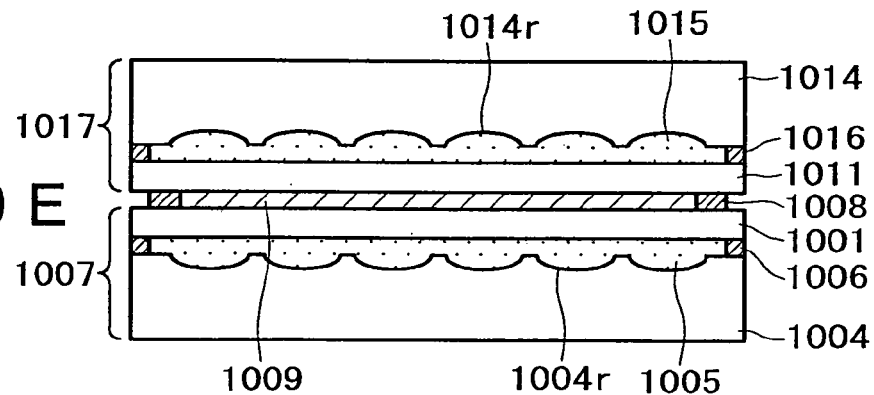

FIG. 19E shows the step of finishing a liquid crystal display device. A microlens TFT substrate (MLTFT substrate) 1007 obtained by integrating the one-surface polished TFT substrate 1001 with the microlens substrate 1004 is overlapped to a microlens counter substrate (ML counter substrate) 1017 obtained by integrating a microlens substrate with a counter substrate with a specific gap kept therebetween, and the gap is filled with liquid crystal 1009 and is then sealed, to obtain an active matrix type liquid crystal display device having a dual microlens structure.

The microlens counter substrate 1017 can be obtained in the same steps as those for the microlens TFT substrate 1007. To be more specific, the front surface side of a counter substrate 1011 is polished, and a microlens substrate 1014 is stuck on the polished surface of the counter substrate 1011 via a seal material 1016. Microlens planes 1014*r* are previously formed on the microlens substrate 1014. A gap between the single-surface polished counter substrate 1011 and the microlens substrate 1014 is filled with a high refractive index transparent optical resin 1015 and is cured, to obtain the ML counter substrate 1017. In addition, a counter electrode is previously formed on the front surface, to be brought into contact with the liquid crystal 1009, of the counter substrate 1011.

The liquid crystal display device produced by the production method according to this embodiment has a panel structure that the liquid crystal 1009 is held between the pixel electrodes formed on the MLTFT substrate 1007 side and the counter electrode formed on the ML counter substrate 1017 side. The microlens array in which microlenses functioning as condenser lenses for respective pixel electrodes are arranged in two-dimensional pattern is integrally formed on the ML counter substrate 1017 side. The microlens array in which microlenses functioning as field lenses for respective pixel electrodes are arranged in a two-dimensional pattern is integrally formed on the MLTFT substrate 1007 side.

In the above-described polishing step, the TFT substrate 1001 and/or the counter substrate 1011 are polished to reduce the thicknesses in such a manner that the focal point of each microlens functioning as the field lens nearly corresponds to the principal point of the corresponding microlens functioning as the condenser lens in the finished panel state. For example, according to this embodiment, since the TFT substrate 1001 is thinned to a thickness of about 20 $\mu$m, the above requirement can be satisfied. By arranging microlens arrays on both the TFT substrate 1001 side and the counter substrate 1011 side such that the focal point of each field lens nearly corresponds to the principal point of the condenser lens, it is possible to enlarge the effective aperture ratio of the pixels at maximum.

Along with the tendency toward finer pixels, the focal point of each microlens tends to become shorter, and correspondingly, it is required to reduce the thickness of each substrate to significant degree. From this viewpoint, the production method of the present invention is advantageous in rationally, efficiently thinning each of the TFT substrate and the counter substrate.

The lens planes 1004*r* and 1014*r* of the microlenses can be each formed into the spheric, aspheric, or Fresnel plane. The spheric lens is advantageous in easy production; however, since the radius of curvature of the lens, which is capable of making the focal distance shortest, is limited to the pixel size, it is difficult to shorten the focal distance unless the difference in refractive index at the interface between the lens planes can be sufficiently ensured. Each of the aspheric and Fresnel lenses is excellent in shortening of the focal distance and planarity of the lens principal plane, and is very effective to suppress the divergence angle of light emitted from a light source.

A second embodiment of the method of producing a liquid crystal display device according to the present invention will be described with reference to FIG. 20.

Figure 20:
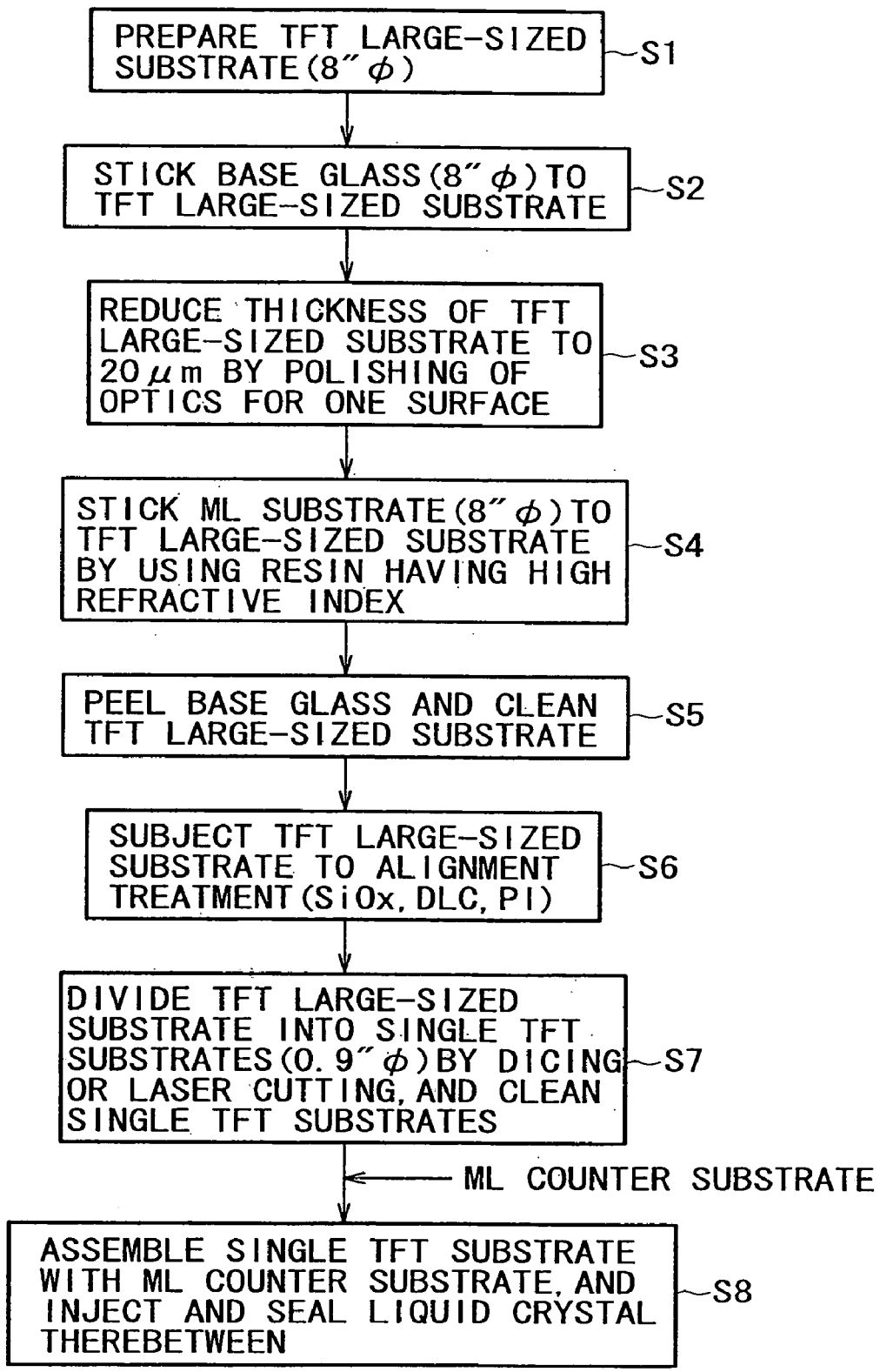
FIG. 20 is a process diagram showing an embodiment of the method of producing a liquid crystal display device according to the present invention.

FIG. 20 is a process diagram showing the steps of producing the liquid crystal display device in this embodiment, wherein a multi-chip module process is performed in steps S1 to S6 and a single-chip module process is performed in step S7 and S8, with ML counter substrates (single-chip module substrates) prepared between steps S7 and S8.

In this embodiment, a large area TFT substrate (TFT large-sized substrate) is used as a multi-chip module substrate for promoting rationalization of the production process. To be more specific, the large area substrate (multi-chip module substrate) is used in steps S1 to S6, and is divided into single substrates (single-chip module substrates) corresponding to individual panels in step S7.

In step S1, a TFT large-sized substrate having a diameter of, for example, 8 inches is prepared. In step S2, a base glass having a diameter of 8 inches is stuck on the TFT large-sized substrate. In step S3, the thickness of the TFT large-sized substrate is reduced to 20 $\mu$m by the method for one-surface polishing with a grade suitable for optics. In step S4, an ML substrate (diameter: 8 inches) in which microlens planes are previously formed is stuck on the polished surface of the TFT large-sized substrate by a seal material, and the microlens planes are filled with a high refractive index resin to form a microlens array therebetween. In step S5, the spent base glass is peeled and the TFT large-sized substrate is cleaned.

In step S6, the exposed surface of the TFT large-sized substrate is subjected to alignment treatment. For Example, a polyimide alignment film is formed on the surface of the TFT large-sized substrate and is subjected to rubbing treatment. In this case, since the high refractive index resin having a relatively low heat resistance is injected to form the microlens array in the previous step, it may be desirable to use a polyimide alignment film specialized as a type curable at a low temperature in the alignment treatment of step S6. However, since many kinds of the recent polyimide resins are curable at relatively low temperatures, the polyimide alignment film is not necessarily specialized as a type curable at a low temperature. A DLC (diamond like carbon) film may be used in place of the polyimide alignment film, wherein the DLC film may be subjected to alignment treatment by ion irradiation with specific directivity. Alternatively, a SiOx alignment film formed by obliquely vapor-depositing SiOx may be used in place of the polyimide alignment film, wherein alignment of SiOx is obtained by oblique vapor-deposition.

In the case of using a polyimide alignment film, the polyimide film is formed by roll-coating or spin-coating and is subjected to rubbing treatment by using a buffing material. In the case of using a DLC alignment film, the DLC film having a thickness of about 5 nm is formed and is subjected to alignment treatment by ion irradiation with specific directivity. In the case of using a SiO alignment film, the SiO film is formed by obliquely vapor-depositing SiO.

In step S7, the TFT large-sized substrate having the diameter of 8 inches is divided into individual single substrates each having a 0.9 inch square size, for example, by diving or $CO_2$ laser cutting. Single TFT substrates each incorporating a microlens array are thus obtained.

Subsequently, single counter substrates each incorporating a microlens array, which have been evaluated as non-defective products, are prepared.

In step S8, each of the above single counter substrates is overlapped to one of the single TFT substrates each incorporating a microlens array, which have been evaluated as non-defective products, with a specific gap kept therebetween, and the gap is filled with crystal liquid such as nematic liquid crystal through a filling port, followed by sealing of the filling port. To be more specific, a frame of a seal material having a filling port is formed around a peripheral portion of either the microlens array incorporating TFT substrate or the microlens array incorporating counter substrate. The microlens array incorporating TFT substrate is overlapped to the microlens array incorporating counter substrate while alignment marks formed on both the substrates are aligned to each other, and the seal material is cured. After the liquid crystal is injected in the gap through the filling port, the filling port is sealed with a UV-cured type adhesive. The liquid crystal is heated and rapidly cooled, to adjust alignment of the liquid crystal.

As described above, according to this embodiment, a large area substrate, which is to be divided into a plurality of single substrates corresponding to individual panels, is subjected to the bonding step, polishing step, sticking step, and peeling step, to integrate a large area microlens array corresponding to a plurality of single microlens arrays, and is divided into single substrates corresponding to individual panels in a suitable step (step S7). Accordingly, it is possible to promote rationalization of the production process. In this embodiment, a TFT large-sized substrate, on which a microlens array corresponding to a plurality of single microlens arrays is formed, is divided into single TFT substrates, and each of the single TFT substrates is overlapped to one of previously prepared single counter substrates, on each of which a single microlens array is formed, with a specific gap kept therebetween, to obtain a panel (step S8). In addition, according to this embodiment, after the base glass is peeled from the surface of the TFT large-sized substrate and the TFT large-sized substrate is cleaned in the peeling step (step S5), an alignment layer for alignment of a liquid crystal layer is formed on the exposed surface of the TFT large-sized substrate (see step S6) in a temperature range not to damage the heat resistance of the microlens array formed in step S4.

Figure 21A:
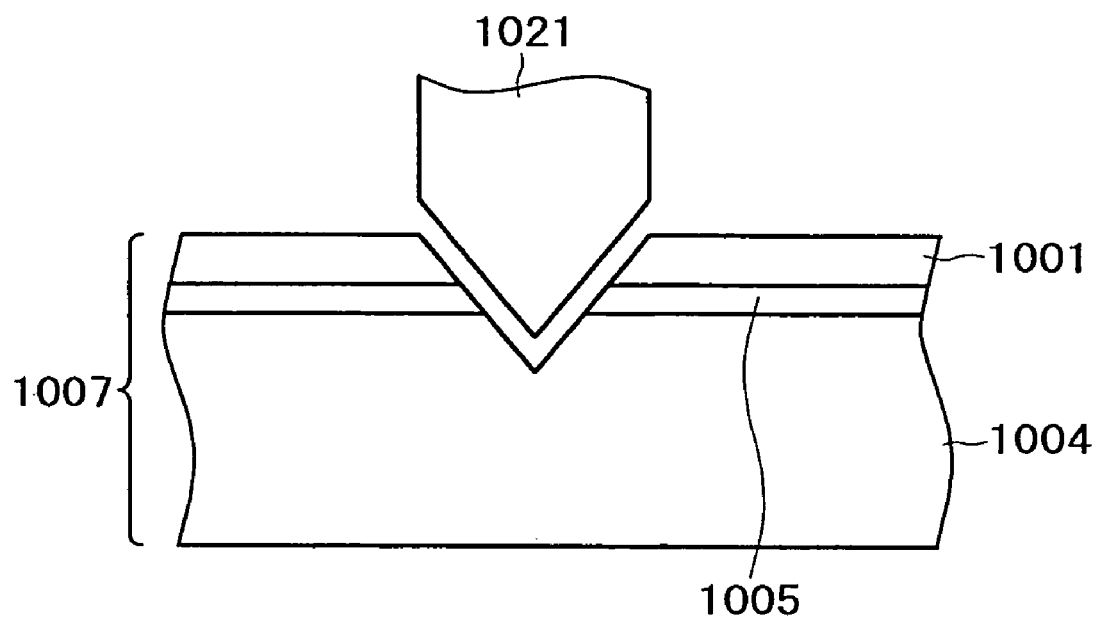
FIGS. 21A and 21B are typical diagrams showing a dividing step of the production method.
Figure 21B:
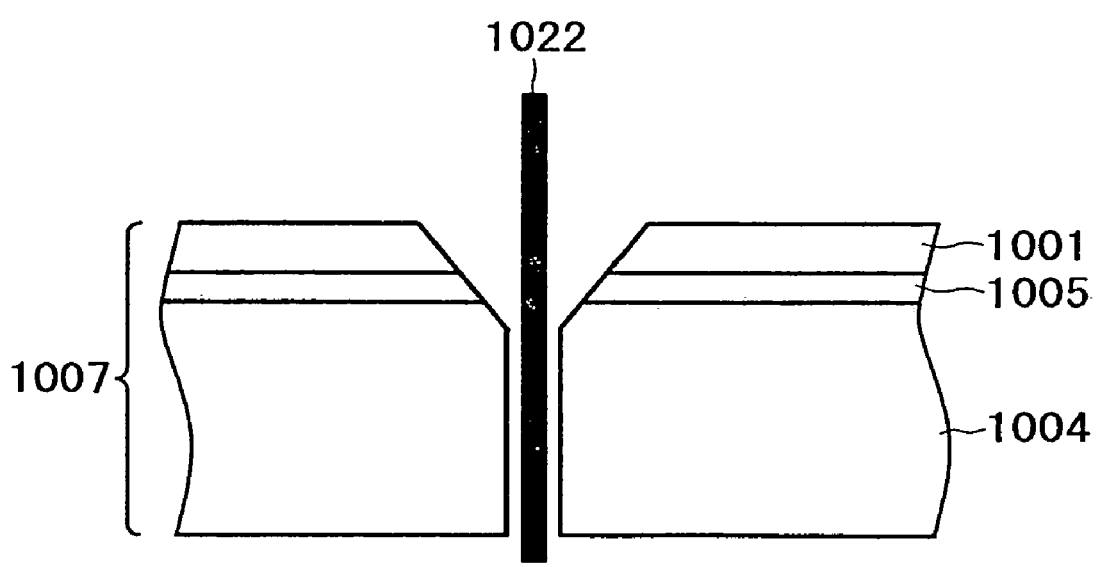

FIGS. 21A and 21B are typical diagrams showing a concrete dividing method used in the dividing step (step S7) shown in FIG. 20. The dividing method is performed by dividing a large-sized substrate by dicing or $CO_2$ laser cutting, to prepare microlens array incorporating single TFT substrates each having a specific size.

As shown in the figures, the method includes two steps. In the first step (first dicing) shown in FIG. 21A, a large-sized substrate 1007 is partially diced along boundaries, which are defined to partition a large-sized substrate 1007 into individual panels, by using a V-cut dicing blade 1021, to form V-shaped grooves in cross-section. In the second step (second dicing) shown in FIG. 21B, the grooves of the large-sized substrate 1007 are perfectly cut by using a general dicing blade 1022, to separate the large-sized substrate into respective panels. With these steps, it is possible to obtain single substrates with tapered end faces.

By partially dicing the large-sized substrate to form the V-shaped grooves in the large-sized substrate in the first step and fully dicing the large-sized substrate to separate the large-sized substrate into single substrates in the second step, it is possible to chamfer each of the single substrates. The single substrate thus chamfered is advantageous in preventing occurrence of cracking and chipping of an end face of the TFT thin substrate when the TFT substrate is assembled into the panel. In addition, each of the first dicing and the second dicing may be desirable to be continuously performed by using a dual dicer.

A third embodiment of the method of producing a liquid crystal display device according to the present invention will be described with reference to FIG. 22.

Figure 22:
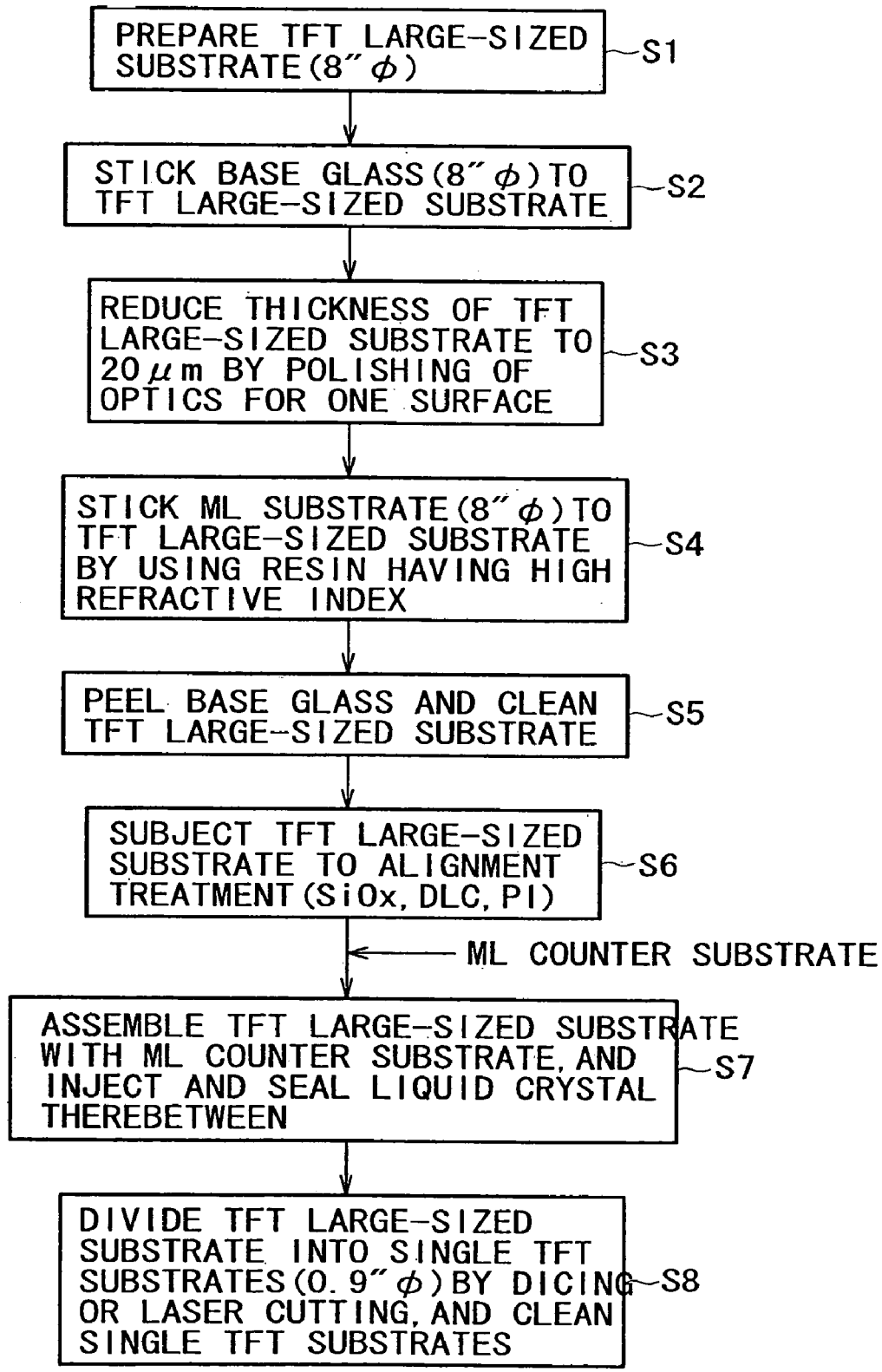
FIG. 22 is a process diagram showing another embodiment of the method of producing a liquid crystal display device according to the present invention.

FIG. 22 is a process diagram showing the steps of producing the liquid crystal display device in this embodiment, wherein a multi-chip module process is performed in steps S1 to S7 and a single-chip module process is performed in step S8, with ML counter substrates (single-chip module substrates) prepared between steps S6 and S7. This embodiment is different from the previous embodiment shown in FIG. 20 in that the above-described steps S7 and S8 are reversed to each other. In this embodiment, in step S7, non-defective single ML counter substrates having been subjected to alignment treatment are overlapped to a non-defective ML incorporating TFT large-sized substrate having been subjected to alignment treatment, to be thus assembled, and liquid crystal is injected in the gap therebetween and is sealed; and in step S8, the ML incorporating TFT large-sized substrate is divided, to obtain individual panels. As compared with the previous embodiment shown in FIG. 20, this embodiment is rational because the multi-chip module process can be continued immediately before the final step. As described above, according to this embodiment, after a microlens array corresponding to a plurality of single microlens arrays is formed on a TFT large-sized substrate, single counter substrates, on each of which a single microlens array is previously formed, are assembled to the TFT large-sized substrate (step S7), and the TFT large-sized substrate is divided, to form individual panels (step S8).

Figure 23:
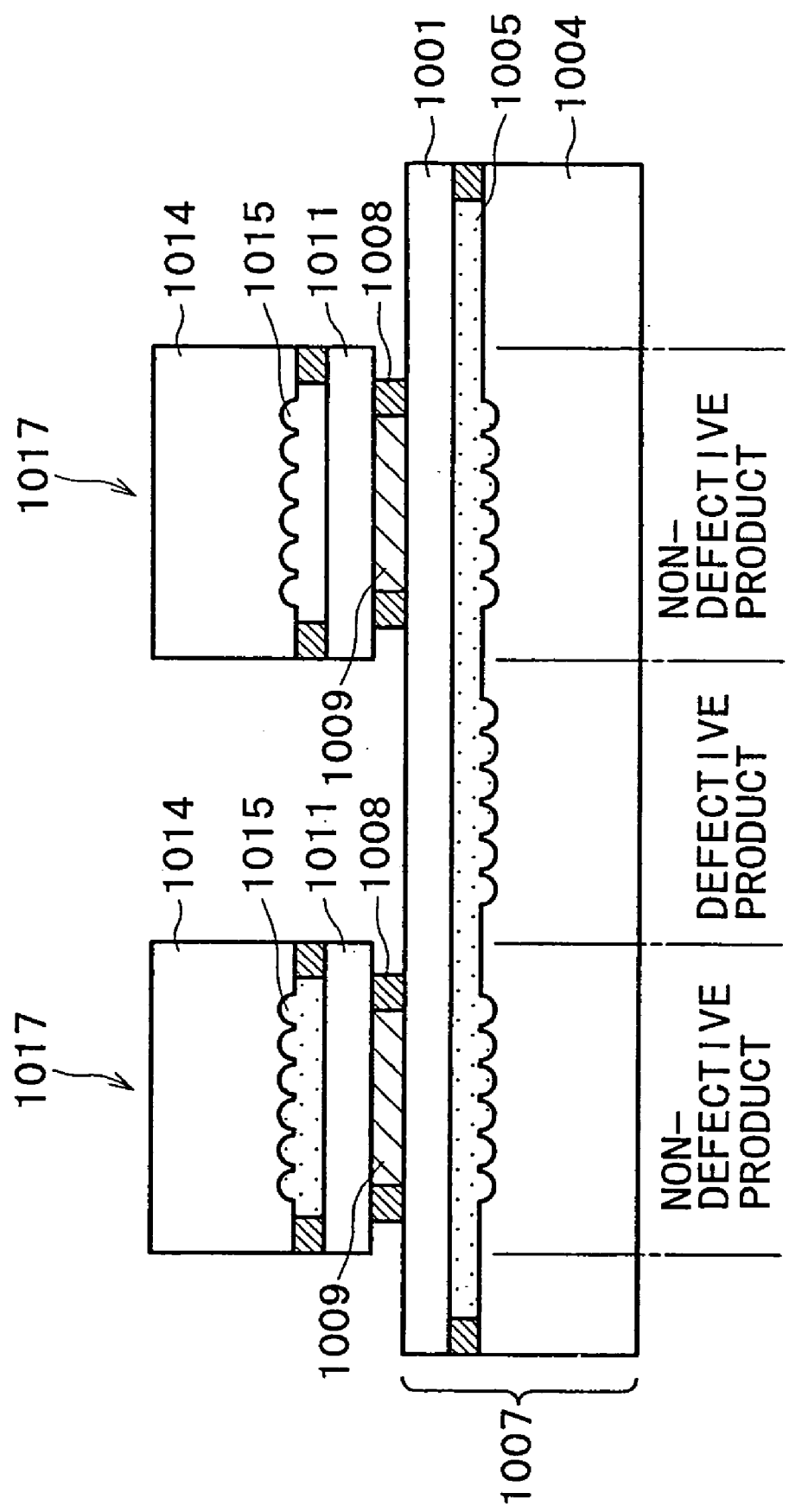
FIG. 23 is a typical diagram showing an assembling step of the production method.

FIG. 23 is a typical view showing a concrete assembling method used in the above-described assembling step S7 shown in FIG. 22. As shown in the figure, non-defective microlens array incorporating single substrates 1017 are overlapped on non-defective portions of the microlens incorporating TFT large-sized substrate 1007 with specific gaps kept therebetween and are fixed thereto by means of a seal material 1008, and liquid crystal 1009 is injected in gaps between both the substrates 1007 and 1017 and is sealed.

To be more specific, after the MLTFT large-sized substrate 10 is coated with the seal material 1008 of a UV-cured or thermally-cured type, the ML counter substrates 1017 are positioned to corresponding portions of the MLTFT large-sized substrate 1007 by using alignment marks provided therefore and are overlapped thereto with a specific gaps kept therebetween, and are fixed thereto by curing the seal material 1008 by UV irradiation or heating. The liquid crystal is then injected in the gaps through filling ports, and the filling ports are sealed by a UV-cured type adhesive.

After the assembling work in step S7 is thus completed, the MLTFT large-sized substrate 1007 is divided into single substrates by dicing or laser cutting. As shown by a dashed line, the MLTFT large-sized substrate 1007 is diced along boundaries of respective panels, to obtain panels. At this time, to prevent occurrence of cracking or chipping of an end face of the TFT thin substrate 1007, the dicing is preferably performed such that the TFT thin substrate 1007 is partially diced along the boundaries by using a V-cut dicing blade, to form V-shaped grooves, and the grooves of the TFT thin substrate 1007 are perfectly cut by using a general dicing blade, to separate the TFT thin substrate into respective panels.

Figure 24A:
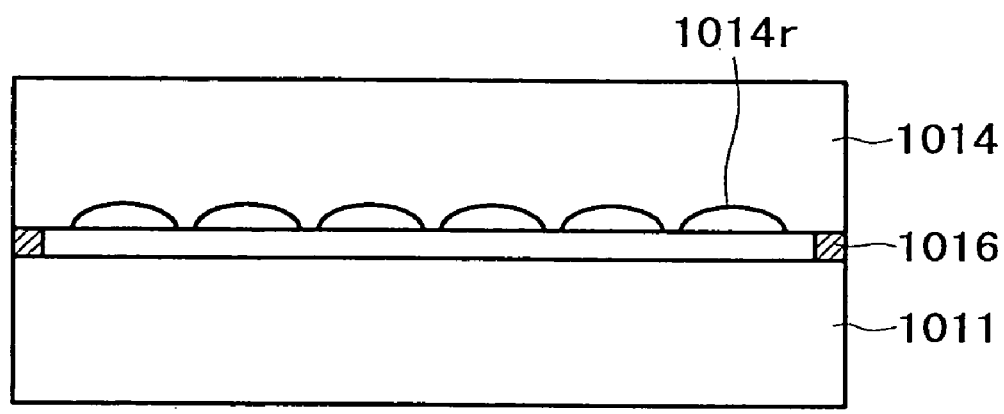
FIGS. 24A and 24B are typical diagrams showing a method of producing a microlens array incorporating counter substrate.
Figure 24B:
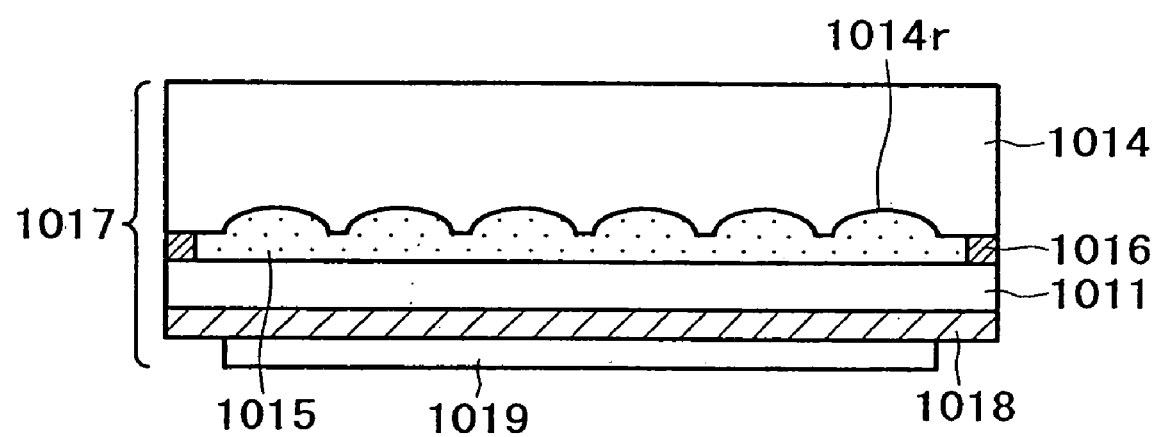

FIGS. 24A and 24B are process diagrams showing one example of the method of producing the ML counter substrate 1017 shown in FIG. 23.

As shown in FIG. 24A, a frame of a seal material 1016 is formed around a peripheral portion of an ML substrate 1014 on which microlens planes 1014r are previously formed. A cover glass substrate 1011 is overlapped to the ML substrate 1014 with a specific gap kept therebetween. In such a state, the seal material 1016 is cured.

As shown in FIG. 24B, a high refractive index transparent optical resin 1015 is injected in a gap between the cover glass substrate 1011 and the ML substrate 1014 and is cured by heating, and the gap is sealed by a UV-cured type adhesive. The thickness of the back surface side of the cover glass substrate 1011 is reduced by the method for one-surface polishing with a grade suitable for optics, to prepare the ML counter substrate 1017. A transparent conductive film such as ITO is formed over the polished back surface of the cover glass substrate 1011, to form a counter electrode 1018. A polyimide alignment film 1019 is formed on the counter electrode 1018, and is subjected to alignment treatment such as rubbing treatment. At this time, the thickness of the ML counter substrate 1017 may be adjusted to a specific value by polishing the ML substrate 1014 and the cover glass substrate 1011 in accordance with a method for both-surface polishing with a grade for optics. In this case, after the ML substrate 1014 is formed by filling the microlens planes 1014r with a high refractive index transparent resin, a transparent resin film may be formed on the surface, opposed to the microlens planes, of the resin and further a SiO₂ film be formed thereon by sputtering or vapor-deposition. The formation of such a stacked layer film can eliminate the need of provision of the cover glass substrate 1014, to reduce the production cost.

The single ML counter substrates 1017 thus formed are assembled on the multi-chip module type large-sized MLTFT substrate 1007 shown in FIG. 23.

A fourth embodiment of the method of producing a liquid crystal display device according to the present invention will be described with reference to FIG. 25.

Figure 25:
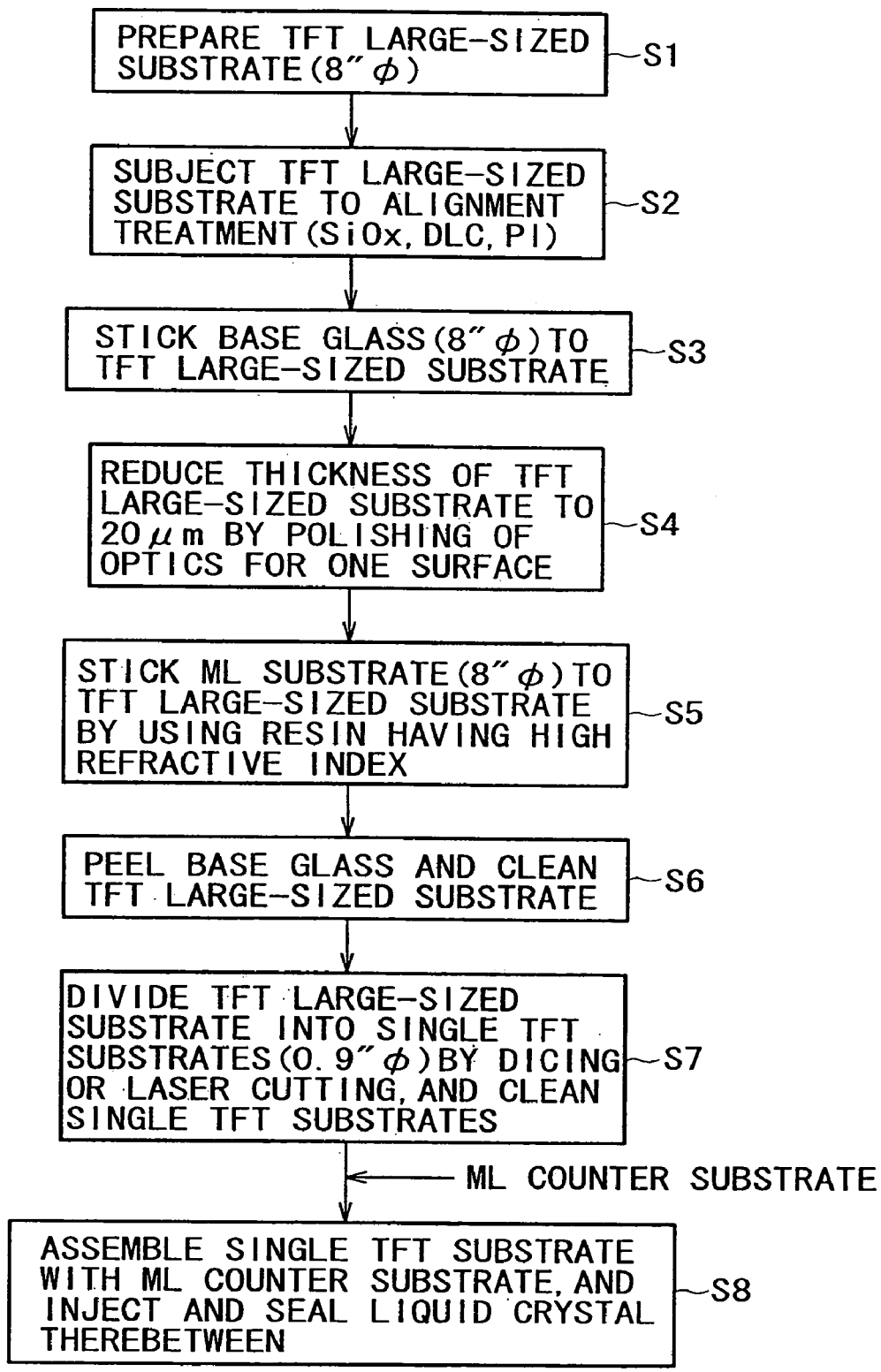
FIG. 25 is a process diagram showing a further embodiment of the method of producing a liquid crystal display device according to the present invention.

FIG. 25 shows the steps of producing a liquid crystal display device in this embodiment, wherein a multi-chip module process is performed in steps S1 to S6 and a single-chip module process is performed in steps S7 and S8, with ML counter substrates (single-chip module substrates) prepared between steps S7 and S8.

This embodiment is modified from the embodiment shown in FIG. 20.

In the embodiment shown in FIG. 20, the microlens array made from a high refractive index resin is formed between the TFT large-sized substrate and the ML large-sized substrate in step S4, and a polyimide alignment film is formed on the TFT large-sized substrate and is subjected to alignment treatment in step S6. In these steps, depending on the heat resistance of the high refractive index resin used for the microlens array, the polyimide film used for alignment treatment must be selected as a low temperature curable polyimide film.

On the contrary, in this embodiment, a polyimide film for alignment treatment is first formed in step S2, and then a microlens array made from a high refractive index resin is formed in step S5. The polyimide film for alignment treatment is thus not required to be selected as a low temperature curable polyimide film, but may be selected as a high temperature curable polyimide film excellent in performance and stability.

In this way, according to this embodiment, before a series of steps, that is, a bonding step, a polishing step, a sticking step, and a peeling step are performed to integrate a microlens array to the back surface of a TFT large-sized substrate, an alignment step for forming an alignment layer used for alignment of a liquid crystal layer on the surface of the TFT large-sized substrate is performed (step S2).

A general polyimide resin is curable at a high temperature of about 180° C., whereas a general high refractive index transparent resin is curable a low temperature ranging from 60 to 120° C. Accordingly, it is undesirable to form a film made from a general polyimide on the TFT large-sized substrate on which a microlens array made from a general high refractive index transparent resin has been mounted. For this reason, in the embodiment shown in FIG. 20, a low temperature curable polyimide film or a DLC film is used as an alignment film. On the contrary, in this embodiment, since an alignment film for alignment treatment is formed before a microlens array made from a high refractive index resin is formed, a film made from a general polyimide resin curable at a high temperature of about 180° C. can be used as the alignment film.

A fifth embodiment of the method of producing a liquid crystal display device according to the present invention will be described with reference to FIG. 26.

Figure 26:
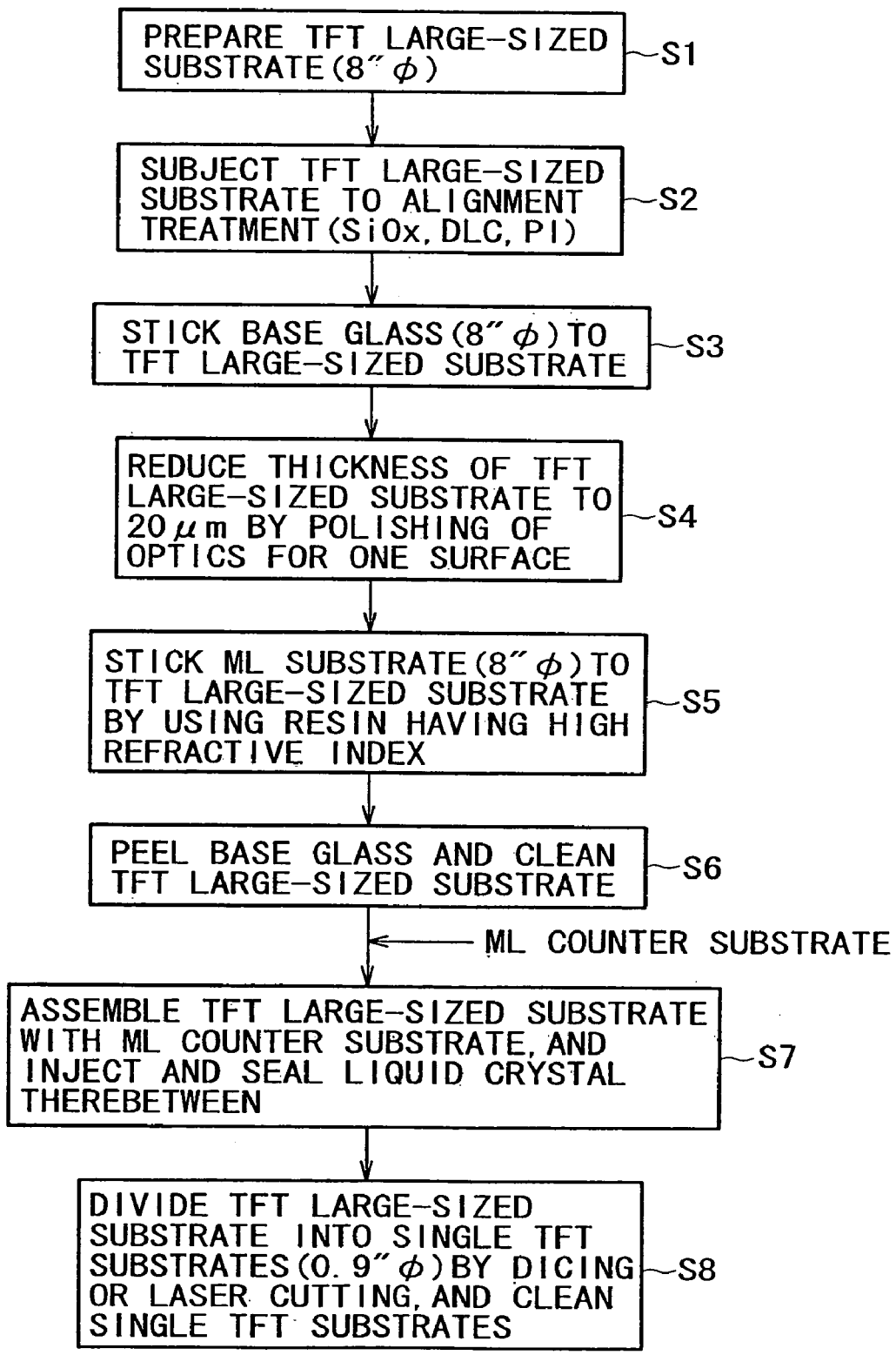
FIG. 26 is a process diagram showing a further embodiment of the method of producing a liquid crystal display device according to the present invention.

FIG. 26 is a process diagram showing the steps of producing a liquid crystal display device in this embodiment, wherein a multi-chip module process is performed in steps S1 to S6 and a single-chip module process is performed in steps S7 and S8, with ML counter substrates (single-chip module substrates) prepared between steps S6 and S7.

In this embodiment, like the previous embodiment shown in FIG. 22, single ML counter substrates are assembled to a MLTFT large-sized substrate and then the MLTFT large-sized substrate is divided into single substrates corresponding to individual panels; however, unlike the previous embodiment shown in FIG. 22, the alignment treatment using an alignment film is performed in step S2, and then the formation of a microlens array using a high refractive index transparent resin is performed in step S5. As a result, like the embodiment shown in FIG. 25, a film made from a high temperature curable polyimide resin can be used as the alignment film.

A sixth embodiment of the method of producing a liquid crystal display device according to the present invention will be described with reference to FIG. 27.

Figure 27:
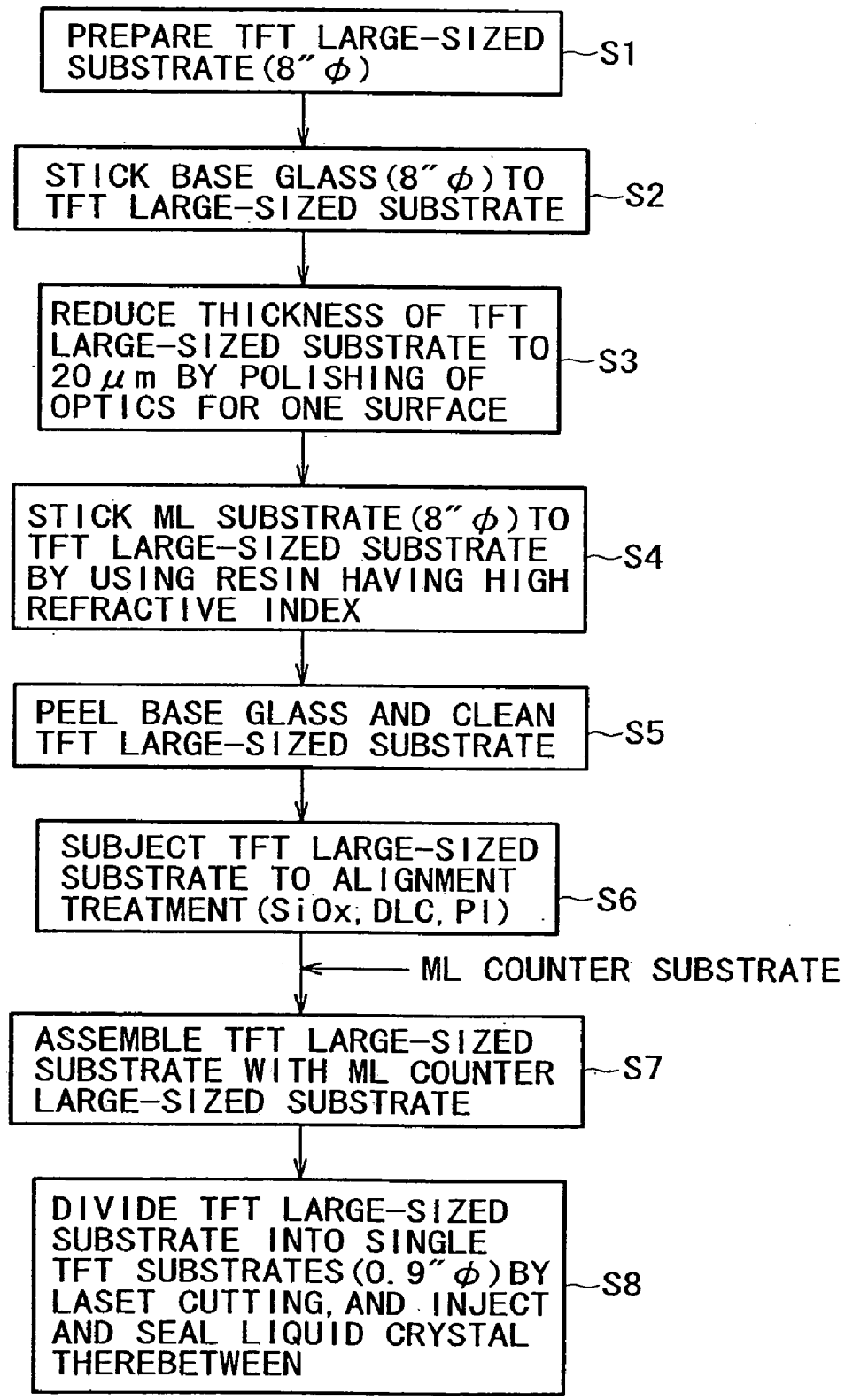
FIG. 27 is a process diagram showing a further embodiment of the method of producing a liquid crystal display device according to the present invention.

FIG. 27 is a process diagram showing the steps of producing a liquid crystal display device in this embodiment, wherein a multi-chip module process is performed in steps S1 to S7 and a single-chip module process is performed in step S8, with an ML counter large-sized substrate (multi-chip module substrate) prepared between steps S6 and S7.

According to this embodiment, in step S7, an ML counter large-sized substrate is assembled to an MLTFT large-sized substrate, and in step S8, the assembly of the MLTFT large-sized substrate and the ML counter large-sized substrate is divided into individual panels. Since both the large-sized substrates are used immediately before the final step, the production process is more rationalized. In this embodiment, however, the selection of whether products are non-defective or defective is performed by inspection for single products after the final step.

As described above, according to this embodiment, the ML counter large-sized substrate incorporating a microlens array corresponding to a plurality of single microlens arrays is overlapped to the MLTFT large-sized substrate incorporating a microlens array corresponding to a plurality of single microlens arrays with a specific gap kept therebetween, to be assembled into a large-sized panel portion corresponding to a plurality of panels (step S7), and the assembly is divided into individual panels (step S8). In addition, according to this embodiment, the microlens array using a high refractive index transparent optical resin is formed in step S4, and a low temperature curable polyimide film or a DLC film for alignment treatment is formed in step S6.

A seventh embodiment of the method of producing a liquid crystal display device according to the present invention will be described with reference to FIG. 28.

Figure 28:
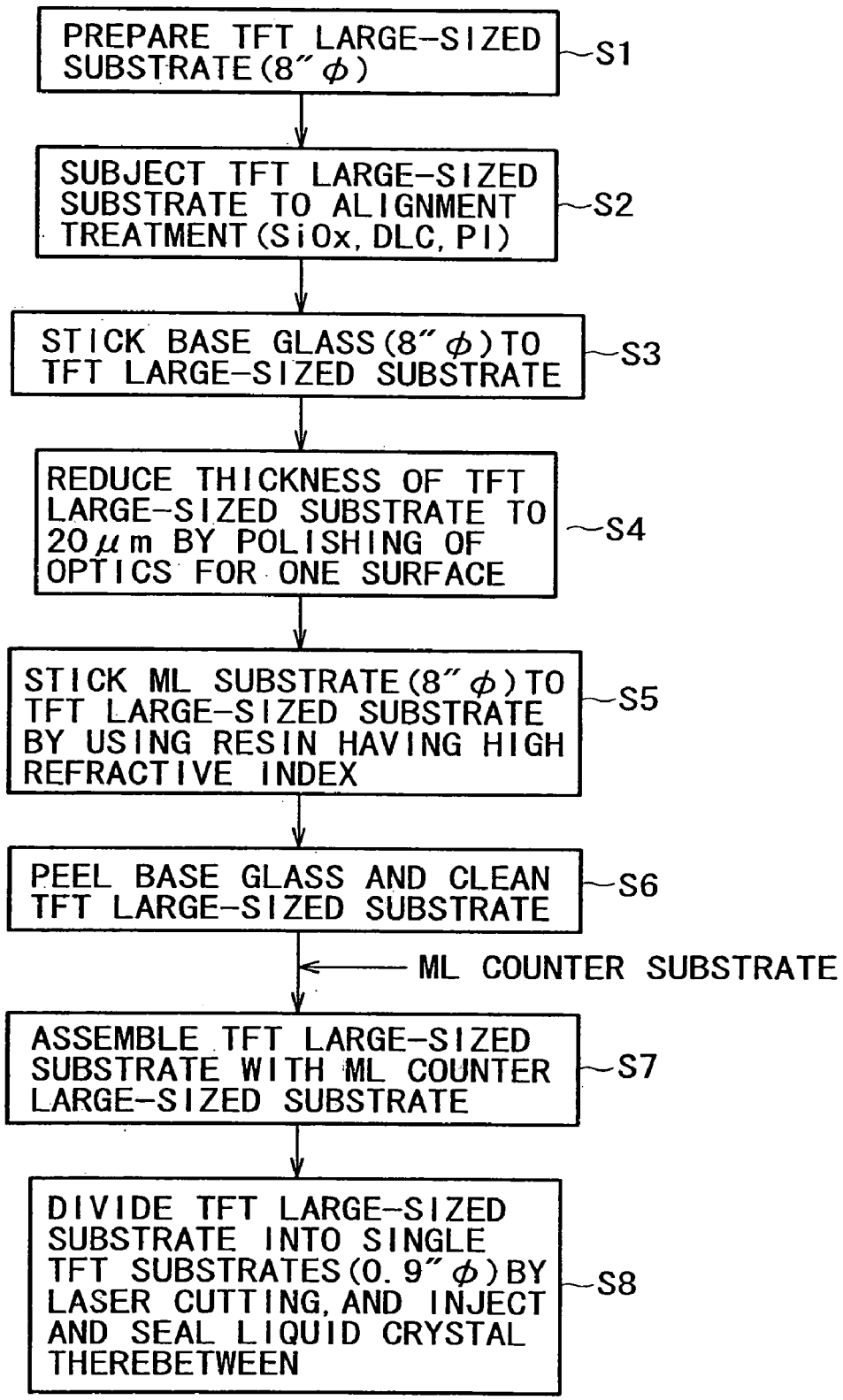
FIG. 28 is a process diagram showing a further embodiment of the method of producing a liquid crystal display device according to the present invention.

FIG. 28 is a process diagram showing the steps of producing a liquid crystal display device in this embodiment, wherein a multi-chip module process is performed in steps S1 to S7 and a single-chip module process is performed in step S8, with an ML counter large-sized substrate (multi-chip module substrate) prepared between steps S6 and S8.

In this embodiment, like the previous embodiment shown in FIG. 27, an ML counter large-sized substrate is assembled to a TFT large-sized substrate, and then the assembly is divided into individual panels; however, unlike the previous embodiment shown in FIG. 27, an alignment film for alignment treatment is formed in step S2 and a microlens array using a high refractive index transparent optical resin is formed in step S5. Accordingly, a general high temperature curable polyimide film can be used as the alignment film for alignment treatment.

An eighth embodiment of the method of producing a liquid crystal display device according to the present invention will be described with reference to FIG. 29.

Figure 29:
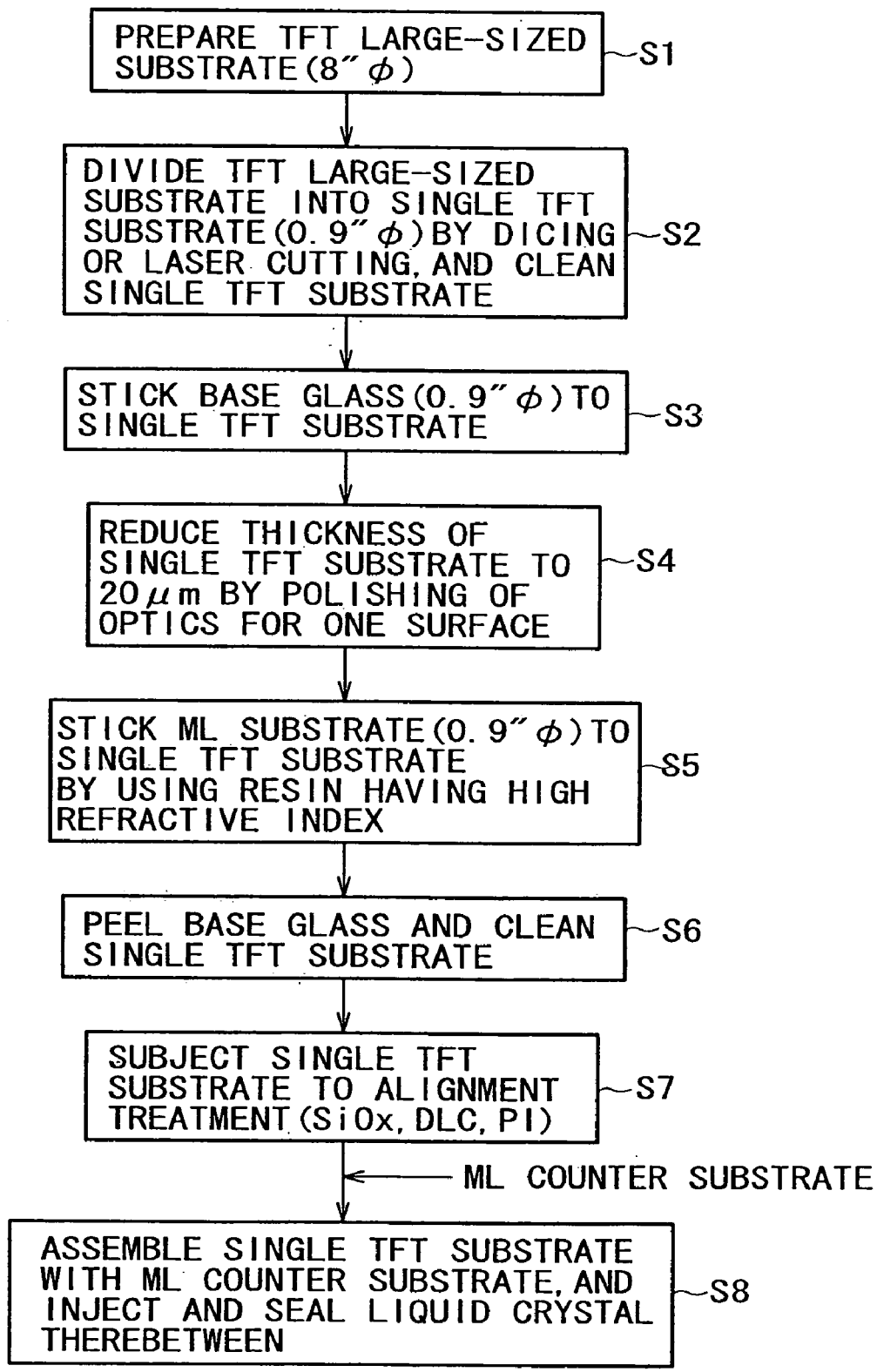
FIG. 29 is a process diagram showing a further embodiment of the method of producing a liquid crystal display device according to the present invention.

FIG. 29 is a process diagram showing the steps of producing a liquid crystal display device in this embodiment, wherein a multi-chip process is performed in step S1 and a single-chip module process is performed in steps S2 to S8, with ML counter substrates (single-chip module substrates) prepared between steps S7 and S8.

In this embodiment, unlike the previous embodiments, panels are obtained by basically adopting a single-chip module process in place of a multi-chip module process.

A TFT large-sized substrate having a diameter of 8 inches is prepared in step S1, and is then divided into TFT single substrates each having a 0.9 inch square size by dicing or $CO_2$ laser cutting. If needed, the TFT single substrate may be coated with a resist film for protecting the surface and preventing contamination due to a halogen gas.

In step S3, a base glass having a 0.9 inch square size is stuck on each of the TFT single substrates. The base glass may be borosilicate glass and the TFT substrate may be made from synthetic quartz glass. The parallelism of the base glass is accurately finished to 1 to 2 $\mu$m. The base glass is bonded to the TFT substrate by means of a double-coated tape of a thermoplastic transparent polymer type or UV-cured type adhesive or a double-coated tape of a thermo-setting type adhesive.

In step S4, the back surface of the TFT substrate is polished by the method for one-surface polishing with a grade suitable for optics to be thinned to a thickness of 20 $\mu$m. A variation in thickness of the TFT substrate is preferably suppressed within ±3 $\mu$m. In step S5, a microlens substrate (ML substrate) having a 0.9 inch square size, in which microlens planes are previously formed, is overlapped to the thinned TFT substrate, and a high refractive index transparent resin is injected in a gap therebetween and is sealed.

In step S6, the base glass is peeled from the TFT substrate by, for example, heating, and the TFT substrate is cleaned with an organic solvent. The peeled base glass, which is highly accurately finished, is re-usable. In addition, the base glass may be peeled and the TFT substrate may be cleaned after curing of a seal material by UV irradiation in the subsequent step. In step S7, alignment treatment is performed by, for example, forming a low temperature curable polyimide alignment film and subjecting the polyimide film to rubbing treatment a buffing material; or forming a DLC film and subjecting the DLC film to ion irradiation with directivity.

In step S8, a single ML counter substrate is overlapped to the MLTFT substrate with a specific gap kept therebetween, and liquid crystal is injected in the gap and is sealed. To be more specific, a frame of, for example, a UV-cured type seal material is formed on one of the substrates, and the other substrate is overlapped thereto with a specific gap kept therebetween while alignment marks provided therefore are aligned to each other. The seal material is cured by UV irradiation, to fix both the substrates to each other. An empty panel (in the state before being filled with liquid crystal) is thus obtained. Liquid crystal is injected in the panel via a filling port formed in the seal material and is sealed, to finish a duel microlens array type liquid crystal display device.

A ninth embodiment of the method of producing a liquid crystal display device according to the present invention will be described with reference to FIG. 30.

Figure 30:
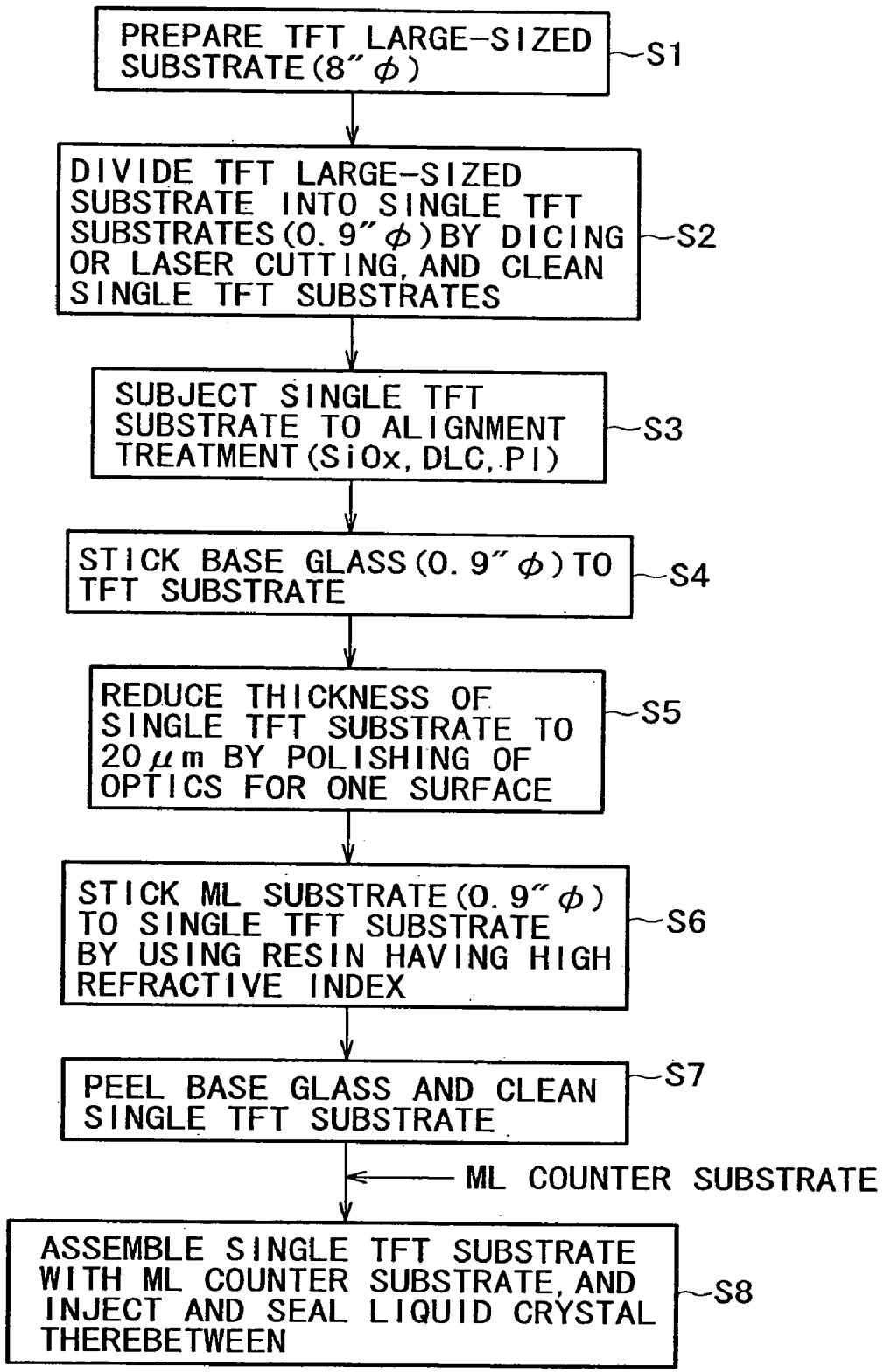
FIG. 30 is a process diagram showing a further embodiment of the method of producing a liquid crystal display device according to the present invention.

FIG. 30 is a process diagram showing the steps of producing a liquid crystal display device in this embodiment, wherein a multi-chip module process is performed in step S1 and a single-chip module process is performed in steps S2 to S8, with ML counter substrates (single-chip module substrates) prepared between steps S7 and S8.

In this embodiment, like the previous embodiment shown in FIG. 29, panels are obtained by basically adopting a single-chip module process; however, unlike the previous embodiment shown in FIG. 29, an alignment film for alignment treatment is formed in step S3, and a microlens array using a high refractive index transparent optical resin is formed after the ML substrate is stuck on the TFT substrate in step S6.

A tenth embodiment of the method of producing a liquid crystal display device according to the present invention will be described with reference to FIG. 31.

Figure 31:
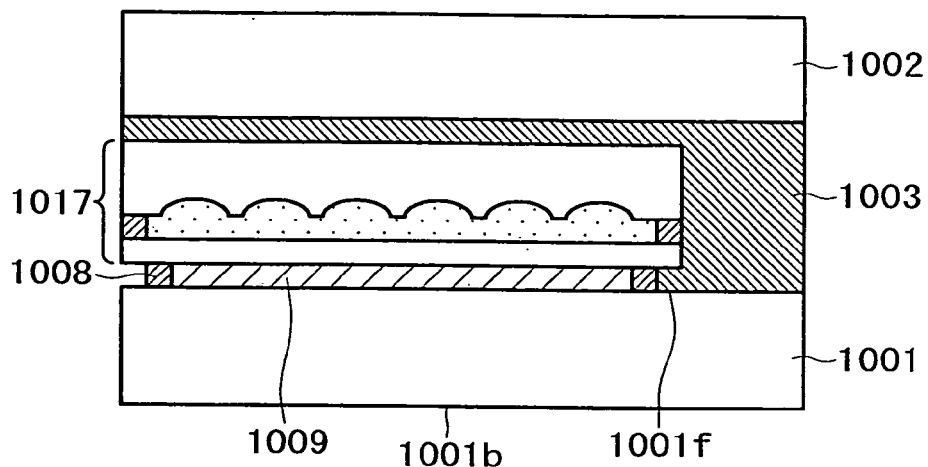
FIG. 31 is a typical diagram showing a further embodiment of the method of producing a liquid crystal display device according to the present invention.

FIG. 31 is a process diagram showing the steps of producing a liquid crystal display device in this embodiment.

In a preliminary step, an ML counter substrate 1017 obtained by integrating a microlens array to a first substrate on which a counter electrode is previously formed is prepared. In an assembling step, the counter substrate (ML substrate) 1017 integrated with the microlens array is overlapped to the front surface 1001f of a TFT substrate 1001 on which pixel electrodes and switching devices for driving the pixel electrodes are previously formed with a specific gap kept therebetween, and liquid crystal is injected in the gap and sealed, to obtain a panel. In a bonding step, a base glass 1002 is bonded to the ML counter substrate 1017 overlapped to the front surface 1001f of the TFT substrate 1001 by using an adhesive 1003 such as a hot melt based water-soluble wax, bees wax, or a cyanoacrylate based adhesive. The adhesive 1003 may be that obtained by diluting an acrylate with a non-chlorine based organic solvent (acetone, a combination of acetone and ethanol, or IPA). In a polishing step, in the state being held by the base glass 1002, the back surface 1001b of the TFT substrate is polished. In a sticking step, a microlens array is stuck on the polished back surface 1001b of the TFT substrate 1001.

Unlike the previous embodiments, after a panel is previously prepared, the back surface of the TFT substrate is polished and the microlens array is stuck on the polished back surface of the TFT substrate.

In the production method shown in FIG. 31, since the TFT substrate 1001 on which pixel electrodes and thin film transistors are previously integrated is polished, it is desirable to take a measure against damages due to static electricity.

Figure 32:
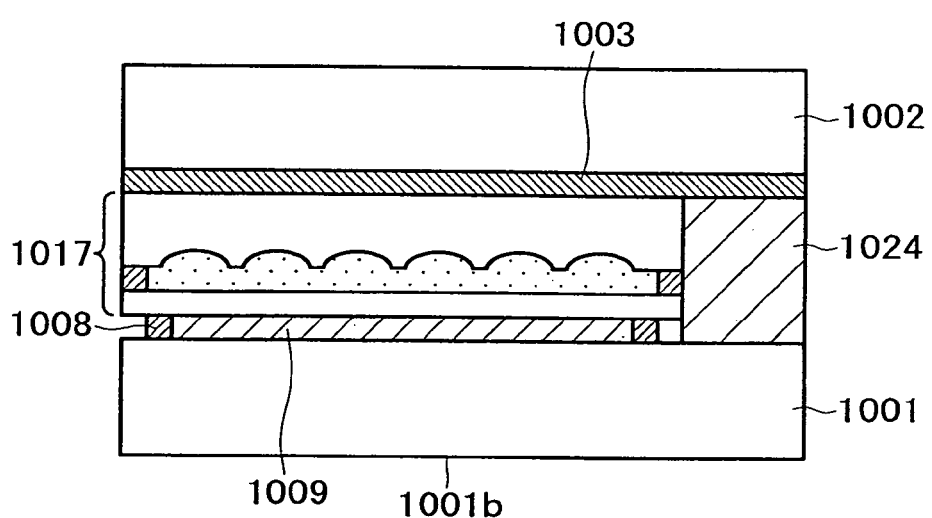
FIG. 32 is a typical diagram showing a panel taking a measure against static electricity.

FIG. 32 shows an example of the measure against damages due to static electricity, wherein a conductive paste 1024 with no residual coating portion is used as the measure against damages due to static electricity. As shown in FIG. 32, a tape, particularly, a conductive paste tape with no residual coating portion having a thickness nearly equal to that of the microlens incorporating counter substrate 1017 is provided in such a manner as to be short-circuited with an output terminal formed on the TFT substrate 1001, wherein the base glass is fixed to the ML counter substrate 1017 with an adhesive 1003.

Figure 33:
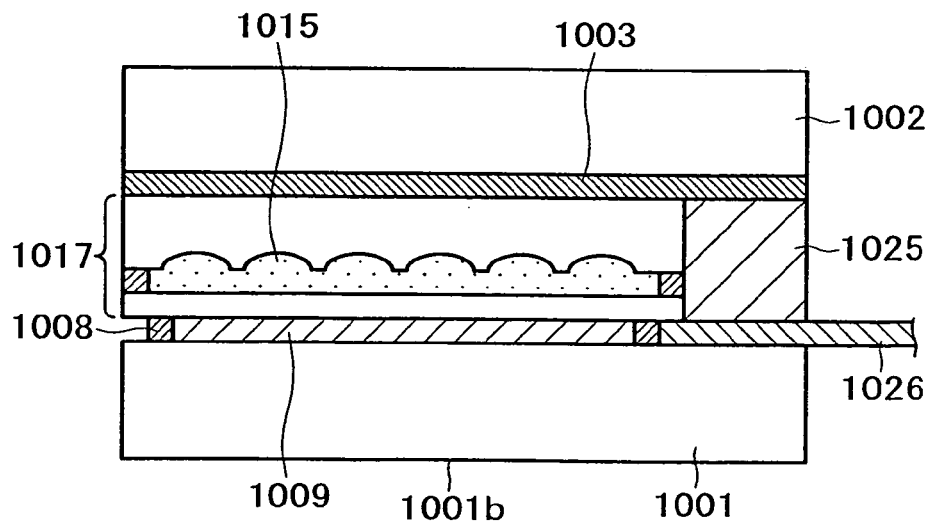
FIG. 33 is a typical diagram showing another panel taking a measure against static electricity.

FIG. 33 shows another example of the measure against damages due to static electricity. As shown in FIG. 33, a connector 1026 composed of a flexible printed board for external connection is mounted to a connection terminal of the TFT substrate 1001 by thermo-compression bonding, and the base glass 1002 is fixed to the ML counter substrate 1017 by the adhesive 1003 or a double-coated tape. To stabilize the connector 1026, a gap between the base glass 1002 and the TFT substrate 1001 is filled with the adhesive 1003 or filled with a tape member 1025 having a thickness nearly equal to that of the microlens array incorporating counter substrate 1017. The connector 1026 may be shorten to an extent not to exert adverse effect on polishing of the TFT substrate 1001 by the method for one-surface polishing with a grade suitable for optics in the subsequent step, and the terminal of the connector 1026 is short-circuited or covered in order not to be contaminated by abrasive or the like. In this way, to take the measure against damages due to static electricity, the back surface of the TFT substrate 1001 is polished in the state that a plurality of terminals for external connection formed on the TFT substrate are kept at the same potential.

Figure 34:
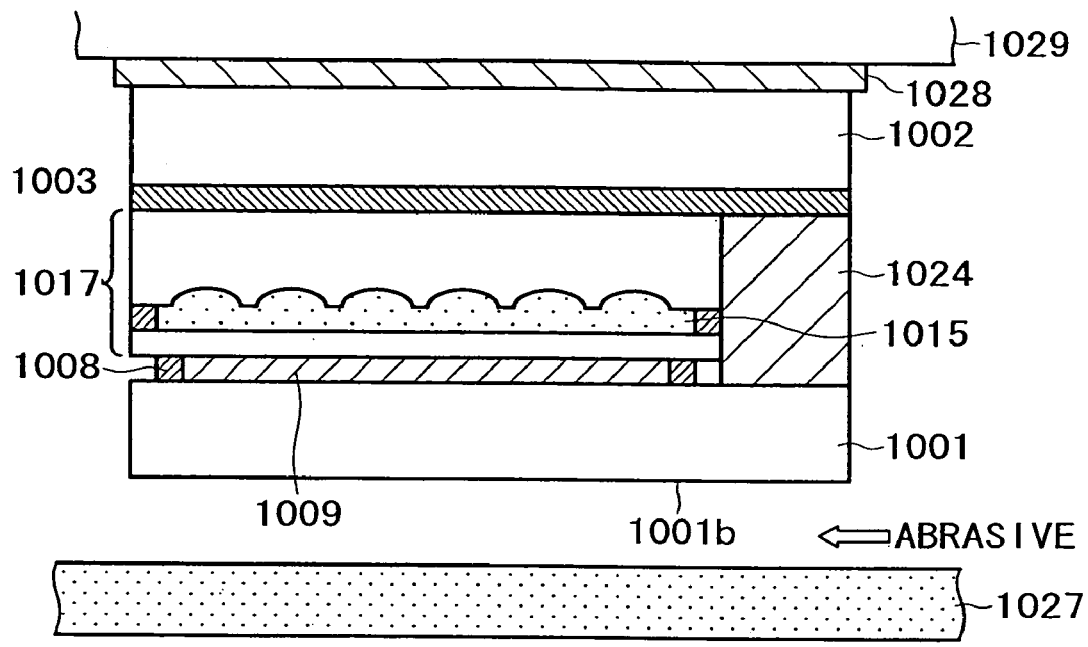
FIG. 34 is a typical diagram showing a polishing step.

FIG. 34 is a typical diagram showing the polishing treatment for the panel shown in FIG. 32. As shown in the figure, the base glass 1002 side of the panel is stuck on a work holder 1029 for polishing, and the back surface 1001b of the TFT substrate 1001 is polished with the base glass 1002 taken as a reference. To prevent the liquid crystal 1009 enclosed in the panel from being heated to a transition temperature or more, it is desirable to cool the TFT substrate 1001 during polishing thereof by the method for one-surface polishing with a grade suitable for optics. This makes it possible to keep the alignment state of the liquid crystal 1009. In the example shown in the figure, one-surface buffing is performed as the method for one-surface polishing with a grade suitable for optics. The back surface 1001b of the TFT substrate 1001 is pressed to a polishing platen 1027 by applying a specific load to the TFT substrate 1001. At this time, a specific amount of abrasive is supplied to the polishing platen 1027.

To be more specific, the polishing work is performed by rotating the polishing platen 1027 such as a tin platen, a vinyl platen, or cloth platen on its axis, constantly dropping a specific amount of a liquid such as water, oil, or organic solvent containing abrasive such as silicon carbide, alumina, or diamond on the polishing platen 1027, pressing a workpiece fixed to the work holder 1029 to the polishing platen 1027 with a specific load applied to the workpiece, and polishing the surface of the workpiece. The polishing is made in the order of rough polishing, medium polishing, and finish polishing, and the particle size of the abrasive is correspondingly reduced to gradually increase the polishing accuracy. If the amount to be polished is large, the workpiece is thinned to a thickness close to a target thickness by rough-polishing, and is then finished by medium-polishing and finish-polishing. If the TFT substrate 1001 has a thickness of 800 µm, the substrate 100 is thinned to a thickness of 100 µm by rough-polishing and further thinned to a thickness of 50 µm by medium-polishing, and is finished to a thickness of 20 µm by finish-polishing. In this case, assuming that the allowance of the thickness of the TFT substrate is 20±3 µm, finish polishing is performed while the residual thickness is checked by an optical or laser type step depth meter with the alignment mark on the surface of the TFT substrate taken as a reference for each polished amount of 10 µm. During such polishing, the panel is not peeled. This is because the TFT substrate is overlapped to the counter substrate with a gap of 1 to 3 µm kept therebetween and is fixed thereto by the seal material, and further the spacer is in contact with every pixel.

Figure 35:
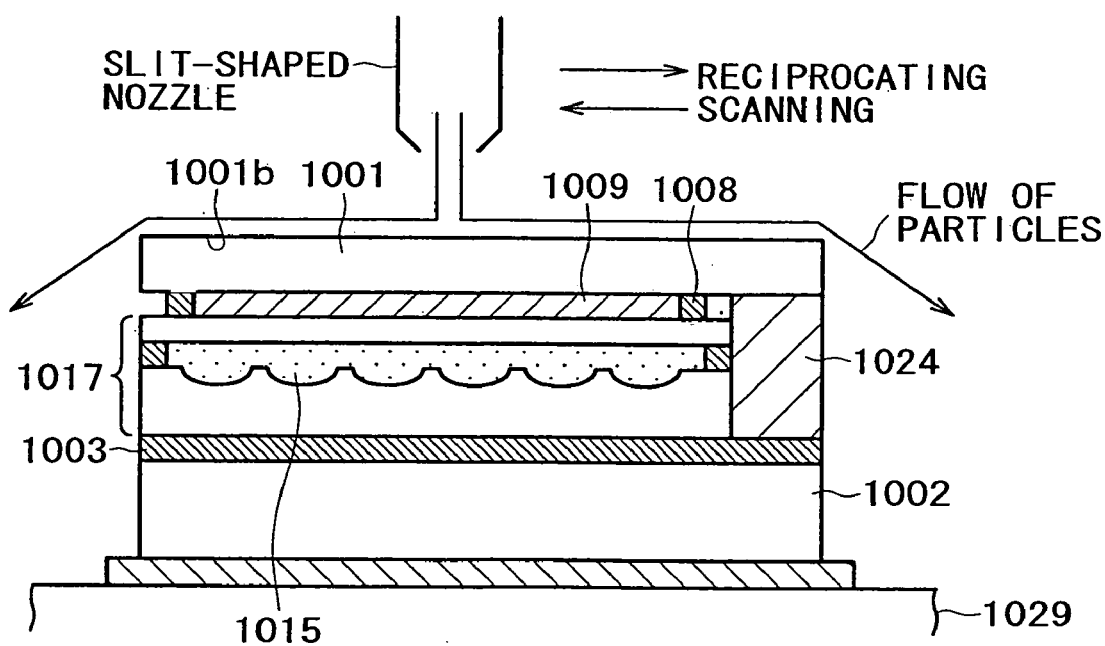
FIG. 35 is a typical diagram showing another polishing step.

FIG. 35 is a typical diagram showing a polishing treatment using blasting of particles. As shown in the figure, the blasting is performed by preparing a laminar flow of high pressure air in which particles of abrasives such as silicon carbide, boron carbide, or diamond are dispersed, and blasting a specific amount of the laminar flow from an injection port at the leading end of a slit-shaped nozzle 1030 while scanning the nozzle in the reciprocating directions over the back surface 1001b of the TFT substrate 1001, to polish the back surface 1001b of the TFT substrate 1001. The blasting is made in the order of rough blasting, medium blasting, and finish blasting, and the particle size of the abrasive is correspondingly reduced to gradually increase the polishing accuracy. If the amount to be polished is large, the workpiece is thinned to a thickness close to a target thickness by rough-blasting, and is then finished by medium-blasting and finish-blasting. If the TFT substrate 1001 has a thickness of 800 µm, the substrate 100 is thinned to a thickness of 300 µm by rough-blasting and further thinned to a thickness of 200 µm by medium-blasting, and is finished to a thickness of 50 µm by finish-blasting.

Assuming that the allowance of the thickness of the TFT substrate is 20±3 µm, after the TFT substrate is finished to a thickness of 50 µm by finish-blasting, the TFT substrate may be further finished by finish-buffing performed as the method for polishing with a grade suitable for optics shown in FIG. 34. The finish polishing is performed while the residual thickness is checked by an optical or laser type step depth meter with the alignment mark on the surface of the TFT substrate taken as a reference for each polished amount of 10 µm.

Figure 36:
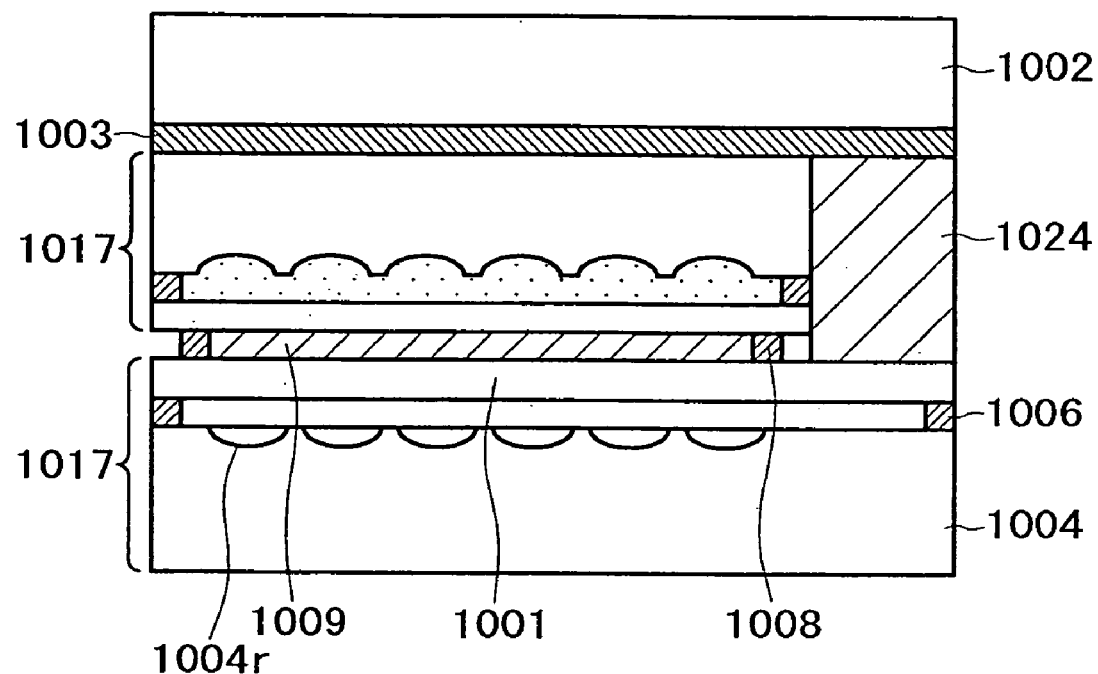
FIG. 36 is a sectional view showing a sticking step using an optical resin.

FIG. 36 shows a step of sticking the ML substrate 1004 to the back surface of the TFT substrate 1001 after the polishing step shown in FIG. 34. As shown in the figure, in the state that the base glass 1002, the ML incorporating counter substrate 1017, and the TFT substrate 1001 are integrated with each other, a frame of a seal material 1006 made from a UV-cured type adhesive or a UV-cured/thermal-cured combination type adhesive is formed around a peripheral portion of the back surface of the TFT thin substrate 1001 by dispense-coating of the seal material 1006. The ML substrate 1004 is overlapped to the TFT thin substrate 1001 with a specific gap kept therebetween while alignment marks provided therefore are aligned to each other, and the seal material 1006 is cured by UV irradiation. At this time, the focal distance of each microlens is finely adjusted by the thickness of the seal material 1006. For easy fine adjustment, the seal material 1006 may contain a spacer having specific sizes in an amount not to degrade the seal characteristic. The space is made from a metal, glass, ceramic, or the like. These materials may be used singly or in combination. The material is preferably used in the form of particles having spherical shapes or fiber shapes.

Figure 37:
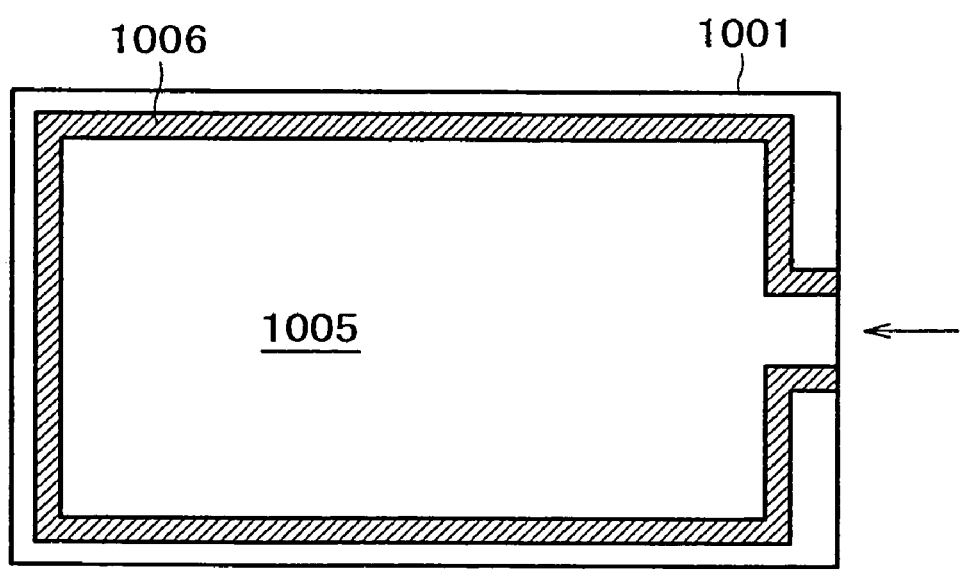
FIG. 37 is a plane view of FIG. 36, showing the sticking step using an optical resin.

FIG. 37 shows a filling step after the sticking step shown in FIG. 36. As shown in the figure, a high refractive index transparent optical resin 1005 is press-injected under vacuum in the gap through a filling port provided in the frame-shaped seal material 1006 and the filling port is sealed with a UV-cured type adhesive. While not shown, in the case of using a cyanoacrylate based adhesive as the adhesive 1003, the cyanoacrylate based adhesive is melted by heating, to peel the base glass 1002, followed by cleaning of the entire panel with an organic solvent such as IPA, acetone, a combination of acetone and ethanol, or methanol. In the case of a hot melt type water-soluble wax as the adhesive 1003, the water-soluble wax is melted by heating, to peel the base glass 1002, followed by ultrasonic cleaning of the entire panel with pure water or hot pure water at 50 to 60° C.

FIG. 36A shows an example that a jig 1002a is used in place of a base glass for supporting the panel. The jig 1002a serving as a base glass is fixed to a work holder 1029 of a polishing platen. Passages 1002b for vacuum attraction are formed in the jig 1002a and the work holder 1029. The panel obtained by assembling the TFT substrate 1001 to the microlens array incorporating counter substrate 1017 is polished in a state being fixed by the jig 1002a. In this case, to prevent damages due to static electricity upon polishing, it is desirable to short-circuit an external connection terminal 1001t of the TFT substrate 1001 to a conductive pad 1002p provided on the jig 1002a.

Figure 38A:
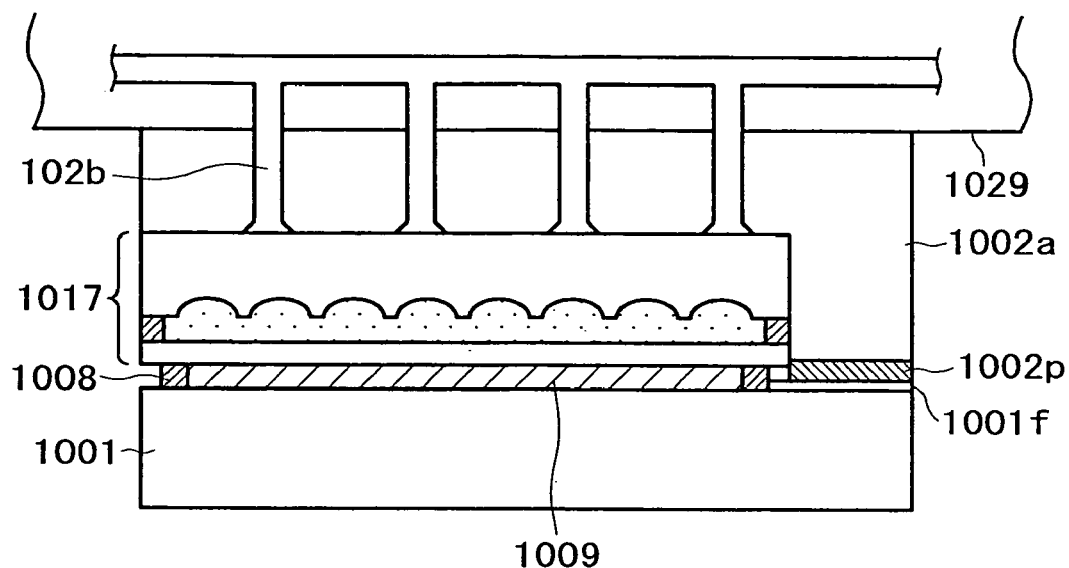
FIGS. 38A to 38C are typical sectional views showing another polishing step.
Figure 38B:
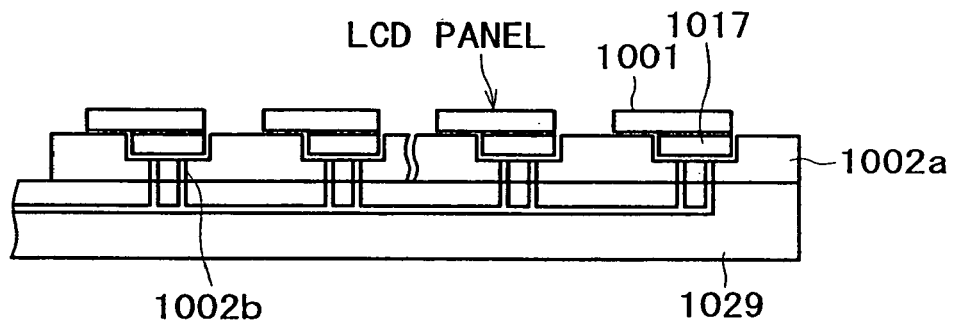
Figure 38C:
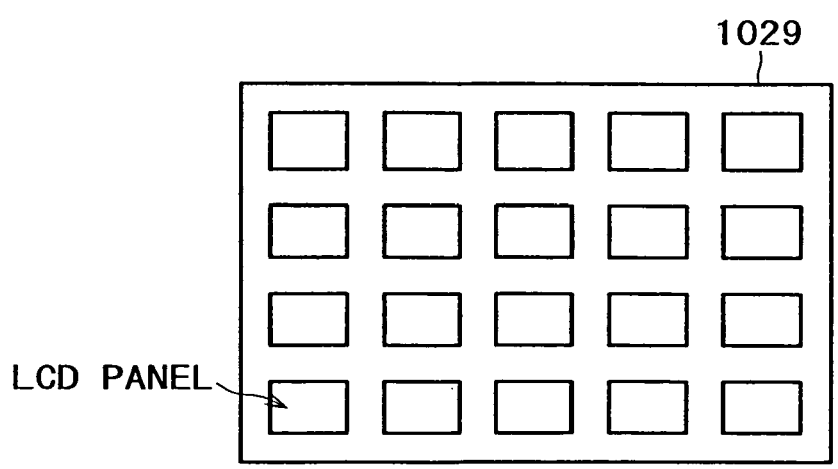

FIGS. 38B and 38C show an example that LCD panels are fixed to a work holder 1029 of a large-sized polishing platen provided with a plurality of jigs 1002a serving as base glasses. The ML counter substrate 1017 side of each panel is set in a recess of the jig 1002a with the TFT substrate 1001 side directed upwardly and is fixed thereto by vacuum attraction, and in such a state, the back surface of the TFT substrate is polished. Even in this case, to prevent damages due to static electricity upon polishing, it is desirable to short-circuit an external connection terminal of the TFT substrate to a conductive pad provided on the jig 1002a.

In general, the synthetic quartz glass as a material of a TFT substrate and a counter substrate for a high temperature polysilicon TFTLCD used for a projector is specified to be finished with high accuracy in terms of surface roughness and dimensions. From this viewpoint, according to the embodiments shown in FIGS. 31 to 38, the counter substrate can be used in place of the base glass by sufficiently checking the film thickness of the counter substrate during polishing, to eliminate the need of provision of the base glass, thereby reducing the production cost.

Figure 39:
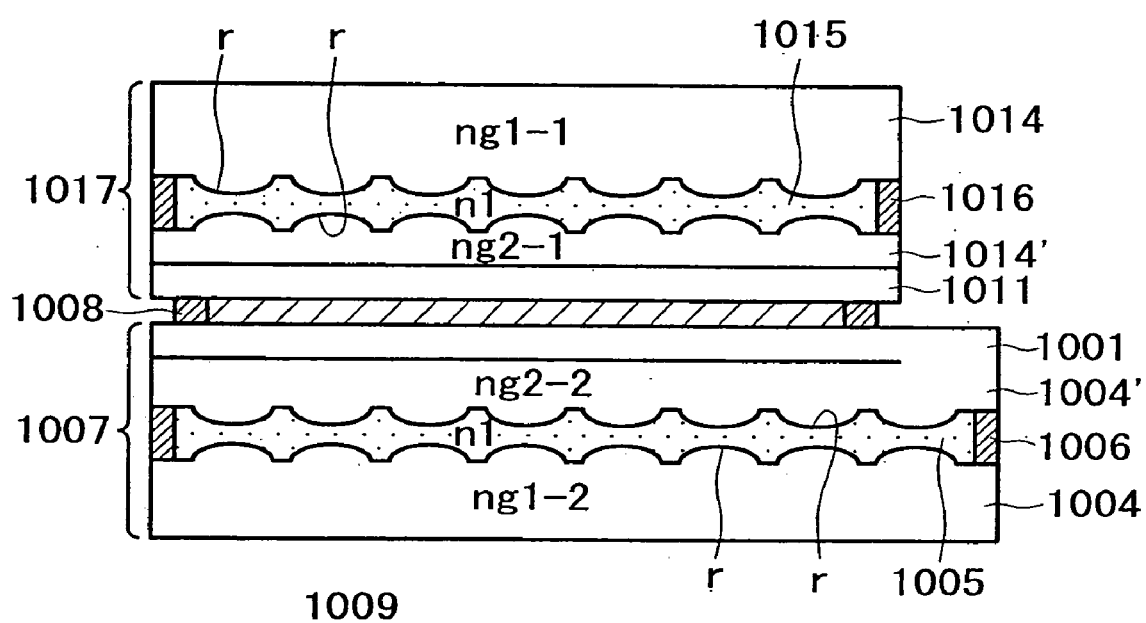
FIG. 39 is a sectional view showing one example of the liquid crystal display device produced according to the present invention.

FIG. 39 is a typical sectional view showing a further example of a liquid crystal display device produced according to the present invention.

A microlens array incorporating counter substrate 1017 is overlapped to a microlens array incorporating TFT substrate 1007 with a specific gap kept therebetween and is fixed thereto, and liquid crystal 1009 is enclosed in a gap therebetween. Here, a microlens array integrated on the back surface of the TFT substrate 1001 thinned by polishing is configured such that lens planes "r" have a double structure. To be more specific, convex lens planes "r" formed on a transparent resin layer 1004 having a refractive index "ng1-2" are oppositely spaced from convex lens planes "r" formed on a transparent resin layer 1004' having a refractive index "ng2-2" by means of a seal material 1006, and a transparent optical resin 1005 having a refractive index "n1" is enclosed therebetween, to form the microlens array. At this time, the refractive index "n1" of the transparent optical resin 1005 is lower than each of the refractive index "ng1-2" of the transparent resin layer 1004 and the refractive index "ng2-2" of the transparent resin layer 1004'. The microlens array incorporating counter substrate 1017 side has the same configuration, wherein a transparent optical resin 1015 having a refractive index "n1" is inserted between a transparent resin layer having a refractive index "ng1-1" and a transparent resin layer having a refractive index "ng2-1".

Figure 40:
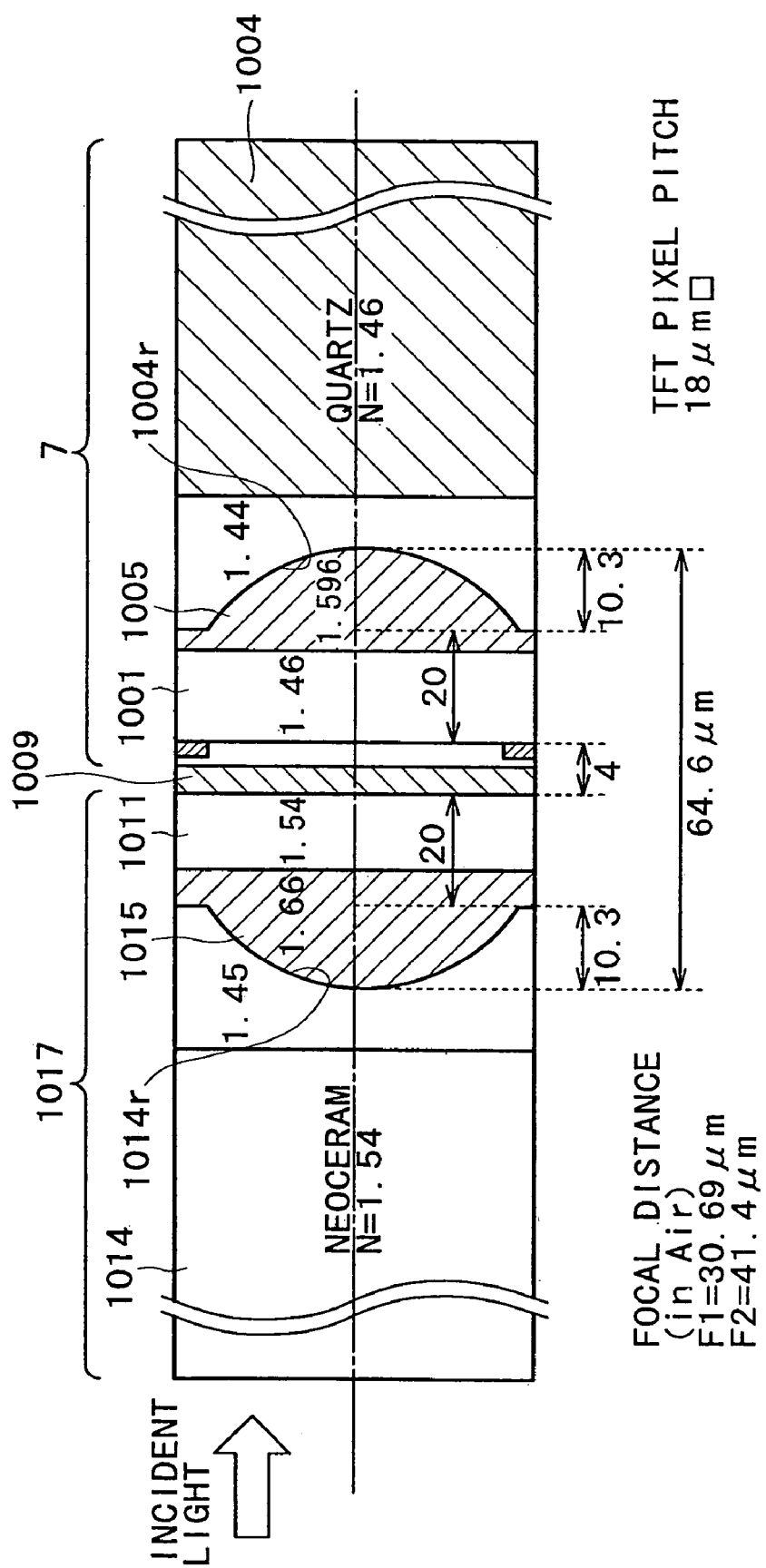
FIG. 40 is a typical diagram showing one example of the liquid crystal display device produced according to the present invention.

FIG. 40 shows an example showing the concrete shape and size of a liquid crystal display device produced according to the present invention. An MLTFT substrate 1007 is overlapped to an ML counter substrate 1017 with a specific gap kept therebetween and is fixed thereto, and liquid crystal 1009 is enclosed in a gap therebetween. The focal distance (equivalent value in air) of each microlens on the ML counter substrate 1017 side is F1= 30.69 $\mu$m. The microlens has a structure that a transparent resin layer having a refractive index of 1.45 is in contact with a transparent optical resin 1015 having a refractive index of 1.66 at a boundary defined by a lens plane 1014r. A counter substrate 1011 is made from the crystallized glass "Neo Ceram" and is thinned by polishing. The depth of the lens plane 1014r is 10.3 $\mu$m and the counter substrate 1011 is thinned to 20 $\mu$m. On the other hand, the focal distance (equivalent value in air) of each microlens formed on the MLTFT substrate 1007 is F2=41.4 $\mu$m (actual distance: 64.6 $\mu$m). A transparent resin layer having a refractive index of 1.44 is in contact with a transparent optical resin 1005 having a refractive index 1.596 at a boundary defined by the lens plane 1004r, to form the microlens. A quartz glass 1001 having a refractive index of 1.46 is thinned to 20 $\mu$m. As a result, the distance between principal points of the microlens functioning as a condenser lens formed on the ML counter substrate 1017 side and the microlens functioning as a field lens formed on the MLTFT substrate 1007 side is 64.6 $\mu$m. In addition, a TFT pixel pitch is 18 $\mu$m. The above dimensions are all actual dimensions except for the focal distances.

As described above, an effect of the present invention is to eliminate the need of provision of a cover glass, which has been required for a microlens array such as a single microlens array (SML) or a duel microlens array (DML), and hence to contribute to thinning of a microlens array. Another effect is that since a microlens array having a planarized surface is mounted in a liquid crystal panel, the mechanism stress applied to the microlens array can be reduced. Accordingly, the present invention is advantageous in producing a microlens array with a high efficiency and a high accuracy, and in improving the yield and the performance of the microlens array.

A further effect of the present invention is to realize a liquid crystal display device having a duel microlens array configuration that one microlens array is disposed on a counter substrate side and the other microlens array is disposed on a TFT substrate side. Such a display device is advantageous in improving an effective aperture ratio and the utilization efficiency of light emitted from a light source, thereby enhancing the luminance. A projector, to which the liquid crystal display device according to the present invention is applied, makes it possible to realize the downsizing of the projector and the cost-reduction of a projection lens.

Since a TFT large-sized substrate is divided by partially dicing the TFT large-sized substrate so as to form V-shaped grooves and fully dicing the large-sized substrate at the V-grooves, it is possible to chamfer the single substrates. The single substrate thus chamfered is advantageous in preventing occurrence of cracking and chipping of the TFT thin, thereby improving the yield and quality. Additionally, according to the present invention, it is possible to prevent damages due to static electricity and cracking of a TFT thin substrate upon polishing of the TFT thin substrate by a method for one-surface polishing with a grade suitable for optics, and hence to improve the yield and quality.

While the preferred embodiments of the present invention have been described using the specific terms, such description is for illustrative purposes only, and it is to be understood that changes and variations may be made without departing from the spirit or scope of the following claims.

What is claimed is:

1. A method of producing a microlens array having a double structure, comprising:
    a first patterning step of forming a first optical resin layer on a first support and forming two-dimensionally arrayed first microlens planes on the front surface of said first optical resin layer;
    a first planarizing step of filling irregularities of the first microlens planes with an optical resin having a refractive index different from that of said first optical resin layer, and planarizing the front surface, opposed to the microlens planes, of said optical resin, to form a first microlens array;
    a second patterning step of forming a second optical resin layer on a second support and forming two-dimensionally arrayed second microlens planes on the front surface of said second optical resin layer;
    a second planarizing step of filling irregularities of the second microlens planes with an optical resin having a refractive index different from that of said second optical resin layer, to form a second microlens array; and
    a joining step of joining the planarized surface of said first microlens array to the planarized surface of said second microlens array in a state that the first microlens planes are aligned to the second microlens planes, thereby integrating said first and second microlens arrays to each other wherein the first optical resin layer is made from a UV-cure type resin having a low refractive index.

* * * * *